(12) United States Patent
Yenni et al.

(10) Patent No.: US 8,364,546 B2
(45) Date of Patent: Jan. 29, 2013

(54) RESTROOM CONVENIENCE CENTER

(75) Inventors: Edward Yenni, Avon, OH (US); Peter J. Jahrling, Park Ridge, IL (US)

(73) Assignee: Sloan Valve Company, Franklin Park, IL (US)

( * ) Notice: Subject to any disclaimer, the term of this patent is extended or adjusted under 35 U.S.C. 154(b) by 667 days.

(21) Appl. No.: 12/290,914

(22) Filed: Nov. 5, 2008

(65) Prior Publication Data

US 2009/0119142 A1    May 7, 2009

Related U.S. Application Data

(60) Provisional application No. 60/985,606, filed on Nov. 5, 2007.

(51) Int. Cl.
| | |
|---|---|
| E03D 1/00 | (2006.01) |
| A47K 1/04 | (2006.01) |
| G05B 23/02 | (2006.01) |
| G08B 29/00 | (2006.01) |
| G01F 1/00 | (2006.01) |
| G01F 17/00 | (2006.01) |
| G01D 1/00 | (2006.01) |
| G06Q 10/00 | (2006.01) |
| G06Q 20/00 | (2006.01) |
| G06G 1/14 | (2006.01) |

(52) U.S. Cl. ............... 705/22; 4/300; 4/628; 340/3.1; 340/506; 340/539.1; 702/45; 702/50; 702/51; 702/54; 702/56; 702/128; 705/7.11; 705/7.15; 705/28

(58) Field of Classification Search .......... None
See application file for complete search history.

(56) References Cited

U.S. PATENT DOCUMENTS

| | | | |
|---|---|---|---|
| 4,563,780 | A | 1/1986 | Pollack |
| 4,667,350 | A | 5/1987 | Ikenaga et al. |
| 4,911,200 | A | 3/1990 | Ben-Arie |
| 4,914,758 | A | 4/1990 | Shaw |
| 4,999,607 | A | 3/1991 | Evans |
| 5,187,818 | A | 2/1993 | Barrett, Sr. et al. |
| 5,202,666 | A | 4/1993 | Knippscheer |
| 5,438,714 | A | 8/1995 | Shaw |
| 5,515,555 | A | 5/1996 | Wörmcke |
| 5,610,589 | A | 3/1997 | Evans |
| 5,771,501 | A | 6/1998 | Shaw |
| 5,781,942 | A | 7/1998 | Allen et al. |
| 5,812,059 | A | 9/1998 | Shaw et al. |
| 5,829,467 | A | 11/1998 | Spicher |
| 5,845,844 | A | 12/1998 | Zosimodis |

(Continued)

FOREIGN PATENT DOCUMENTS

| | | |
|---|---|---|
| JP | 11-85170 | 7/1999 |
| JP | 2001014397 | 1/2001 |

(Continued)

OTHER PUBLICATIONS

U.S. Appl. No. 60/531,060, LeBlond.

*Primary Examiner* — F. Zeender
*Assistant Examiner* — Allen Chein
(74) *Attorney, Agent, or Firm* — Foley & Lardner LLP

(57) ABSTRACT

A restroom monitoring system for monitoring attributes of fixtures within a restroom using sensors. Additional attributes are determined from the monitored attributes. Consumable usage levels are estimated based on predetermined consumption levels associated with usage states of the fixtures. The restroom monitoring system provides an indication of the need for replenishment of consumables based on the monitored attributes of the fixtures. In addition, restroom monitoring system may provide additional information regarding the restroom attributes to a service provider, a manager or a user.

5 Claims, 57 Drawing Sheets

U.S. PATENT DOCUMENTS

| | | |
|---|---|---|
| 5,870,015 A | 2/1999 | Hinkel |
| 5,878,381 A | 3/1999 | Gemmell et al. |
| 5,945,910 A | 8/1999 | Gorra |
| 5,952,924 A | 9/1999 | Evans et al. |
| 5,954,069 A | 9/1999 | Foster |
| 5,966,753 A | 10/1999 | Gauthier et al. |
| 5,979,500 A | 11/1999 | Jahrling et al. |
| 6,000,249 A | 12/1999 | Wilber |
| 6,029,600 A | 2/2000 | Davis |
| 6,038,331 A | 3/2000 | Johnson |
| 6,038,519 A | 3/2000 | Gauthier et al. |
| 6,058,519 A | 5/2000 | Quintana |
| 6,105,607 A | 8/2000 | Caise et al. |
| 6,147,607 A | 11/2000 | Lynn |
| 6,178,569 B1 | 1/2001 | Quintana |
| 6,195,588 B1 | 2/2001 | Gauthier et al. |
| 6,206,340 B1 | 3/2001 | Paese et al. |
| 6,211,787 B1 | 4/2001 | Yoshiike et al. |
| 6,211,788 B1 | 4/2001 | Lynn et al. |
| 6,236,317 B1 | 5/2001 | Cohen et al. |
| 6,236,953 B1 | 5/2001 | Segal |
| 6,250,601 B1 | 6/2001 | Kolar et al. |
| 6,278,372 B1 | 8/2001 | Velasco, Jr. et al. |
| 6,286,764 B1 | 9/2001 | Garvey et al. |
| 6,329,919 B1 * | 12/2001 | Boies et al. ............... 340/573.1 |
| 6,336,233 B1 | 1/2002 | Shaw et al. |
| 6,360,181 B1 * | 3/2002 | Gemmell et al. ............ 702/128 |
| 6,367,096 B1 | 4/2002 | Quintana |
| 6,377,190 B1 | 4/2002 | Saar |
| 6,388,609 B2 | 5/2002 | Paese et al. |
| 6,392,546 B1 | 5/2002 | Smith |
| 6,404,837 B1 | 6/2002 | Thompson et al. |
| 6,411,920 B1 | 6/2002 | McConnell et al. |
| 6,426,701 B1 | 7/2002 | Levy et al. |
| 6,499,152 B2 | 12/2002 | Johnson |
| 6,526,807 B1 | 3/2003 | Doumit et al. |
| 6,549,816 B2 | 4/2003 | Gauthier et al. |
| 6,568,655 B2 | 5/2003 | Paese et al. |
| 6,577,240 B2 | 6/2003 | Armstrong |
| 6,583,720 B1 | 6/2003 | Quigley |
| 6,607,103 B2 | 8/2003 | Gerenraich et al. |
| 6,671,893 B1 | 1/2004 | Quintana |
| 6,691,338 B2 | 2/2004 | Zieger |
| 6,701,194 B2 | 3/2004 | Gauthier et al. |
| 6,717,513 B1 | 4/2004 | Sandelman et al. |
| 6,724,873 B2 | 4/2004 | Senna Da Silva |
| 6,727,818 B1 | 4/2004 | Wildman et al. |
| 6,728,517 B2 | 4/2004 | Sugar et al. |
| 6,731,209 B2 | 5/2004 | Wadlow et al. |
| 6,749,122 B1 | 6/2004 | Koenck et al. |
| 6,794,318 B2 | 9/2004 | Anderson et al. |
| 6,839,644 B1 * | 1/2005 | Woods et al. ................ 702/56 |
| 6,856,249 B2 | 2/2005 | Strubbe et al. |
| 6,877,170 B1 | 4/2005 | Quintana et al. |
| 6,882,278 B2 | 4/2005 | Winings et al. |
| 6,883,563 B2 | 4/2005 | Smith |
| 6,906,617 B1 | 6/2005 | Van der Meulen |
| 6,934,977 B1 | 8/2005 | Quintana et al. |
| 6,950,017 B2 | 9/2005 | Smith |
| 6,954,737 B2 | 10/2005 | Kalantar et al. |
| 6,956,498 B1 | 10/2005 | Gauthier et al. |
| 6,957,207 B2 | 10/2005 | Sasaki |
| 6,962,272 B2 | 11/2005 | LeBlond |
| 6,963,808 B1 | 11/2005 | Addink et al. |
| 6,964,404 B2 | 11/2005 | Patterson et al. |
| 6,970,574 B1 | 11/2005 | Johnson |
| 6,972,677 B2 | 12/2005 | Coulthard |
| 6,975,231 B2 | 12/2005 | Lane et al. |
| 6,989,742 B2 | 1/2006 | Ueno et al. |
| 6,993,592 B2 | 1/2006 | Krumm et al. |
| 7,015,704 B1 | 3/2006 | Lang |
| 7,015,816 B2 | 3/2006 | Wildman et al. |
| 7,065,525 B1 | 6/2006 | Sasaki et al. |
| 7,099,649 B2 | 8/2006 | Patterson et al. |
| 7,114,510 B2 | 10/2006 | Peters et al. |
| 7,119,688 B2 | 10/2006 | Wildman |
| 7,177,725 B2 | 2/2007 | Nortier et al. |
| 7,213,782 B2 | 5/2007 | Osborne et al. |
| 7,236,097 B1 | 6/2007 | Cunningham |
| 7,242,307 B1 | 7/2007 | LeBlond et al. |
| 7,268,682 B2 | 9/2007 | Bialecki, Jr. et al. |
| 7,304,569 B2 * | 12/2007 | Marcichow ................ 340/539.1 |
| 2002/0007510 A1 * | 1/2002 | Mann ............................. 4/300 |
| 2002/0095721 A1 | 7/2002 | Quintana |
| 2003/0001025 A1 | 1/2003 | Quintana |
| 2003/0019536 A1 | 1/2003 | Smith |
| 2003/0033205 A1 * | 2/2003 | Nowers et al. .................. 705/26 |
| 2003/0055952 A1 | 3/2003 | Motoyama et al. |
| 2004/0001009 A1 | 1/2004 | Winings et al. |
| 2004/0150527 A1 | 8/2004 | Harper et al. |
| 2005/0040984 A1 | 2/2005 | Weals et al. |
| 2005/0171634 A1 | 8/2005 | York et al. |
| 2005/0171709 A1 * | 8/2005 | Nortier et al. .................. 702/45 |
| 2005/0231373 A1 | 10/2005 | Lynn et al. |
| 2005/0235306 A1 | 10/2005 | Fima |
| 2005/0281142 A1 | 12/2005 | Ochi et al. |
| 2005/0285941 A1 | 12/2005 | Haigh et al. |
| 2006/0000257 A1 | 1/2006 | Samadpour et al. |
| 2006/0000941 A1 | 1/2006 | Lewis et al. |
| 2006/0005312 A1 | 1/2006 | Reddy et al. |
| 2006/0067545 A1 | 3/2006 | Lewis et al. |
| 2006/0067546 A1 | 3/2006 | Lewis et al. |
| 2006/0071799 A1 | 4/2006 | Verdiramo |
| 2006/0168195 A1 | 7/2006 | Maturana et al. |
| 2006/0173576 A1 | 8/2006 | Goerg et al. |
| 2007/0005419 A1 | 1/2007 | Horvitz et al. |
| 2007/0006098 A1 | 1/2007 | Krumm et al. |
| 2007/0024708 A1 | 2/2007 | Lin et al. |
| 2007/0030145 A1 | 2/2007 | Marcichow |
| 2007/0113330 A1 | 5/2007 | Miller et al. |
| 2007/0130294 A1 | 6/2007 | Nishio |
| 2007/0170383 A1 | 7/2007 | Maercovich et al. |
| 2007/0176774 A1 | 8/2007 | Jahrling et al. |
| 2007/0178912 A1 | 8/2007 | Baranowski |
| 2007/0182571 A1 | 8/2007 | Kennish et al. |
| 2007/0194939 A1 | 8/2007 | Alvarez et al. |

FOREIGN PATENT DOCUMENTS

| | | | |
|---|---|---|---|
| JP | 2003171969 A | * | 6/2003 |
| WO | WO 2006/042053 A2 | | 4/2006 |

* cited by examiner

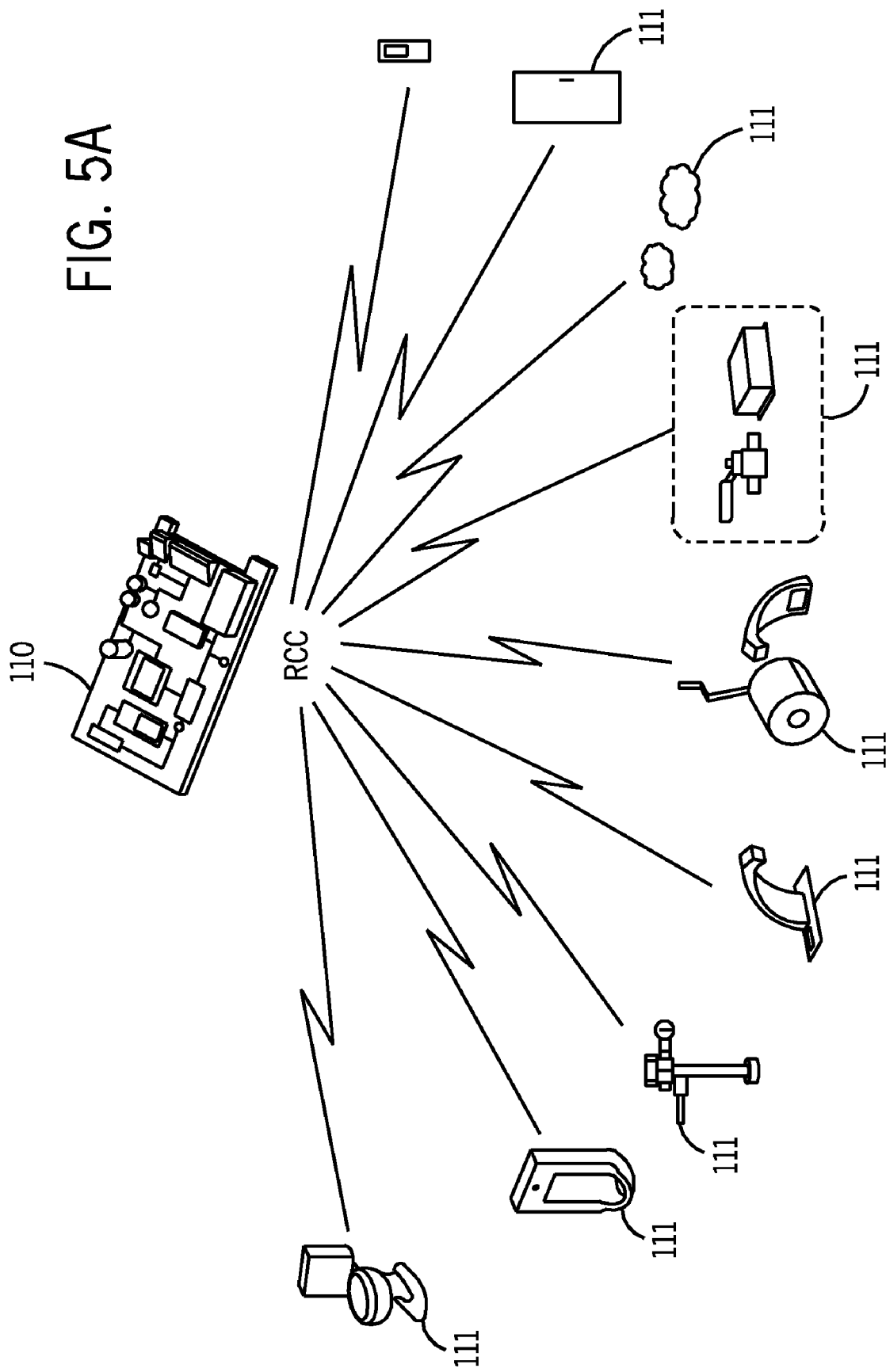

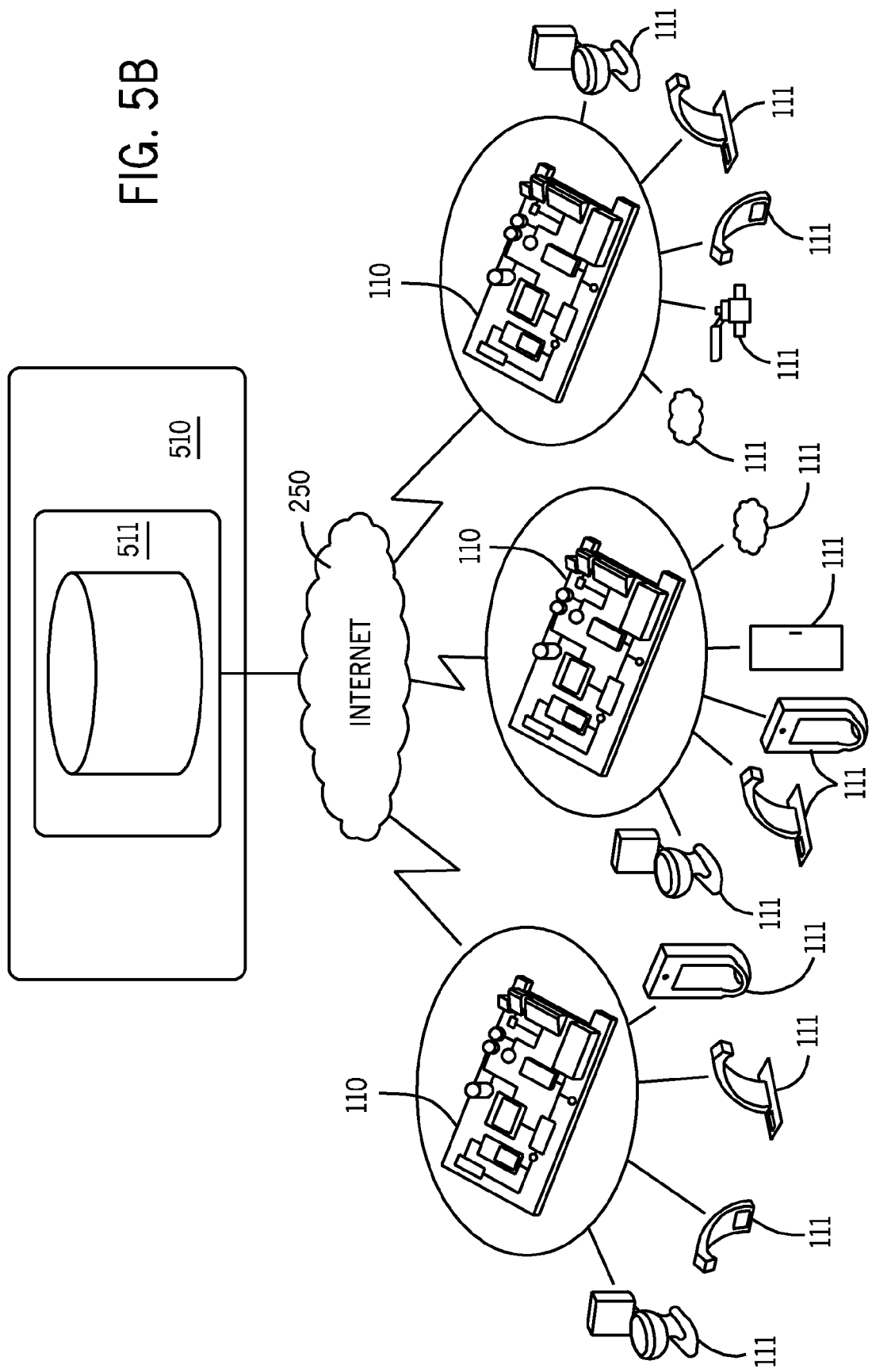

FIG. 6

| Market | Operating Efficiency | Patron Safety | Building / Equipment Safety | Cleanliness | Patron Comfort | Patron Convenience | Positive Image | LEED Points | Handwash Compliance | Queuing Control | Predictive Maintenance | Predictive Re-supply | Vandalism Control | Illicit Activity Detection | Handwash Encouragement | Information Dissemination | Patron Feedback Mechanism | Usage Statistics | Enterprise Integration |
|---|---|---|---|---|---|---|---|---|---|---|---|---|---|---|---|---|---|---|---|
| School | X | X | X |   |   |   |   | X | X |   |   |   | X | X | X |   |   |   |   |
| Campus | X | X | X | X | X | X | X | X |   |   | X | X | X | X |   | X | X | X | X |
| Retail | X | X | X | X | X | X | X |   | X |   |   |   | X | X |   | X | X | X | X |
| Small Commercial Office | X | X | X |   | X |   | X |   |   |   |   |   |   |   |   |   |   |   |   |
| Government | X | X | X |   |   |   | X |   |   |   |   |   | X | X |   |   |   |   |   |
| High Rise | X | X | X | X | X |   | X | X |   |   | X |   |   | X |   | X | X | X | X |
| Airport | X | X | X | X | X | X | X | X |   | X | X | X |   | X |   | X | X | X | X |
| Convention Center | X | X | X | X | X | X | X |   |   |   | X | X | X |   |   | X | X | X | X |
| Stadium | X | X | X | X | X | X | X |   |   | X | X | X | X |   | X |   |   | X | X |
| Prison | X | X | X |   |   |   | X |   |   |   | X |   | X | X |   |   |   | X |   |
| Service Plaza | X | X | X | X | X | X | X |   |   |   | X | X | X |   |   | X | X | X | X |
| Restaurant | X | X | X | X | X | X | X |   | X |   | X | X | X |   | X | X | X | X | X |
| Hospital | X | X | X | X | X | X | X | X |   |   |   |   |   |   |   | X |   | X | X |
| Theme / Amusement Parks | X | X | X | X | X | X | X |   | X | X | X | X | X | X | X | X | X | X | X |
| Portable Facilities |   |   |   | X |   |   |   |   |   |   |   | X | X |   | X |   |   | X |   |

| Sensor Input from | Toilet Paper | Soap | Seat Covers, Water Closet | Paper Towels | Fragrance |
|---|---|---|---|---|---|
| Faucet activations | LOW | HIGH | LOW | HIGH | LOW |
| Urinal activations | NO | MEDIUM | NO | MEDIUM | HIGH |
| Water closet activations | HIGH | MEDIUM | HIGH | MEDIUM | HIGH |
| Number of patron visits | LOW | LOW | LOW | LOW | LOW |
| Level of airborne VOCs | MEDIUM | MEDIUM | MEDIUM | MEDIUM | HIGH |
| Pending patron call | LOW | LOW | LOW | LOW | LOW |

| State | Faucet | Urinal | Water Closet | Patron Visits | Airborne VOC | Patron Call | Response |
|---|---|---|---|---|---|---|---|
| 0 | 0 | 0 | 0 | 0 | 0 | 0 | No action required |
| 1 | 0 | 0 | 0 | 0 | 0 | 1 | Respond to call, likely help is required |
| 2 | 0 | 0 | 0 | 0 | 1 | 0 | Apply fragrance, #2 event occurring, activate fan, re-measure after delay for decay, illegal activity, evaporated trap |
| 3 | 0 | 0 | 0 | 0 | 1 | 1 | Respond to call, plugged toilet, sickness |
| 4 | 0 | 0 | 0 | 1 | 0 | 0 | General cleaning, replenish consumables |
| 5 | 0 | 0 | 0 | 1 | 0 | 1 | Respond to call, general cleaning, replenish consumables, recalibrate algorithm |
| 6 | 0 | 0 | 0 | 1 | 1 | 0 | Apply fragrance, general cleaning, replace consumables |
| 7 | 0 | 0 | 0 | 1 | 1 | 1 | Apply fragrance, respond to call, general cleaning, replenish consumables, recalibrate algorithm |
| 8 | 0 | 0 | 1 | 0 | 0 | 0 | Respond and inspect, equipment failure, abuse |
| 9 | 0 | 0 | 1 | 0 | 0 | 1 | Respond with service tools, patron is reporting equipment failure |
| 10 | 0 | 0 | 1 | 0 | 1 | 0 | Respond with cleaning supplies, possible sickness, apply fragrance |
| 11 | 0 | 0 | 1 | 0 | 1 | 1 | Respond with cleaning supplies, patron reporting sickness, apply fragrance |
| 12 | 0 | 0 | 1 | 1 | 0 | 0 | General cleaning, replenish consumables |
| 13 | 0 | 0 | 1 | 1 | 0 | 1 | Respond, general cleaning, replenish consumables, recalibrate algorithm |
| 14 | 0 | 0 | 1 | 1 | 1 | 0 | Apply fragrance, general cleaning, replenish consumables |
| 15 | 0 | 0 | 1 | 1 | 1 | 1 | Respond, apply fragrance, general cleaning, replenish consumables, recalibrate algorithm |
| 16 | 0 | 1 | 0 | 0 | 0 | 0 | General cleaning |
| 17 | 0 | 1 | 0 | 0 | 0 | 1 | Respond, assistance or general cleaning |
| 18 | 0 | 1 | 0 | 0 | 1 | 0 | Apply fragrance, general cleaning |
| 19 | 0 | 1 | 0 | 0 | 1 | 1 | Respond, apply fragrance, general cleaning, recalibrate algorithm |
| 20 | 0 | 1 | 0 | 1 | 0 | 0 | General cleaning |
| 21 | 0 | 1 | 0 | 1 | 0 | 1 | Respond, assistance or general cleaning, recalibrate algorithm |
| 22 | 0 | 1 | 0 | 1 | 1 | 0 | Apply fragrance, general cleaning |
| 23 | 0 | 1 | 0 | 1 | 1 | 1 | Respond, apply fragrance, general cleaning, recalibrate algorithm |
| 24 | 0 | 1 | 1 | 0 | 0 | 0 | General cleaning, replenish toilet paper, seat covers |
| 25 | 0 | 1 | 1 | 0 | 0 | 1 | Respond, assistance, general cleaning, replenish consumables, recalibrate algorithm |

TO FIG. 12B

FROM FIG. 12A

FIG. 12B

| State | Faucet | Urinal | Water Closet | Patron Visits | Airborne VOC | Patron Call | Response |
|---|---|---|---|---|---|---|---|
| 26 | 0 | 1 | 1 | 0 | 1 | 0 | Apply fragrance, general cleaning, replenish toilet paper, seat covers |
| 27 | 0 | 1 | 1 | 0 | 1 | 1 | Respond, apply fragrance, general cleaing, replenish toilet paper, seat covers, recalibrate algorithm |
| 28 | 0 | 1 | 1 | 1 | 0 | 0 | General cleaning, replenish consumables, toilet paper, seat covers |
| 29 | 0 | 1 | 1 | 1 | 0 | 1 | Respond, general cleaning, replenish consumables, toilet paper, seat covers, recalibrate algorithm |
| 30 | 0 | 1 | 1 | 1 | 1 | 0 | General cleaing, replenish consumables, toilet paper, seat covers |
| 31 | 0 | 1 | 1 | 1 | 1 | 1 | Priority service, restroom neglected, recalibrate algorithm |
| 32 | 1 | 0 | 0 | 0 | 0 | 0 | Replenish hand towels, soap |
| 33 | 1 | 0 | 0 | 0 | 0 | 1 | Patron reporting restroom out of hand towels, soap, recalibrate algorithm |
| 34 | 1 | 0 | 0 | 0 | 1 | 0 | Replenish hand towels, soap, apply fragrance |
| 35 | 1 | 0 | 0 | 0 | 1 | 1 | Respond, replenish hand towels, soap, apply fragrance, recalibrate algorithm |
| 36 | 1 | 0 | 0 | 1 | 0 | 0 | Replenish consumables, general cleaning |
| 37 | 1 | 0 | 0 | 1 | 0 | 1 | Respond, replenish consumables, general cleaning, recalibrate algorithm |
| 38 | 1 | 0 | 0 | 1 | 1 | 0 | Replenish consumables, apply fragrance |
| 39 | 1 | 0 | 0 | 1 | 1 | 1 | Respond, replenish consumables, apply fragrance, recalibrate algorithm |
| 40 | 1 | 0 | 1 | 0 | 0 | 0 | Replenish consumables, hand towels, soap, TP |
| 41 | 1 | 0 | 1 | 0 | 0 | 1 | Respond, replenish consumables, recalibrate algorithm |
| 42 | 1 | 0 | 1 | 0 | 1 | 0 | Replenish consumables, apply fragrance |
| 43 | 1 | 0 | 1 | 0 | 1 | 1 | Respond, replenish consumables, apply fragrance, recalibrate algorithm |
| 44 | 1 | 0 | 1 | 1 | 0 | 0 | Replenish all consumables, general cleaning |
| 45 | 1 | 0 | 1 | 1 | 0 | 1 | Respond, general cleaning, replenish all consumables, recalibrate algorithm |
| 46 | 1 | 0 | 1 | 1 | 1 | 0 | Replenish consumables, general cleaning, apply fragrance |
| 47 | 1 | 0 | 1 | 1 | 1 | 1 | Priority service, restroom neglected, recalibrate algorithm |
| 48 | 1 | 1 | 0 | 0 | 0 | 0 | Replenish consumables, general cleaning |
| 49 | 1 | 1 | 0 | 0 | 0 | 1 | Respond, replenish consumables, general cleaning, recalibrate algorithm |
| 50 | 1 | 1 | 0 | 0 | 1 | 0 | Replenish consumables, general cleaning, apply fragrance |

FROM FIG. 12B

| State | Faucet | Urinal | Water Closet | Patron Visits | Airborne VOC | Patron Call | Response |
|---|---|---|---|---|---|---|---|
| 51 | 1 | 1 | 0 | 0 | 1 | 1 | Respond, replenish consumables, general cleaning, apply fragrance, recalibrate algorithm |
| 52 | 1 | 1 | 0 | 1 | 0 | 0 | Replenish consumables, general cleaning |
| 53 | 1 | 1 | 0 | 1 | 0 | 1 | Respond, replenish consumables, general cleaning, recalibrate algorithm |
| 54 | 1 | 1 | 0 | 1 | 1 | 0 | Replenish consumables, general cleaning, apply fragrance |
| 55 | 1 | 1 | 0 | 1 | 1 | 1 | Priority service, restroom neglected, recalibrate algorithm |
| 56 | 1 | 1 | 1 | 0 | 0 | 0 | Replenish consumables, general cleaning |
| 57 | 1 | 1 | 1 | 0 | 0 | 1 | Respond, replenish consumables, general cleaning, apply fragrance |
| 58 | 1 | 1 | 1 | 0 | 1 | 0 | Replenish consumables, general cleaning, apply fragrance |
| 59 | 1 | 1 | 1 | 0 | 1 | 1 | Respond, replenish consumables, general cleaning, apply fragrance, recalibrate algorithm |
| 60 | 1 | 1 | 1 | 1 | 0 | 0 | Replenish consumables, general cleaning |
| 61 | 1 | 1 | 1 | 1 | 0 | 1 | Priority service, restroom neglected, recalibrate algorithm |
| 62 | 1 | 1 | 1 | 1 | 1 | 0 | Replenish consumables, general cleaning, apply fragrance |
| 63 | 1 | 1 | 1 | 1 | 1 | 1 | Priority service, restroom neglected |

Facility / Company X | All Restrooms | Main Floor | First Floor Balcony | Reporting | System Configuration Reports | Logging

1421

| Restroom | Device | Event Time | Type | Level | Message | Resolve Time | Resolve Type | Resolved By |
|---|---|---|---|---|---|---|---|---|
| Main Floor | Men's Soap 1 | 10/19/08 11:41 | Housekeeping | Warning | Soap refill needed | | | |
| Main Floor | Men's Soap 1 | 10/19/08 11:41 | Housekeeping | Warning | Soap refill needed | 10/19/08 17:30 | Severity | |
| Main Floor | Men's Soap 1 | 10/19/08 17:30 | Housekeeping | Alarm | Soap refill needed | | | |
| Main Floor | Men's Waterfree | 10/20/08 13:07 | Maintenance | Warning | Waterfree urinal needs cartridge | | | |
| Main Floor | Men's Waterfree | 10/20/08 01:07 | Maintenance | Warning | Waterfree urinal needs cartridge | 10/20/08 14:20 | Severity | |
| Main Floor | Men's Waterfree | 10/20/08 14:20 | Maintenance | Alarm | Waterfree urinal needs cartridge | | | |
| First Floor Balcony | Men's Waterfree | 10/20/08 16:09 | Maintenance | Warning | Waterfree urinal needs cartridge | | | |
| First Floor Balcony | Men's Waterfree | 10/20/08 04:09 | Maintenance | Warning | Waterfree urinal needs cartridge | 10/20/08 18:06 | Severity | |
| First Floor Balcony | Men's Waterfree | 10/20/08 18:06 | Maintenance | Alarm | Waterfree urinal needs cartridge | | | |
| First Floor Balcony | Women's Soap 3 | 10/21/08 01:08 | Housekeeping | Warning | Soap refill needed | | | |
| First Floor Balcony | Women's Soap 3 | 10/21/08 01:08 | Housekeeping | Warning | Soap refill needed | 10/21/08 05:33 | Severity | |
| First Floor Balcony | Women's Soap 3 | 10/21/08 05:33 | Housekeeping | Alarm | Soap refill needed | | | |
| Main Floor | Men's Soap 1 | 10/21/08 07:02 | Housekeeping | Warning | Soap refill needed | | | |
| Main Floor | Men's Soap 1 | 10/21/08 07:44 | Housekeeping | Warning | Soap refill needed | | | |
| Main Floor | Men's Waterfree | 10/21/08 12:56 | Maintenance | Warning | Waterfree urinal needs cartridge | | | |
| Main Floor | Men's Waterfree | 10/21/08 12:56 | Maintenance | Warning | Waterfree urinal needs cartridge | 10/21/08 14:14 | Severity | |
| Main Floor | Men's Waterfree | 10/21/08 14:14 | Maintenance | Alarm | Waterfree urinal needs cartridge | | | |
| First Floor Balcony | Men's Waterfree | 10/21/08 16:10 | Maintenance | Warning | Waterfree urinal needs cartridge | | | |
| First Floor Balcony | Men's Waterfree | 10/21/08 04:10 | Maintenance | Warning | Waterfree urinal needs cartridge | 10/21/08 18:00 | Severity | |
| First Floor Balcony | Men's Waterfree | 10/21/08 18:00 | Maintenance | Alarm | Waterfree urinal needs cartridge | | | |
| First Floor Balcony | Women's Soap 3 | 10/22/08 00:51 | Housekeeping | Warning | Soap refill needed | | | |
| First Floor Balcony | Women's Soap 3 | 10/22/08 12:51 | Housekeeping | Warning | Soap refill needed | 10/22/08 05:11 | Severity | |
| First Floor Balcony | Women's Soap 3 | 10/22/08 05:11 | Housekeeping | Alarm | Soap refill needed | | | |
| Main Floor | Men's Soap 1 | 10/22/08 07:13 | Housekeeping | Warning | Soap refill needed | | | |

Clear | Alarm Print

Facility | Company X ▽ | All Restrooms | Women's Restroom | Men's Restroom | Kitchen | Meters | Reporting | System Configuration ▽

◁| ◁ ▷ |▷

Reports | Logging

Company X Report Generator

Restrooms       All ☐
Women's Restroom    ☐
Men's Restroom      ☐
Kitchen             ☐
Meters              ☐
Fixture Detail      ☐

Products        All ☐
Water Closets       ☐
Urinals             ☐
Faucets             ☐
Soap Dispensers     ☐

Metrics         All ☐
Activations         ☐
Water Use           ☐

1520

Report Name

Reporting Period    From            To

Save Report as:     Daily ☐    Weekly ☐    Monthly ☐
Email report:                                           Add
Send To
Email Address:

Add   New   Delete   Send   Display

FIG. 15H

|  | MEN'S | | | WOMEN'S | | |
|---|---|---|---|---|---|---|
| DATE | FLUSHES | COUNT | EXCESS COUNT | FLUSHES | COUNT | EXCESS COUNT |
| 12/16 | 1548 | 1575 | 27 | 1120 | 785 | -335 |
| 12/17 | 1971 | 2048 | 77 | 1511 | 1028 | -483 |
| 12/18 | 1207 | 1299 | 92 | 1274 | 868 | -406 |
| 12/19 | 1119 | 1131 | 12 | 1313 | 909 | -404 |
| 12/20 | 1345 | 1382 | 37 | 1171 | 820 | -351 |
| 12/21 | 1193 | 1224 | 31 | 1105 | 803 | -302 |
| 12/22 | 1408 | 1451 | 43 | 1231 | 902 | -329 |
| 12/29 | 1234 | 1294 | 60 | 1462 | 1006 | -456 |
| 12/30 | 1211 | 1206 | -5 | 1624 | 1104 | -520 |
| 12/31 | 736 | 746 | 10 | 747 | 542 | -205 |
| 01/01 | 689 | 685 | -4 | 767 | 569 | -198 |
| 01/02 | 1096 | 1059 | -37 | 1369 | 937 | -432 |
| 01/03 | 1126 | 1136 | 10 | 1068 | 787 | -281 |
| 01/04 | 1181 | 1184 | 3 | 1211 | 858 | -353 |
| 01/05 | 1114 | 1112 | -2 | 1020 | 761 | -259 |
| 01/06 | 1132 | 1129 | -3 | 850 | 629 | -221 |
| 01/07 | 987 | 1024 | 37 | 883 | 658 | -225 |
| 01/08 | 707 | 766 | 59 | 822 | 557 | -265 |
| 01/09 | 1052 | 1070 | 18 | 1097 | 770 | -327 |
| 01/10 | 1182 | 1199 | 17 | 932 | 673 | -259 |
| 01/11 | 1205 | 1159 | -46 | 795 | 588 | -207 |
| 01/12 | 1271 | 1250 | -21 | 882 | 633 | -249 |
| 01/13 | 1283 | 1301 | 18 | 1059 | 786 | -273 |
| 01/14 | 1274 | 1367 | 93 | 1153 | 801 | -352 |
| 01/15 | 854 | 930 | 76 | 802 | 576 | -226 |
| 01/16 | 983 | 1018 | 35 | 1012 | 764 | -248 |
| 01/17 | 1314 | 1358 | 44 | 1232 | 830 | -402 |
| 01/18 | 1177 | 1242 | 65 | 869 | 621 | -248 |
| 01/26 | 1210 | 1252 | 42 | 886 | 640 | -246 |
| 01/27 | 1206 | 1257 | 51 | 969 | 669 | -300 |
| 01/28 | 1298 | 1316 | 18 | 1041 | 788 | -253 |
| 01/29 | 758 | 795 | 37 | 773 | 571 | -202 |
| 01/30 | 808 | 833 | 25 | 940 | 676 | -264 |
| 01/31 | 1253 | 1262 | 9 | 881 | 639 | -242 |
| 02/01 | 1083 | 1130 | 47 | 870 | 602 | -268 |
| 02/02 | 1173 | 1289 | 116 | 847 | 603 | -244 |
| 02/03 | 1240 | 1300 | 60 | 986 | 689 | -297 |
| 02/04 | 1265 | 1380 | 115 | 1063 | 794 | -269 |
| 02/05 | 770 | 798 | 28 | 843 | 608 | -235 |
| 02/06 | 1002 | 1070 | 68 | 1006 | 717 | -289 |
| 02/07 | 1147 | 1266 | 119 | 899 | 665 | -234 |
| 02/08 | 1116 | 1192 | 76 | 907 | 630 | -277 |
| 02/14 | 1199 | 1271 | 72 | 874 | 646 | -228 |
| 02/15 | 1174 | 1268 | 94 | 934 | 646 | -288 |
| 02/16 | 1276 | 1436 | 158 | 984 | 684 | -300 |
| 02/17 | 1491 | 1506 | 15 | 1292 | 881 | -411 |
| 02/18 | 1019 | 1069 | 50 | 874 | 675 | -199 |
| TOTAL | 54089 | 56035 | 1946 | 48250 | 34388 | -13862 |
|  |  |  | 3.47% |  |  | -40.31% |

FIG. 21

RESTROOM CONVENIENCE CENTER

CROSS-REFERENCE TO RELATED APPLICATIONS

This application is related to and claims priority from U.S. Provisional Patent Application 60/985,606 filed Nov. 5, 2007 which is hereby incorporated by reference.

BACKGROUND OF THE INVENTION

Conventional commercial restrooms are characterized by multiple plumbing fixtures and their respective fittings, such as water closets with flushometers, urinals with and without flushometers, lavatory sinks with faucets, and the accompanying devices that dispense consumables such as soap, paper towels, water closet tissues, water closet disposable seat covers, urinal deodorant supplies, and wall hung air fresheners. With such a wide diversity of amenities in any given commercial restroom, periodic maintenance of the consumables alone (consumables are those provided materials that are used by the restroom patrons as a function of traffic) creates a substantial task list, not only in the supply of them into the dispensing devices within the restroom, but also into the particular facility where they are being consumed.

Managers of commercial restrooms view the restroom as yet another expense or at the other extreme an opportunity to make a statement to their customers. Indeed many studies have shown a large impact can be experienced by customers whether positive or negative by the customer's singular visit to the restroom area. In some of these installations, the multi fixture restrooms can be many and can be located in remote parts of a large expansive campus. Typically the cleaning, consumable refilling, and plumbing maintenance has fallen under the responsibility of the property owner or property manager. The routine cleaning of the restroom and refilling of the soap, paper towels, and paper tissue dispensers has typically fallen upon the in house group under maintenance called house keepers. Their primary responsibility is to maintain the commercial restrooms for a pleasant and efficient use by customers visiting the property. This routine cleaning is accomplished by facilities through many schemes and systems that range from very informal and non specific, to regimented systems of routes and times of the routing. In the past, most owners of commercial restrooms have cleaned and maintained the restroom this way in order to maintain an area of the property (commercial restroom) but is a procedure which can do harm with an unpleasant patron experience.

Of all the venues for commercial restrooms, one common patron problem is universal. More times than not, a particular patron of the commercial property restroom is not familiar with the property layout and the location of all of the possible restrooms. Manual signage is only indicative of location; and in the instance of many people using the most convenient restroom, forewarning of a queue (people waiting in line inside the restroom) and choices of alternate restrooms with no queues is not possible. Moreover, conventional restroom facilities, especially in high traffic areas, such as airports, stadiums, educational institutions, and restaurants have traditionally experienced long queues and insufficient or wasted asset capacity during periods of peak restroom usage. As such, potential restroom users are often subjected to frustration and inconvenience as a result of these issues. A particular challenge is not only the daily servicing many of these restrooms, but it is also being able to leverage that service with fewer employees in a job position, which is also prone to high turnover. For example, if a particular restroom within a property has not been used all day, there is no need to waste valuable time servicing that restroom. This is equally valid if certain fixtures are known historically to have been used more than others; and the periodic routine maintenance of that fixture could potentially be deferred to a less frequent servicing routine, if there were some efficient way to do so.

The tasks of cleaning and replenishing consumables in a commercial restroom have ultimately fallen upon the owner of the general property. Whether that property is a public pay for entertainment (movie theatres and stadiums), hospitality (hotels and resorts), convention halls, or high traffic public locations (railroad stations, airports, etc.) varying degrees of methods have been used to clean and replenish the commercial restrooms of those properties. Much of the methods have been home grown and specific to the properties, from simple route plans that teams of employees are instructed to follow (to evenly cover the expansive property layouts), to specific routines of restrooms based upon known general traffic conditions. For example, in airports, a restroom located next to a gate which routinely deplanes large body aircraft may be overly utilized whenever the large population of flyers deplanes. Depending upon the level of quality desired for each property, the actual maintenance routine could be minimal, leaving major cleaning to less traffic periods. The actual routing of house keepers and verifying a cleaning/replenishment routine is left to knowledge of the property traffic and simple hand written logs which sometimes can be found hanging in an inconspicuous spot within the restroom. Absent a miscalculation on traffic pattern or an incomplete service routine by a new maintenance employee, the need for servicing may be determined only by a physical observation of the restroom or worse yet, a customer complaint about the state of a substandard commercial restroom.

National restaurant chains and QSRs (Quick Serve Restaurants) know the impact of substandard restroom cleanliness with some chains actually placing a dollar value on the cost. Such a costly element of the business is left to the good practices of a busy manager who with the best of intentions during the manager's work day, does not always have the time to devote to restroom quality. The forgotten small restrooms during the business day can better be monitored centrally from the home offices as well as allowing for the economies of large scale use on consumables purchases for bargaining with low cost providers of such consumables. It is yet another factor of today's business models that can have the restroom monitoring being performed remotely as well as the consumables procurement being remote from the actual consumption.

A large segment of commercial restroom owners contract out the sanitation tasks of the commercial restroom to outside service providers and the service that used to be in house is now more economically sourced out. This has allowed for reductions in house personnel to maintain the restroom, keeping a fraction of the previous work force for emergency tasks. These service providers can be a local agent or a branch of a larger state or country wide company. With the bulk of the work tasks being contracted outside a business, the actual supplies purchasing for a specific restroom can be located miles or even states away and are now more disparate than when accomplished by in house personnel. These changes have ushered in a whole new set of challenges when it comes to maximizing the commercial restroom as an asset.

The traditional commercial restroom has provided water control and dispensing consumables through either manual operation, or automatic operation using infrared sensors or other sensors that detect the presence of users, of faucets on sinks, water closets, urinals and other consumables dispensers. At the present time many of these types of commercial restrooms have adopted "hands free" operation where the user touching the various plumbing fittings is minimized for the user's convenience or sanitary reasons. Most of these automatic sensors follow a logical routine for detecting valid targets (users within a predefined sensing zone) and ignoring invalid targets such as patrons walking past plumbing sensor detections zones or hands moving quickly below faucet and soap dispenser fittings. Typically, each valve operates alone with no communication or direct interaction with other valves and each sensor operates an associated fixture with no communication or correlation with other sensors. With no inter communication or central communication, potentially useful information that can be extracted from, for example, the activation and deactivation of individual sensors is not utilized and/or discarded. Simple counting of the activations may yield some basic inferential information on consumables but precise prediction of the entire property's restrooms can be greatly underutilized. Some prior art patents, owned by the assignee, U.S. Pat. Nos. 7,304,569 and 7,177,725 network these sensors for gross control of the restroom via a central controller offering two way communication between the plumbing fittings and a central area. The actual electronic detection elements of the sensor software are not broken up and only gross information of on and off and length between the on and off can be extrapolated. In the case of sensors to detect all levels of consumable paper and level of consumable liquids more sensors complicate the system network and are prone to diagnostic and added repair when they fail, increasing life cycle costs and system complexity.

The lack of restroom automation can also lead to wasted water due to valves that leak slowly or run-on causing flooding. Slow leaks during no-demand times can also prompt intervention by maintenance staff to fix a slow leak before it becomes so obvious it is running on. The lack of restroom automation further can lead to suboptimal operating conditions such as water flow-failure, exhausted consumable supplied, inoperable water fixtures, which can increase the cost of ownership, and/or general owner and user dissatisfaction due to any of the above. Accordingly, there is a substantial need for improved monitoring and maintenance of restrooms, and also there is, a need to maximize the restroom asset while minimizing the cost to maintain the asset by support services.

Additionally, there has been a movement to implement ecologically friendly and ecologically efficient systems and services in facilities, in particular, with respect to, e.g., water, paper, and soap consumption in restrooms. From a servicing standpoint, facilities managers as well as janitorial staff have also experienced frustration and an inability to effectuate efficient operating procedures allowing such staff to maintain consumables supplies and also to know when, for example, an appropriate time period (e.g., a lull in restroom activity) would allow janitorial staff to address issues in the restroom facilities. Hence, there is a need for implementing systems and methods that can address these problems from both the restroom user perspective and the servicing staff perspective. With more large facilities contracting out the housekeeping service, the need for making those servicing visits by outside personnel requires more exacting information on what to expect at a given commercial restroom within a property. It would be highly advantageous for such systems and methods to be integrated with solutions for addressing the need for improved monitoring and control of restrooms, as well as reducing the need for additional infrastructure, e.g., minimal use of sensors, thus simplifying and/or simply eliminating the increased cost and service requirements for additional sensors. With the increasing demand and economic pressure, monitoring the commercial restroom at a quality level with minimal costs, has become extremely difficult. There is a further need to maximize the restroom asset while minimizing the support services cost to maintain the asset.

SUMMARY OF THE INVENTION

A system comprises a plurality of sensors in a restroom facility which operate various automatic devices such as flushometers, faucets, and other commercial restroom devices. The sensors are in communication with a network and provide direct information regarding aspects of the restroom facility such as, but not limited to, timing information, water closet and urinal water flow, temperature, air quality, and user traffic. The system extrapolates the direct information to determine indirect information regarding the state of other various aspects of the restroom facility, including, but not limited to, the condition of the water closets and urinals the supply level of consumables, the general cleanliness of the restroom facility and availability generally of various restrooms and also of fixtures in the restroom when traffic patterns in the facility are high. The system provides an indication regarding the need for attention to an aspect of the restroom facility based upon the direct (actual sensor activations) and indirect information (heuristic software models). For example, a control system can include at least one server configured to monitor data states associated with a first of features of the restroom; a controller coupled to the at least one sensor and configured to receive first state data associated with the first set of features and, the controller further having a coupled memory storage with embedded alarm data characteristic of selected combinations of different ones of the first states data and the controller operative to generate particular action commands upon receiving a selected one of the combinations, thereby causing at least one of servicing of the restroom, activation of informational direction to user of the restroom and providing useful restroom status information to the user. In addition, in another aspect of the invention, a method for forecasting restroom usage queue times for selected fixtures of the restroom includes operably associating at least one fixture sensor with at least one fixture in the restroom, such that at least one attribution of the fixture is monitored by the fixture sensor; operably associating each of the at least one fixture sensors with a restroom controller; monitoring entrance and exit events for the restroom using a presence sensor, the presence sensor associated with the restroom controller; generating a time/date stamp for data generated by the at least one fixture sensor and the presence sensor; determining a user saturation of the restroom; calculating an estimated queue time associated with the user saturation of the restroom; and communicating the calculated queue time to potential users; thereby enabling efficient use of the restroom.

In one embodiment, the present invention relates to a restroom control system for controlling a restroom and its restroom facilities. The system comprises one or more sensors configured to monitor states associated with a first set of features of the restroom. A controller is operably coupled to the one or more sensors, and configured to receive first states data therefrom associated with the first set of features to determine second state data associated with a second set of features and communicate the status condition associated with the first set of features, thereby causing useful actions to be scheduled for the restroom.

Another aspect of the invention related to a method for automatically generating work orders for a restroom by: sensing the state of at least one restroom fixture; communicating the at least one sensed state to a controller; calculating the use of at least one type of consumable within the restroom facility based upon a predetermined average usage for each of the at least one sensed states; aggregating the calculated usage for each type of consumable within the restroom facility to determine a total amount used for each type of consumable; determining when the total amount used for each type of consumable surpasses a predetermined threshold; evaluating at least one of additional stored data and sudden occurrence data for determining whether the predetermined threshold should be adjusted based on the additional stored data and the sudden occurrence data; and issuing a work order for replenishment of each type of consumable for which the respective threshold has been surpassed.

In a further aspect, the present invention relates to a method comprising: receiving first data from a plurality of sensors, at least one associated with a flushometer; inferring information based on the received first data, the inferred information being indicative of at least one state of the restroom facility requiring at least one corrective measure; and transmitting at least one notification including at least one instruction for implementing the at least one corrective measure.

In yet another aspect, the present invention relates to a computer implemented system for managing restroom facilities, comprising a central processing unit (CPU) and a storage device coupled to the CPU. The storage device has information stored therein for configuring the CPU to: first data from a plurality of sensors associated with at least one of an appliance aspect and a utilization aspect of a restroom facility; second data determined by executing computer software based on the received first data, the second data being indicative of at least action state of the restroom facility requiring at least one corrective measure for the restroom facilities; and an alarm system activated by a notification of achieving the at least one action states including at least one instruction for implementing the at least one corrective measure for servicing the restroom facilities.

In yet another aspect, the present invention related to a method for forecasting restroom usage queue times for selected fixtures of the restroom. The method comprises: operably associating at least one fixture sensor with at least one fixture in the restroom, such that at least one attribution of the fixture is monitored by the fixture sensor; operably associating each of the at least one fixture sensors with a restroom controller; monitoring entrance and exit events for the restroom using a presence sensor, the presences sensor associated with the restroom controller; generating a time/date stamp for data generated by the at least one fixture sensor and the presence sensor; determining a user saturation of the restroom; calculating an estimated queue time associated with the user saturation of the restroom; and communicating the calculated queue time to potential users thereby enabling efficient use of the restroom.

In yet another embodiment, the present invention relates to a system for a restroom. The system includes at least one server configured to monitor data states associated with a first of features of the restroom. A controller is coupled to the at least one sensor and configured to receive first state data associated with the first set of features. The controller has a coupled memory storage with embedded alarm data characteristic of selected combinations of different ones of the first states data. The controller is operative to generate particular action commands upon receiving a selected one of the combinations, thereby causing at least one of servicing of the restroom, activation of informational direction to user of the restroom and providing useful restroom status information to the user.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings described below.

BRIEF DESCRIPTION OF THE DRAWINGS

FIG. 5A illustrates the connectivity of a plurality of sensors and restroom convenience center controller; FIG. 5B illustrates three separate restroom convenience center (RCC) controller in communication with a Network Operations Center (NOC)

FIG. 6 illustrates one estimate of benefits, needs, or requirements according to the market;

FIG. 11 is a table listing the correlations for sensor inputs and consumables for one embodiment;

FIGS. 12A-C are a table listing sensor states and the corresponding response for one embodiment;

FIGS. 13A-G illustrate one embodiment of a web interface showing typical graphical user interfaces (GUI) of the various monitoring elements of the system;

FIGS. 15A-H illustrates an alternative embodiment of a web interface showing a typical GUI of various monitoring elements of the system for a large public installation;

FIG. 21 illustrates actual time stamped data depicting patron counts and flush activations.

DETAILED DESCRIPTION OF THE PREFERRED EMBODIMENTS

The present invention will be described with respect to the accompanying drawings in which like numbered elements represent like parts. The present invention is directed to a system and method of monitoring the status condition of one or more functions associated with a restroom, extrapolating one or more additional status conditions from the status condition of the monitored functions, communicating one or more of the status conditions and effectuating services to a restroom.

Figure 1:
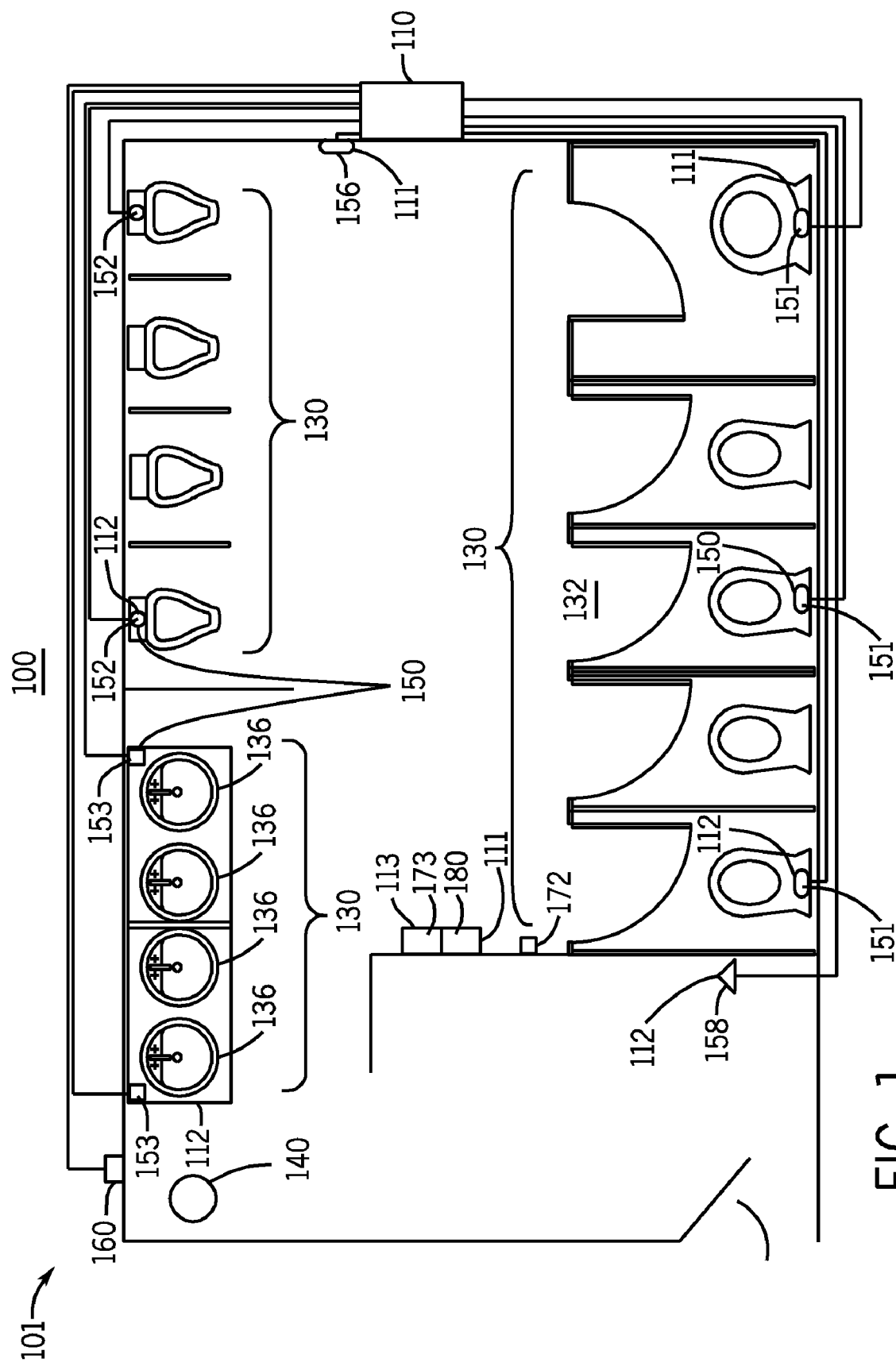
FIG. 1 is a schematic diagram illustrating a typical male rest room according to one exemplary embodiment.

With reference to the figures, FIG. 1 is a schematic diagram illustrating one exemplary embodiment of a restroom convenience center system 100 for use with a restroom. In FIG. 1, the restroom 101 such as a commercial bathroom has a plurality of differing kinds of fixture 130 therein. For example, the fixture 130 may include one or more water closets 132, one or more automatic urinals 134, one or more faucets 136, trash receptacles 140, as well as dispensers 142 of consumable items such as restroom tissue paper, soap, paper napkin, fragrance, bowl sanitizer, seat covers, and hand sanitizer. Other types of the fixtures 130 (showers, hand dryers, and a product dispensing machine) may also reside within the restroom 101 and all such fixtures 130 are contemplated as falling within the scope of the present invention. As illustrated in FIG. 1, at least one information source 111 is provided in communication with a restroom convenience center controller 110. The information source 111 may be, for example, a sensor 112 or a peripheral device 113.

Briefly turning to the sensors 112, which are disclosed in more detail below, the restroom 101 of FIG. 1 further includes a plurality of the sensors 112. The sensors 112 receive data regarding observed conditions of the restroom 101. The sensors 112 may be associated with one of the fixtures 130 within the restroom 101, such as urinal automatic activation sensors 152 associated with the urinals 134 respectively, water closet automatic activation sensors 151 associated with the water closets 132 in the restroom 101 and faucet automatic activation sensors 153 associated with faucets 136. Other ones of the sensors 112 may be located within the restroom 101 for gathering data but not associated with a particular one of the fixtures 130, such as air quality sensor 156, patron counter 158, and a water flow sensor 160. Various sensors 112 for use with the present invention are further described below.

With continued reference to FIG. 1, the restroom convenience center controller 110 is operatively associated with each of the sensors 112 in the restroom 101 as illustrated, to receive (either via "push" or "pull") data from one or more of the various sensors 112 (or their respective controllers) within the restroom 101. Although FIG. 1 illustrates hard-wired type electrical connection to the sensors 112, it should be appreciated that such sensors 112 may be coupled to the controller 110 in a wireless or other type manner, and such alternatives are contemplated by the present invention and described in further detail below. A preferred embodiment utilizes a Zig-Bee™ wireless network protocol which is able to create self-organizing mesh networks, thus negating any need to perform complicated routing configurations between wireless nodes. It should be noted, however, that other network protocols and/or infrastructures can be utilized in accordance with various embodiments. It should also be noted that although it is preferable to utilize wireless-based sensors and facilities (collectively referred to as wireless information sources 215, for example shown in FIG. 2), if for example, building infrastructure inhibits the effectiveness of wireless communications, wired sensors, facilities, and networks (collectively referred to as wired information sources 214, for example shown in FIG. 2) can be used in accordance with various embodiments such as fiber and power line communication.

Furthermore, although the restroom convenience center system 100 is generally illustrated and referred to as a physically separate component from the fixture 130 and the sensors 112, it should be appreciated that the restroom convenience center system 100 may be included as a single device or component with the other sensors 112 or the peripheral devices 113, such as in combination with the air quality sensor 156, built into the flushometer automatic activation sensor 152, 151 of the urinal 134 or the water closet 132, or integrated with a graphical user interface 180 in the restroom 101. It will be appreciated that this can be ideal for "retrofit" applications or for small restrooms. It should be appreciated that in instances where the restroom convenience center controller 110 is "accessible" to patrons, the tamper detection aspects of the invention discussed further below achieve an increased importance.

Figure 2:
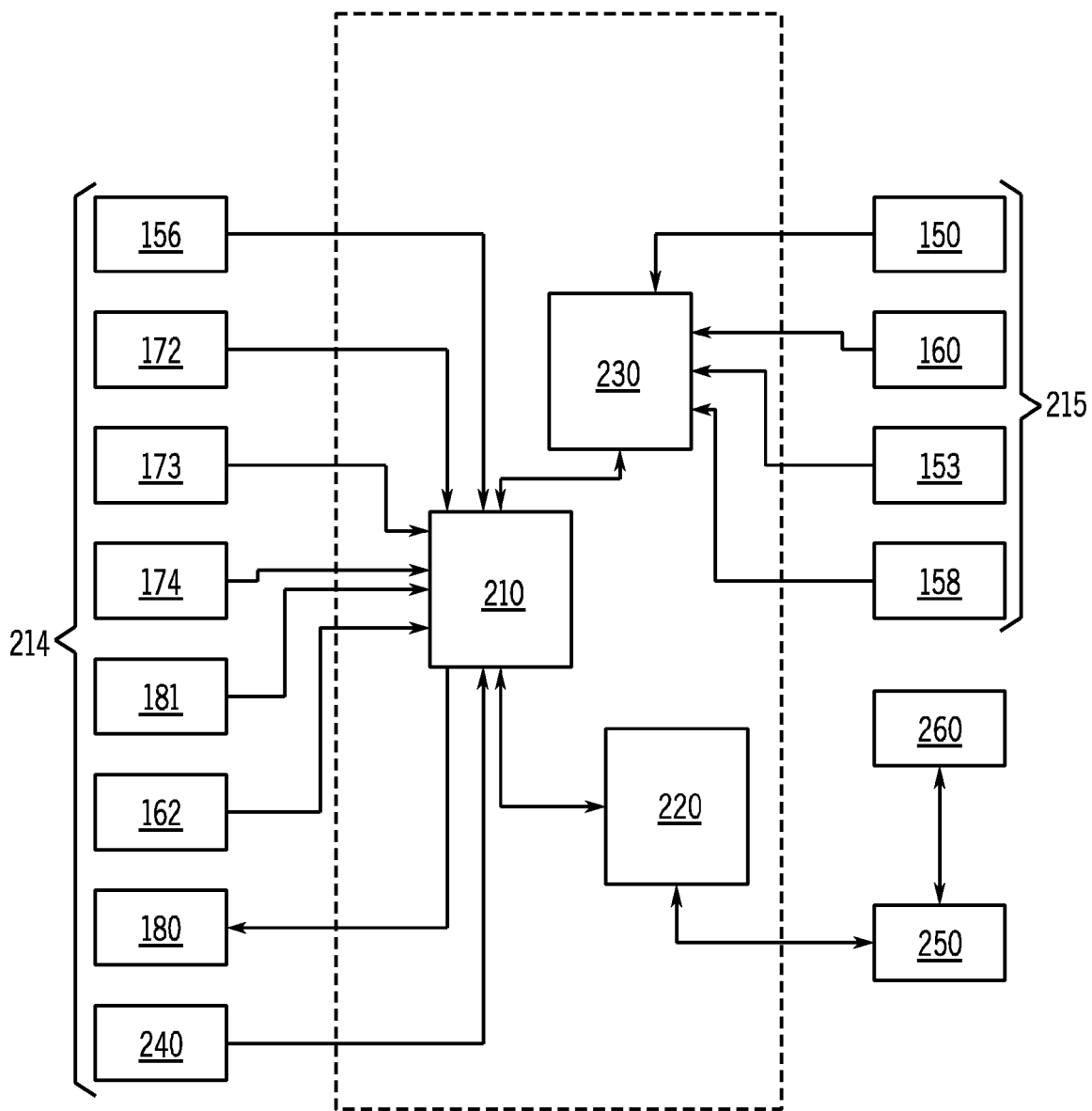
FIG. 2 is a diagram illustrating a restroom controller that incorporates the functional elements necessary to communicate with external devices and equipment either through wired or wireless means, to communicate with attached devices and equipment, to perform local processing transforming low level data into valuable user information, and to communicate the transformed low-level data using a variety of transmission media and protocols.

FIG. 2 is a more detailed illustration of the components of the restroom convenience center controller 110 in accordance with various embodiments. The restroom convenience center controller 110 consists of one or more hardware modules and associated software. In the embodiment of FIG. 2, one hardware module is referred to as the Data Collection Unit (DCU) 210, which is responsible for collecting data from all attached devices, including, for example, hard-wired components or wireless components, such as via a Device Area Network (DAN) 230, providing system time and passing device data to the Network Interface Unit (NIU 220). The wired information sources 214 may include the air quality sensor 156 (FIG. 1), a janitor login interface 172 (such as for janitorial access), a patron call device 173 as discussed further below, a keypad 174 and local user interface (LUI) 180 for stakeholder interaction, a tamper switch or sensor 181, and a temperature sensor 162. The wireless information sources 215 in communication with the DAN 230 may include, for example, the automatic activation sensor 151, the water flow sensor 160, the faucet automatic activation sensor 153, and the patron counter 158.

The Data Collection Unit 210, for example, can be, but is not limited to, an Atmel AVR microprocessor. The DCU 210 manages the DCU 210 configuration, collects data from attached wired information sources 214 and wireless information sources 215, provides system time via an RTC (real-time clock) 240, performs some minimal processing of data, communicates with the NIU 220, communicates with DAN 230, and provides a mechanism to update its application flash image. Thus, as illustrated in FIG. 2, the DCU 210 receives data from various attached peripheral devices 113 (air quality sensor 156, janitor login interface 172, patron call device 173, keypad 174, tamper sensor or switch 181, temperature sensor 162, LUI 180, RTC 240) described in further detail below, as well as from those sensors and devices that are wirelessly linked to the restroom convenience center controller 110. The DCU 210 also provides information back "out" of the controller 110 such as to provide the LUI 180 to a stakeholder in the restroom 101. In one embodiment, the DCU 210 receives data from the respective sensors 112 at set time intervals and timestamps the data. It should be appreciated that the DCU 210 may be configured as desired to receive or request information at different time intervals (or even substantially continuously) from different sensors 112. A nonlimiting example would include, for example, as the air quality sensor 156 that may transmit data every second and the water closet automatic activation sensor 151 that transmits data every minute.

With continued reference to FIG. 2, the NIU 220 is another hardware module that can be utilized in accordance with various embodiments, and is responsible for providing access to the Internet 250 by a user 260 such as by a web-based user interface for configuring and viewing system contents, storing historical data, data driven event notification, and a means for notifying an external server of re-supply and predictive maintenance data. The NIU 220, for example, is a Digi Connect ME module. The NIU 220 manages the NIU 220 configuration of: devices, for example, ZigBee nodes; IP parameters; configurable user preferences; provides a full Transmission Control Protocol and Internet Protocol (TCP/IP) stack; provides user notifications; provides predictive maintenance and re-supply algorithm capability; provides a web-based user interface to the system; provides an File Transfer Protocol (FTP) server for code updates; provides an FTP client for code updates; provides timestamp capability; provides historical data on demand; and uses the ThreadX operating system.

Continuing the reference to FIG. 2, the DAN 230 is responsible for managing the wireless device network and providing an interface between attached nodes and the DCU 210. The DAN 230 can, for example, be a MaxStream XBee ZigBee interface module. However, it should be appreciated that various types of networks known in the art may be utilized with the restroom convenience center system 100. The DAN 230 acts as a network coordinator to manage the device network; communicates with attached nodes; and communicates with the DCU 210.

Figure 3:
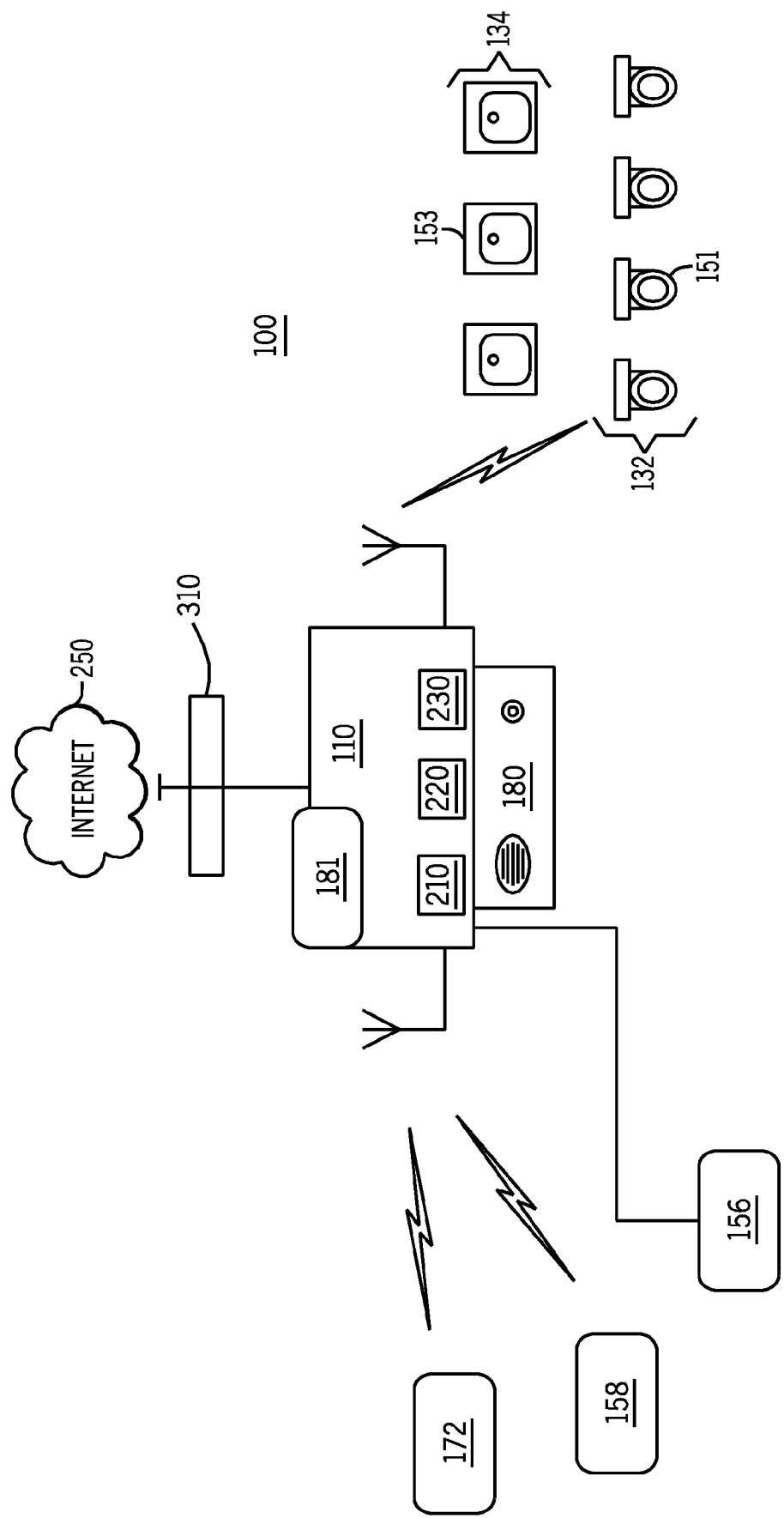
FIG. 3 is an overview diagram illustrating the communication sphere of restroom elements in accordance with various embodiments; included are the various sensors located on the faucets, sensors on the flushometer automatic valves, patron counter, and indoor air quality sensor communicating to the local restroom controller; also included are the other human input devices into the system such as Janitor log in and local user interface, and indoor air quality communicating to the local restroom controller.

As described above, the NIU 220 is responsible for providing a web-based user interface, which is discussed below. With reference now to FIG. 3, in one embodiment of the system the controller 110, such as via the NIU 220 (see, FIG. 4 also), is communicatively connected to the Internet 250 or some other network capable of providing data/communications and allows an end user, such as a system operator, building facilities manager, etc. to interact with the restroom convenience center controller 110 over, e.g., the Internet via "embedded web pages." The embedded web pages can provide various remote interactions with and displays associated with data sensed and extrapolated at the restroom convenience center controller 110. For example, the embedded web pages can allow an end user to acknowledge alerts, reset counters and/or sensors, and perform a "manual" janitorial visit. Additionally, the embedded web pages can provide access to views of all relevant restroom convenience center controller 110 and restroom convenience center system 100 information.

Figure 4:
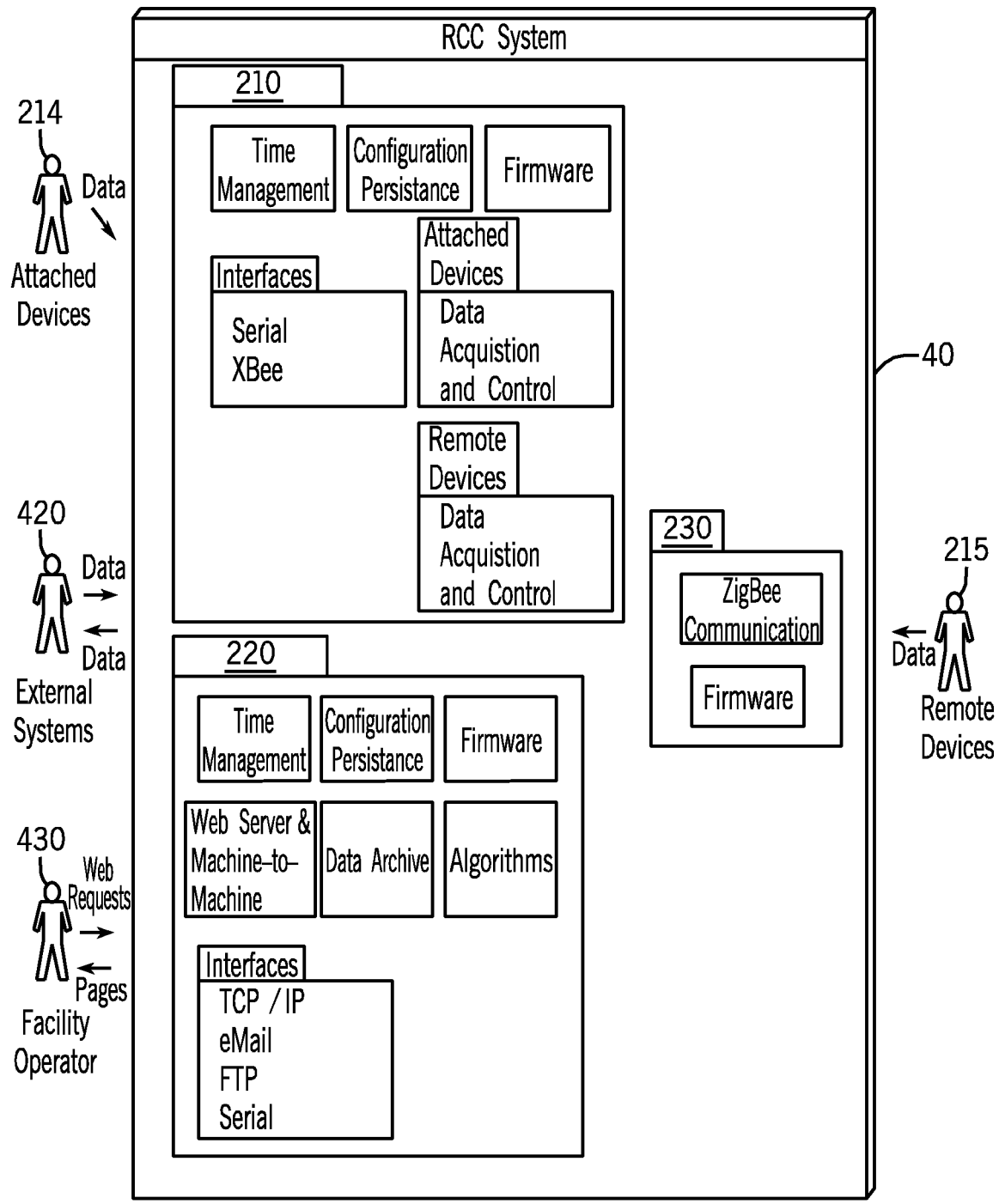
FIG. 4 is a more detailed diagram illustrating elements of the components of the restroom controller of FIG. 2, wherein the additional detail further illustrates the wide variety of functional requirements placed on the restroom convenience center system to provide a flexible and configurable capability for acquiring, processing, and communicating restroom information.

With reference to FIG. 4, a detailed illustration is provided depicting one embodiment of the various restroom convenience center controller 110 elements (DCU 210, NIU 220, and DAN 230) and their corresponding function. The DCU 210 can comprise, but is not limited to, the following modules: a time management module, a configuration persistence module, the firmware, interfaces, e.g., the XBee interface, and data acquisition and control modules for attached devices as well as wireless devices. The NIU 220 can comprise, but is not limited to, the following modules: a time management module, a configuration persistence module, the firmware, web server and machine-to-machine interface, a data archive, various predictive algorithms, and communication interfaces, e.g., for email, File Transfer Protocol (FTP), etc. The DAN 230 can comprise, but is not limited to, XBee ZBee interface module, and firmware.

Figure 5C:
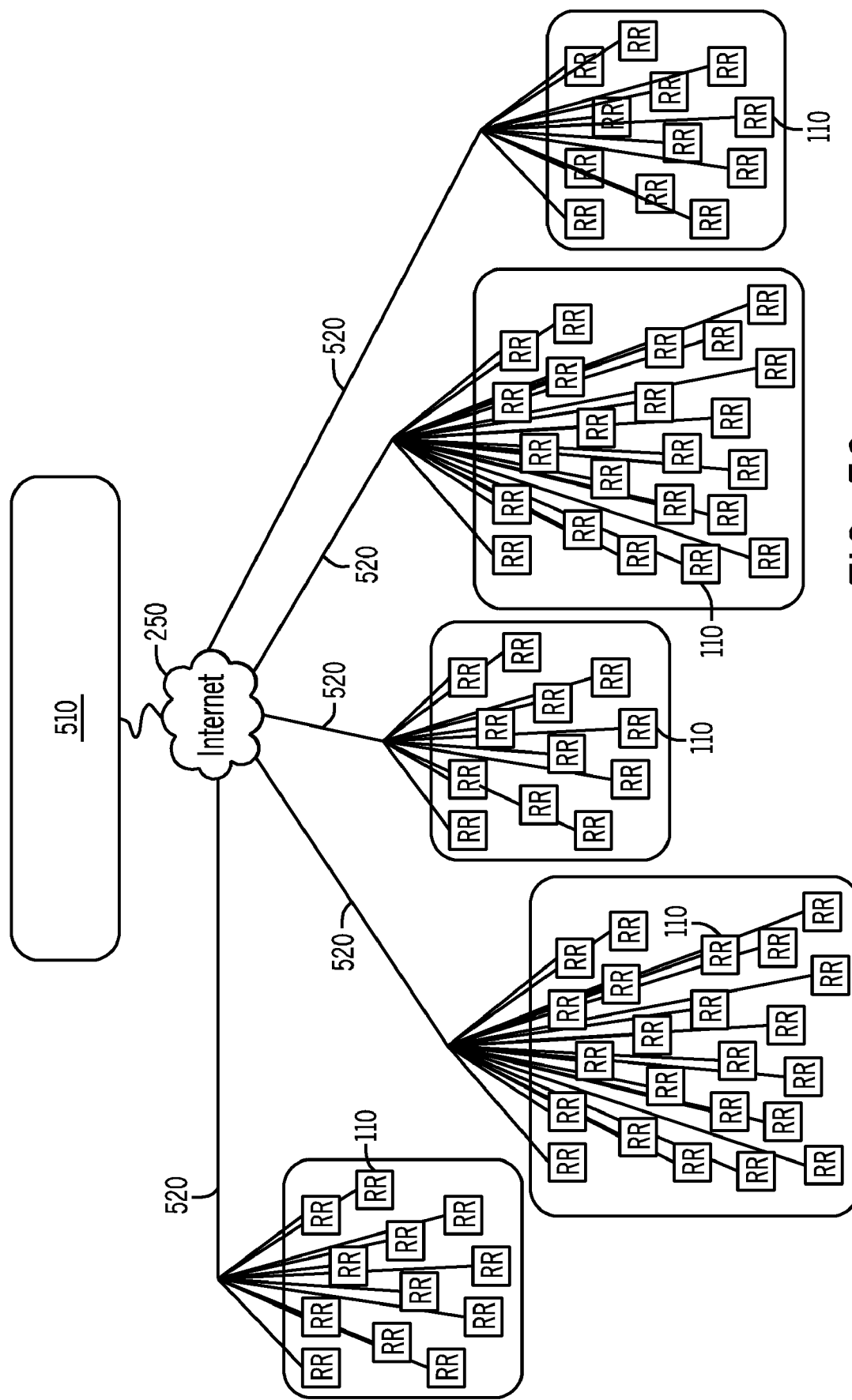
FIG. 5C illustrates an embodiment wherein each restroom convenience center controller for a facility is in communication with an intermediary controller for that facility which is in turn, along with controllers for other facilities, in communication with a NOC.

While generally the restroom convenience center system 100 is referred to in the singular sense, it should be appreciated that in certain embodiments multiple areas of the restroom convenience center systems 100 may be linked to a networked system providing for centralized control and/or data warehousing. Thus, FIG. 5A illustrates a restroom convenience center controller 110 in communication with information sources 111. Typically this represents a single restroom 101, such as shown in FIG. 1. FIGS. 5B and 5C are diagrams illustrating another exemplary aspect of the present invention, wherein a plurality of the restroom convenience center controller 110, each individually associated with their own respective restroom(s), are coupled to a central global command unit, e.g., network operations center (NOC) 510.

Various embodiments contemplate a central monitor and control system associated with a large venue, such as, for example, a convention center, an airport, a school, a hospital or a sports stadium in which a large number of restrooms 101 reside therein. In such an embodiment, each restroom 101 can have its own restroom convenience center controller 110 associated therewith, in which data is received from various information sources 111 therein, and a status communication is then communicated in response thereto. More particularly, in the present example, such data is transmitted over a communication pathway such as a data bus [not shown], through a router [not shown] (optional), to a global command unit over a system level data bus.

With specific reference to FIG. 5B, three separate restroom convenience center controllers 110 are illustrated as being in communication with a NOC 510. The restroom NOC 510 includes a restroom management database 511 allowing for storage and retrieval of information, such as for performing predicting functions as further described below. In addition, it should be appreciated that various software modules may be resident or accessible via the Internet 250 to allow functionality for messaging, predictive maintenance, consumable replenishment, route planning, LEED (Leadership in Energy Efficiency Design) compliance, water conservation, figures of merit, policy compliance, and building and patron safety. Such an embodiment may be useful for controlling all of the restroom 101 within a given facility. FIG. 5C is a further embodiment wherein each restroom convenience center controller 110 for a facility is in communication with an intermediary controller 520 for that facility which is in turn, along with other like controllers 520 for other facilities, in communication with a NOC 510. It will be appreciated that such an embodiment may be useful in monitoring global facilities within a single entity or providing restroom management services to a group of different entities.

Although optional, the intelligent routers [not shown] may be employed in the present example to facilitate an orderly transfer of data to the NOC 510 in an orderly fashion to avoid packet collisions, etc. In one example, the analysis of collected data, discussed further below, is performed at the restroom convenience center and alarm conditions and states are passed on to the NOC 510. However, in another embodiment of the present invention, some portions of analysis are performed at both the restroom convenience center controller 110 level and at the NOC 510 level. For example, to the extent that further analysis is to be performed to compare and/or analyze historical or trend data between the various different restrooms, as is further discussed below, such analysis can be done at (passed up to) the NOC 510.

The restroom convenience center controller 110 will also periodically export accumulated system and device data to an outside server 510 as described above. The system operator may configure the restroom convenience center controller 110 to export none, some, or all of the interim/direct data that it collects from the facilities (e.g. exporting all sensor data from the flushometers, or exporting all accumulated air quality sensor 156 data) which would otherwise be discarded. In addition to this interim data, all accumulated totals (e.g. total flushes, total faucet run time) will be sent to an outside server. Data is sent as, for example, a comma-separated-value (CSV) file attached to a regular email. One skilled can appreciate XML format, SNMP (Simple Network Management Protocol) format, to name a few can equally be applicable. The location of the email server or the type of recipient (machine, human) is unimportant; the only requirement being that the restroom convenience center controller 110 is properly configured to contact an outgoing mail server on its local network (via Ethernet or WiFi).

A key benefit of a centralized approach embodiment, especially when monitoring a very large number of geographically distributed restrooms 101, includes the ability to leverage existing commercial database, knowledge engine, data mining, customer help desk, and customer relationship management software applications when building restroom management applications. Such a large scale system would require, preferably, the computing power to run sophisticated applications on top of the commercial software packages to speed development and reduce development costs. Applications might include predictive failure models based on statistical methods such as the Poisson distribution, dynamic resource scheduling based on queuing theory, route planning, and order forecasting. Alternatively, a smaller scale system may not require a back office to aggregate data from multiple locations, but instead would place a high value on a localized system that is remotely accessible and would likely emphasize different benefits from that of a corporate retail client for instance. While some of the same applications such as predictive failure and route planning might be used with the localized system, they would likely be a subset of the full application resident at the data warehouse.

If an alarm event, or need to take corrective action, is detected by the restroom convenience center controller 110 the alarm text, alarm time, restroom convenience center controller 110 identifier, alarm type, and any alarm-specific data is dispatched to the address(es) configured for that type of alarm. An alarm is only dispatched once while it is active. No new alarms of the type will be sent until the alarm is reset. The alarm is cleared by the restroom convenience center controller 110 if the condition that causes the alarm is reversed. The alarm is cleared by a user, for instance via a restroom convenience center controller 110 web page.

Additionally, actions can be prompted in accordance with various embodiments, such as the generation of work orders. That is, after an appropriate one of the sensors 112 senses a state of one of a plurality of the restroom fixtures 130 described above, e.g., calculating the use of each type of consumable based upon a predetermined average usage for each consumable, the calculated usage for each type of consumable is aggregated to determine a total amount of consumable usage. When the total amount of consumable usage surpasses a predetermined threshold, a work order can be issued by the restroom convenience center controller 110 for replenishing each type of consumable for which the respective threshold has been surpassed. Likewise, when the controller 110 determines, based on the data from the sensors 112, that maintenance (preventative or remedial) is required, a work order, including likely replacement parts, can be generated.

Referring back to FIG. 3, further detail regarding portions of the structure of the restroom convenience center system 100 and the relative interactions of the sensors 112 (such as water closet automatic activation sensor 151 and faucet automatic activation sensor 153), the peripheral devices 113 (such as patron counter device 158, and card reader 172) the controller 110, and communication pathways is shown. FIG. 3, illustrates an overview diagram of a network for effectuating various embodiments.

Generally speaking, all the sensors 112 associated with particular facilities in the restroom 101 (e.g., the patron counter 158, the urinals 134, the consumable dispenser 142, the water closet 132, the faucets 136, etc) can transmit their data to the restroom convenience center controller 110 wirelessly (as described above), to avoid complicated or expensive wiring in the restroom 101. The use of wireless communications in association with automatic urinal 134, the water closet 132, and the faucets 136 allows for application of the described system without invasive work on the restroom. For example, the sensors 112 can communicate with the restroom convenience center controller 110 using, a ZigBee wireless network protocol.

FIG. 3 also illustrates a local area network (LAN) 310 to which the restroom convenience center controller 110 is communicatively connected via, for example, a 10/100 Base T Ethernet or 802.11 wireless, or cellular data connection. The LAN 310 can provide connectivity to and from the restroom convenience center controller 110 and a global command center, e.g., a restroom convenience center controller 110 server and/or the NOC 510 described in greater detail below. The LAN 310 can effectuate communications in the form of a Web interface, email services, short message services (SMS) text for wireless devices using, for example, but not limited to extensible markup language (XML) and/or file transport protocol (FTP).

In one embodiment, a janitor login interface 172, the patron counter 158, and the indoor air quality sensor 156 and the presence sensors 150 are also shown as being communicatively connected to the restroom convenience center controller 110 for gathering and transmitting sensed data to the restroom convenience center controller 110. Additionally, the sensors 112 and the peripheral devices 113 described above can be collectively and wirelessly connected to the restroom convenience center controller 110 as well, again for sensing and transmitting data to the restroom convenience center controller 110.

With continued reference to FIG. 3, the restroom convenience center controller 110 is configured to operate on the LAN 310 of the facility in which it is installed as described to above. Each of the restroom convenience center controllers 110 can be configured, by default, to use a dynamic host configuration protocol (DHCP) to acquire network settings automatically. Each restroom convenience center controller 110 may also be manually configured with fixed network settings if required. It should be noted that for embodiments utilizing Wi-Fi, the restroom convenience center controller 110 may require additional configuration to access the wireless network, including the use of a SSID (Service Set Identifier) code as well as a WEP (Wired Equivalent Privacy) or WPA (Wi-Fi Protected Access) encryption key. Depending on the configuration of the DHCP (Dynamic Host Configuration Protocol) server, it may be necessary to enter additional information manually, such as the SMTP (Simple Mail Transfer Protocol) server required for email delivery. Because the network settings may be configured through the serial port, it is not necessary to access the restroom convenience center controller 110 over the network to modify its network settings, but can be configured via the LUI 180.

In addition, in a preferred embodiment, the restroom convenience center controller 110 can automatically discover active nodes, typically associated with one of the sensors 112 or the peripheral device 113. Through a web interface, e.g., embedded web pages discussed below, a system operator can see a list of discovered nodes and add those nodes to the restroom convenience center controller 110 system. The operator can also manually add nodes to the restroom convenience center controller 110 system in the event that automatic discovery is not possible or feasible (e.g., by adding a battery-operated node).

It should also be appreciated that each of the sensors 112 or the peripheral device 113 may further include an associated identifier, such as a unique identifier used to differentiate the data from one of the particular fixtures 130 from another. For example, it may be desirable for the system to be able to discern the first urinal from the third urinal in the bank of urinals 134 such that 50 actuations of each is not indicative of the need to replace the deodorant but 100 actuations of a single one of the urinals 134 would be indicative.

Regarding the real time clock of the DCU 210, the real time clock 240 allows for time stamping events transmitted to the restroom convenience center controller 110. The use of a "time stamp" for events allows for a determination of elapsed time, such as between events or between an adjustable baseline and an event. Using the real time clock 240, the restroom convenience center controller 110 can also determine the need for certain actions based on the passage of time. For example, the replenishment of consumables and general cleaning may be based on patron volume and sensor activations as previously described, but may also factor in the time elapsed since a previous cleaning.

A. Sensors

As has been discussed above, one component of the restroom convenience center system 100 is the sensor 112 or a plurality of the sensors 112 used to provide information regarding the restroom 101 and stakeholders. According to one embodiment, the system 100 includes at least one of the sensors 112, which may be associated with a portion of the fixture 130 in the restroom 101 or generally monitor a state or property of the restroom 101, such as occupancy. Generally speaking, the sensors 112 will either be "independent" from the fixtures 130 in the restroom 101, such as an air quality sensor 156 or the patron counter 158. Other sensors 112 are dependent, i.e. associated with a fixture 130 to sense a function associated with the given fixture 130, such as signage for current time use of one or more of the fixtures and predicted time to availability or direction to an available fixture 130 or another restroom 101. The invention considers all possibilities for obtaining data, including "inferred" data based on other non-direct measurements, native communications built into the flush valve, add-on modules to transduce the events of interest, and also non-direct methods such as ultrasonically monitoring a plumbing riser and using digital signal processing techniques to uniquely identify the fixture 130 actuation. Some illustrative, non-limiting, examples of the sensors 112 for use with the present invention are described in greater detail below. In a more global view if other like restrooms 101 are present in the same site, the other restroom 101 need have only limited numbers of the sensors 112 relative to a first "typical" restroom 101, thereby allowing accurate prediction of usage in all like restrooms 101. It should be noted however, that not all the fixtures 130 within the restroom 101 need to be associated with and the sensors 112. As will be described below in greater detail, data from one sensors 112 or the restroom 101 may be used to predict the current or future state of the given fixture 130, consumable, or the restroom 101 in general.

It should be appreciated that the number and type of the sensors 112 utilized in any given restroom or series of restrooms 101 may be varied depending on the desired accuracy, reliability, and cost of the system 100. In addition, in one embodiment, the sensors 112 include sensor-level controllers or fixture 130-level controllers [not shown] disposed at that fixture 130 that provide varying types of control based upon the type of the fixture 130 or the sensor 112 associated therewith. Further, the types of the sensors 112 may be varied depending on the particular restroom's venue or usage. While the desired results to be achieved by the restroom convenience center system 100 will vary from user to user, FIG. 6 illustrates a table 610 including one estimate of benefits, needs, or requirements 630 according to the market 620. As can be seen, the importance of various aspects able to be addressed by the restroom convenience center system 100 vary from market to market.

For example, an airport restroom sensor suite might include a presence sensor 150, such as for the automatic urinal 134 and the air quality sensor 156. This sensor suite might be chosen to optimize housekeeping efficiency since an airport typically contains a large number of the restrooms 101 typified by periods of high traffic followed by low or no traffic. Alternatively, a sensor suite for the restroom 101 in an office building might include the door-positioned patron counter 158 and the air quality sensor 156 to optimize the building's image and attention to detail. While not illustrated in FIG. 6, it should also be appreciated that there are other trends along which patterns can be drawn regarding desired restroom convenience center system 100 functionality that drives the particular configuration and level of consumables service of the restroom convenience center system 100 for a given installation. Gender, for example, may play an important role in certain installations. A woman's restroom may include sensors 112 for discerning the presence of liquid as compared to solid waste in a water closet 132, while a men's restroom may include sensors 112 for detecting users in operation of a waterless form of the urinals 134. Further, the sensors 112 utilized may be varied depending on the desired relative importance of various aspects of restroom configuration and maintenance.

Turning now to illustrative non-limiting examples of the sensors 112 that may be used with the present invention, one type of the sensor 112 that may be used is a motion or presence detection sensor 150, such as an IR sensor see (FIG. 1). Typically this type of sensor provides a "state" indication, i.e. a target within the detection zone, yes or no. In combination with a clock mechanism, the presence sensors 150 may derive the length of time of the presence (or absence) of something in the detection zone. It should be appreciated that presence sensors 150 (see FIG. 3) are typically included in automatic actuation sensors such as those used to provide "hands free" flushing of the water closet 132 and the urinals 134 or "hands free" faucet and towel dispenser activation. Thus, many of the "automatic" fixtures 130 within modern commercial restrooms 101 already include sensors that can be used to provide data to the restroom convenience center system 100 in accordance with the present invention. For example, the presence sensor 150 may be associated with the water closet 132, the urinal 134, the faucets 136, the consumable dispenser 142, such a paper towel dispenser, or proximity near the entry/exit door. As has been previously mentioned, a portion of the fixture 130 may be associated with the sensors 112, as shown in FIG. 1 or, alternatively, each of the fixtures 130 may be associated with the presence sensor 150, such as shown in FIG. 3. The presence sensor 150 operates to detect when a valid target (user) enters a detection zone and then send a signal to actuate the device, typically either when the target enters the detection zone such as for the faucets 136 and consumable dispensers 142 or when the target leaves the detections zone for the water closet 132, the urinals 134, the faucet 136 or the entry/exit door.

With continued reference to FIG. 1, one specific type of presence sensor 150 is a water closet automatic activation sensor 151 or urinal water closet automatic activation sensor 151 (collectively flushometer automatic activation sensor 151/152) associated with the urinal 134 or the water closet 132, respectively, that may provide information regarding absolute activations, absolute flow duration, periodic activations, periodic flow duration, status, message count, time of use and battery information. A further type of the presence sensor 150 is a faucet automatic activation sensor 153 that may provide absolute activations, absolute flow duration, periodic activations, periodic flow duration, time of use, status, message count, and battery information.

Additional information is available from typical prior art sensors, such as total activations, battery status, battery door status, time of use, and battery contact status. For example, the restroom convenience center controller 110 can record a running total of activations for each flushometer, and will send alerts and notifications when the flushometer generally indicates that its battery is sub-nominal. A water closet automatic activation sensor 151 can record the number of flush valve activations at the particular water closet 132. The water closet automatic activation sensor 151 passes flush valve activation count information to the restroom convenience center controller 110 via, e.g., a wireless link. Additionally, the water closet 132 flushometer automatic activation sensor 151 keeps a running count of the number of activations locally in some non volatile memory (or can also be sent to a centralized offsite memory in a control center.) Periodically, the water closet automatic activation sensor 151 will relay its absolute count information (as well as other use information, such as cumulative time of use) to the restroom convenience center controller 110. Alternatively, the flushometer automatic activation sensor 151/152 may provide a single output to the controller 110 when the count exceeds a predetermined threshold.

In terms of the faucets 136, the restroom convenience center controller 110 supports collection of all available data from the faucets 136, both battery-operated and hard-wired. Available data can include, for example, total run time, number of on/off water output cycles for each user, water flow (hot, cold, and/or total) and battery status. The restroom convenience center controller 110 records a running total of the run time for each of the faucets 136, and will send alerts and notifications when a battery-operated faucet 136 indicates that its battery is generally sub-optimal.

A further type of the presence sensor 150, not used to trigger activation, may further be used in association with any one of the fixtures 130 to achieve an indication of usage of the fixture 130, time of use and projected time of availability, which can be used for notification to future users of the fixture 130 or even the wait time for all or one of the fixtures 130 for any given restroom 101. This may be of particular relevant for the fixture 130, such as waterless urinals or baby changing tables, where the usage does not require an "activation" and instead just a count and duration. It should further be appreciated that it may be desirable to position the presence sensors 150 where users may be utilizing the restroom 101, but not activating the fixture 130 or using consumables, such as someone merely standing at the sink to use the mirror or collecting a paper towel for personal use.

Other types of the sensors 112 also fall within the spirit and scope of the invention. For example, a water flow sensor 160 is a sensor for measuring the flow of water through a given fixture 130 or supply line. Such the water flow sensor 160 may comprise a simple flow meter. Again with reference to FIG. 1, the sensor 112 may include the water flow sensor 160 associated with at least one water supply line [not shown] for the restroom 101, for example associated with a main water supply line and providing water to the restroom 101. The water flow sensor 160 may provide information regarding the absolute flow and the periodic flow. One such one of the water flow sensors 160 is described in, U.S. patent application Ser. Nos. 12/253,745 and 12/253,745 assigned to the present assignee. Not every one of the fixtures 130 necessarily needs a flow sensor; and indeed if a bank of the fixtures 130 has one connected upstream of the supply, this can enable narrowing down a leak problem to a very finite set of the fixture 130 on a common plumbing wall.

Not every sensor 112 needs be directly associated with the fixture 130. For example, the air quality sensor 156 may be utilized to provide data associated with the air quality within the restroom 101 or a portion of the restroom 101. While the figures and description generally describe the use of the single air quality sensor 156 per restroom 101 positioned to measure the general air quality of the space, it should be appreciated that one or more of the air quality sensors 156 could be positioned to be more highly correlated to space surrounding a particular fixture 130. The air quality sensor 156 may be configured to provide raw gas values and/or air quality values and also detect specific types of gases or air contamination.

The restroom convenience center controller 110 can collect the air quality sensor 156 data from one or more of the air quality sensors 156 installed in the restroom 101. Additionally, the restroom convenience center controller 110 has a provision for one locally-connected air quality sensor 156 although additional sensors 112 can be added via, for example, the ZigBee wireless network. The restroom convenience center controller 110 can also monitor the air quality sensor 156 levels and determine the overall air quality of the restroom 101 from this data. It should be noted that although the restroom convenience center controller 110 does not need to retain the air quality sensor 156 historical data in memory, a system operator may configure the restroom convenience center controller 110 to export this data to an outside server or other internal separate unit for establishing profiles of certain parameters for future predictive use or for threshold evaluations.

Another sensor that need not be associated with the given fixture 130 is a patron counter 158. The patron counter 158 provides a "count" of the passage of an object, such as a user, through a given space. The Patron counters 158 are well known for being able to measure presence and direction of travel and may comprise the presence sensors 150, such as discussed above, or may be the sensors 112 such as those measuring "door swings" by capacitance or other means. Typically the patron counter 158 will be positioned near an entrance or exit (but can be positioned for use with the water closet 132) so as to provide a count of individuals entering and/or leaving the restroom 101. The patron counter 158 may record an absolute count and/or a time period count.

The patron counter 158 may be employed alone or in concert to ascertain traffic associated with the restroom as well as a usage thereof. For example, referring to FIG. 1, a patron counter 158 located at an entrance of the restroom 101 may give a count of a number of people entering and exiting the facility over a given period of time. For a given sampling period of time, the average length of time a person remains in the restroom can be determined. In addition, a second one of the patron counters 158 located at one or more other locations may be utilized to obtain a count of individuals that used the facility. For example, the patron counter 158 may be located at the faucets 136 or at doors of the water closet 132 or other locations. In the above manner, two types of data may be collected to give information relating to what percentage of people entering the restroom 101 actually use the water closet 132, etc., as opposed to, for example, simply using the mirror for grooming or other purposes. The average length of time for a given period of time of a person remaining in the restroom 101 can be compared to the average service time for each of the fixtures 130 and that comparison can dictate whether a person will experience a queue time (wait time) or not and even impact service time or scheduling action for that fixture. With more advanced modeling of the monitored times, probabilistic models can be simulated and effectuated in realtime to obtain more predictive expectations of how long a user may expect to wait and then output that information for display to the user.

Figure 9:
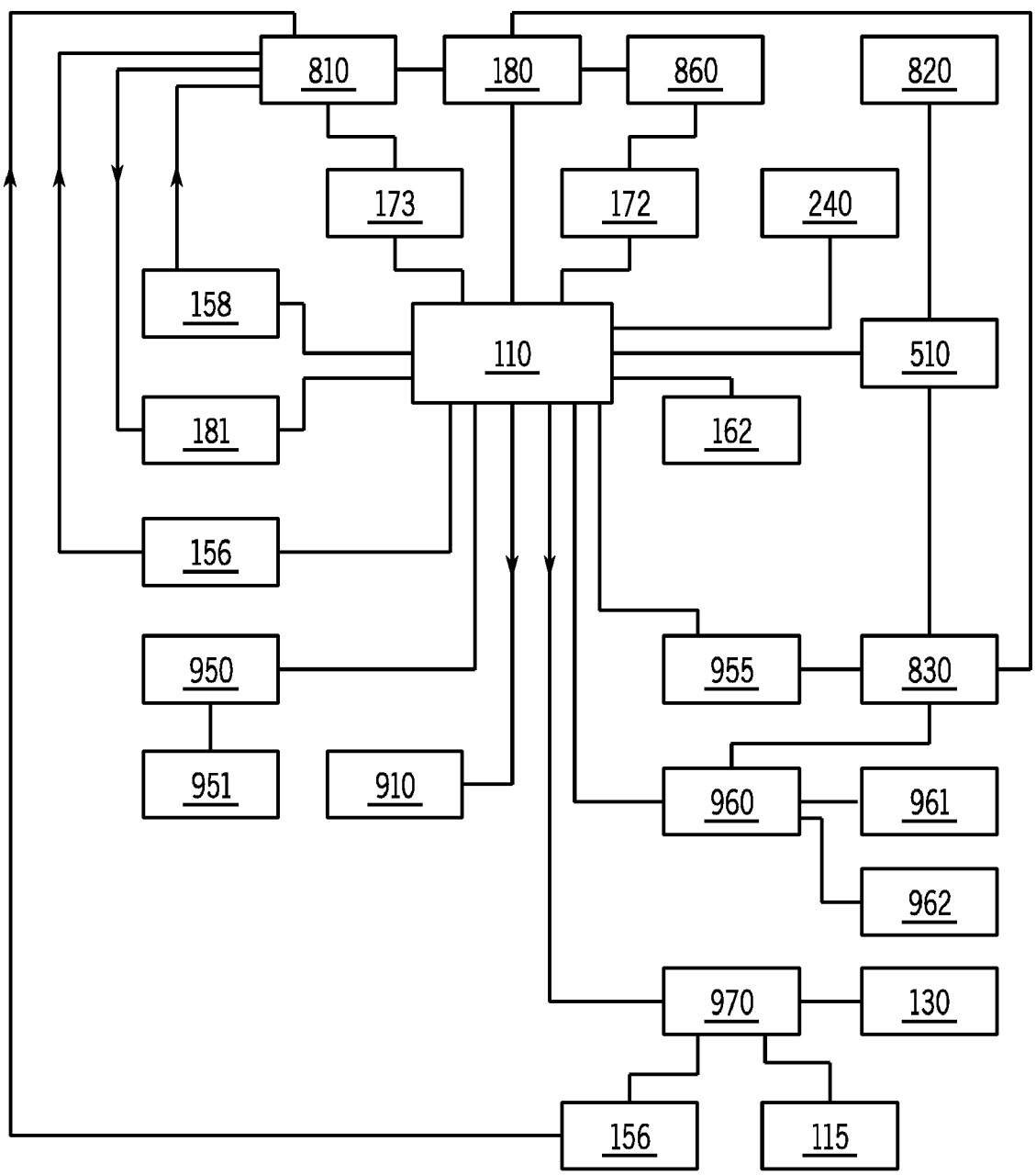
FIG. 9 is a more detailed overview diagram showing the restroom of FIG. 3 specifically the elements feeding into and out of the restroom convenience center controller.

Yet another of the sensors 112 that may be utilized without associating specifically with the fixture 130 is a temperature sensor 162 (FIG. 9). The temperature sensor 162 may be internal or external to the restroom 101 or both may be provided. Further, the temperature sensor 162 may be a component of the HVAC system. Such information may be relevant to future service actions or provide predictive information as to the fixture 130 use and consumables replenishment (such as the outside temperature being extremely hot or cold resulting in changes of restroom use.

As discussed regarding other aspects of the invention, the presence sensors 150 may include a time element for detecting the duration of a use (i.e. the duration of the presence detection). Other ones of the sensors 112 in the restroom 110 may include the sensors 112 employed to identify the presence of consumable supplies such as water closet paper, paper napkins, soap, and other products such as deodorizers and/or sanitizers.

As was generally mentioned above regarding the data collection by the DCU 210, the timing of data collection may vary depending on information source 111. For example, the patron call device 173 for a patron and the tamper switch or sensor 181 may provide asynchronous data collection, sending a signal to the DCU 210 whenever they are "activated". However, the air quality sensor 156 and the temperature sensor 162 may provide data in regular time intervals. Further, the data may be provided as a "pull" by the controller 110 from the information source 111 or "push" from the information source 111 to the controller 110.

Although a single one of the sensors 112 is illustrated in FIG. 1 as being associated with a given fixture 130, and the present application generally refers to sensor in the singular when referring to the sensorization of a single fixture 130, it should be appreciated that multiple sensors 112 having differing functions may be employed on the given fixture 130, as may be desired. In one example, each water supply line (not shown) associated with the individual water closet 132 or the urinal 134 may also have the water flow sensor 160 associated therewith to measure the volume of water (as opposed merely to the activation of the water closet 132 or the urinal 134 by the water flow sensor 160).

In addition, each of the sensors 112 may include the ability to "discern" more than one aspect of the restroom 101. For example, the sensor 112 may include a number of individual sensor units spaced together or apart. For example, it may be desirous to use multiple patron counters 158 to form a larger detection area within a singular restroom 101. In addition, some of the sensors 112 may provide additional data that relates to more than one aspect of the restroom 101. One example would be the air quality sensor 156. In certain embodiments, the air quality sensor 156 not only provides an output signal proportional to the summation of a broad class of Volatile Organic Compounds (VOCs), but it is possible to extract timing information from the output signal that can be used for pattern recognition. The VOC output signal in combination with the extracted timing information and pattern recognition can be used to predict and discriminate activities such as cigarette smoking from other VOC generating events.

In another illustrative example, as previously discussed, the flush valve of the fixture 130 may have the sensor 112 that can provide an indication of when an individual is present, when they have left, and how long they were present in addition to when the flush valve is triggered. For a flush valve associated with the presence sensor 150, data gathered may include the occurrence of a complete flush cycle, the manner of actuation, i.e. manual or automatic, the type of flush selected, such as a partial flush or a full flush, and the length of time the presence or actual use was detected, such as to indicate either solid (longer time) or liquid (shorter time) waste in the water closet 132. Further, based on the type of sensor 112 employed, various differing states associated with the fixture 130 may be monitored, such as "standby" (no valid target/user within the detection zone), "armed" (valid target/user detected), and "flushed" or "activated" (user is serviced and leaves the detection zone) for the water closet 132 or the urinal 134. In addition, a timer may be used, such as equivalent to the "armed time" of automatic activation sensors, to provide information regarding the length of time a user is "present" at the water closet 132, the urinal 134, the faucet 136, the consumable dispenser 142 or other restroom device. This time value can be used to generate "service" or use time for that particular fixture 130. Collecting and analyzing the service times for a particular user population time span can be analyzed within the system software to predict or to report status of the asset and to anticipate service needs. This reporting can be for maintenance scheduling or for signaling users as to the wait status they may encounter by using the restroom 101 or any selected one of the fixtures 130 of their choosing.

In certain embodiments, the predictive aspects of the invention described below may be used to predict the state of one of the restroom 101 from the sensor data from another. In such an embodiment, it is preferable that the "dependent" restroom 101 include at least one sensor 112 of the same type as the primary restroom 101, such as a patron counter 158, to allow for normalization and benchmarking between the two restrooms. This capability can enable reduction of sensor 112 needed and simplify service action.

B. Peripheral Devices

The restroom convenience center controller 110, as described above, is able to accept input from stakeholders for various purposes and shown generally in FIGS. 2 and 9. The restroom 101 control system, in one embodiment, further comprises a patron call device 173 for the purpose of indicating an unsatisfactory condition in the restroom 101 e.g., an alarm notification upon a user activation thereof. The input to the restroom convenience center controller 110 can be effectuated via a simple momentary input, e.g., a switch or touchless sensor. Alternatively, voice input such as via recording a patron voice message or a "live" chat with an operator can also be implemented. Therefore, when a patron activates the patron call device 173 (FIG. 1) input, the restroom convenience center controller 110 assumes that an unsatisfactory condition now exists, unknown to owner, in the restroom 101 and that service is required. The restroom convenience center controller 110 can additionally dispatch any notifications or alarms that would be required because of this action. The restroom convenience center controller 110 can also record the timestamp of all patron activations and export this information to an outside server, e.g., the restroom convenience center controller 110 server, on a periodic basis.

The patron call device 173 may also include a confirmation aspect, such that a user must confirm the activation to avoid accidental or prank patron calls. In one example, the patron call device 173 is generic and simply indicates a user need in the restroom 101. In another alternative, the patron call device 173 contains multiple buttons or indicators and a graphical user interface, and is configured to send data relating to specific requests, for example, a maintenance request, a supply replenishment request, or a medical emergency. In one embodiment, the system 100 is configured to monitor the status of a patron call, such as patron calls not yet confirmed, response status for confirmed patron calls, and historical number of patron calls.

It should also be noted that the restroom convenience center controller 110 or individual sensors within the restroom 101 can include or be locally connected to one or more of the tamper sensors 181. The tamper sensor or switch 181 can detect when an outer casing of the restroom convenience center controller 110 is removed or otherwise tampered with and effectuate an alarm condition or notification.

In a further embodiment, a janitor and/or maintenance interface 172 is provided. The restroom convenience center controller 110 can accept input from a standard radio-frequency (RF) contactless card reader to allow individual janitorial staff to indicate that the restroom 101 has been serviced. If a janitor activates the card reader, the restroom convenience center controller 110 assumes that any previously indicated unsatisfactory conditions have been resolved, and that consumable resupply has occurred. In one embodiment, the restroom convenience center controller 110 records the time, duration, and identity of all janitorial visits and exports this information to an outside server on a periodic basis as well.

In one embodiment, the janitor and/or maintenance interface 172 (FIGS. 2 and 9), described above is used to create the electronic version of a "restroom serviced" clipboard displayable on a graphical user interface, such a LUI 180. When a janitor activates the interface 172, the date and time is recorded. When the janitor completes servicing the restroom 101, the janitor interface 172 is reactivated thereby creating a record of the duration of service personnel visit. Additionally, the janitor interface 172 can record the identity of the servicing janitor. A method for recording the service provided by the maintenance personnel (i.e. general re-supply, cleaning, etc.) is also provided. The ability to reset predictive algorithms to a baseline condition based on re-supply by maintenance personnel is provided as well, in addition to the ability to enter actual consumables inventory for fine tuning of predictive re-supply algorithms.

Further, the LUI 180 may be provided within the restroom 101. The LUI 180 can provide an interface for patrons and/or servicing personnel, such as janitors, access to the restroom convenience center controller 110 for reporting certain conditions as described above. Thus, the LUI 180 may serve as the patron call device 173 and the janitor login interface 172. In addition, the LUI 180 can be utilized when configuring the restroom convenience center controller 110 via, e.g., a laptop computer, PDA, or other processor. For example, patrons can utilize the LUI 180 to indicate that the particular restroom fixture 130 or asset needs servicing or attention in accordance with a patron-specific LUI 180 screen, while another LUI 180 screen can be displayed when a janitor accesses the restroom convenience center controller 110. That is, when a janitor accesses the restroom convenience center controller 110, an electronic "restroom service" clipboard can appear.

C. Restroom Convenience Center System Operation

The sensors 112, communications pathways, and the restroom convenience center controller 110 function to provide stakeholders with information regarding the historic, current, and predicted conditions in the restroom 101. Although the methods and functionality are illustrated and described below as a series of acts or events, it will be appreciated that the present invention is not limited by the illustrated ordering of such acts, events, or functionality. For example, some acts may occur in different orders and/or concurrently with other acts or events apart from those illustrated and/or described herein, in accordance with the invention. In addition, not all illustrated functionality may be required to implement a methodology or system in accordance with the present invention. The methods of the present invention, moreover, may be implemented in association with the devices illustrated and described herein as well as in association with other devices and systems not illustrated and utilize various combinations of components.

Figure 7:
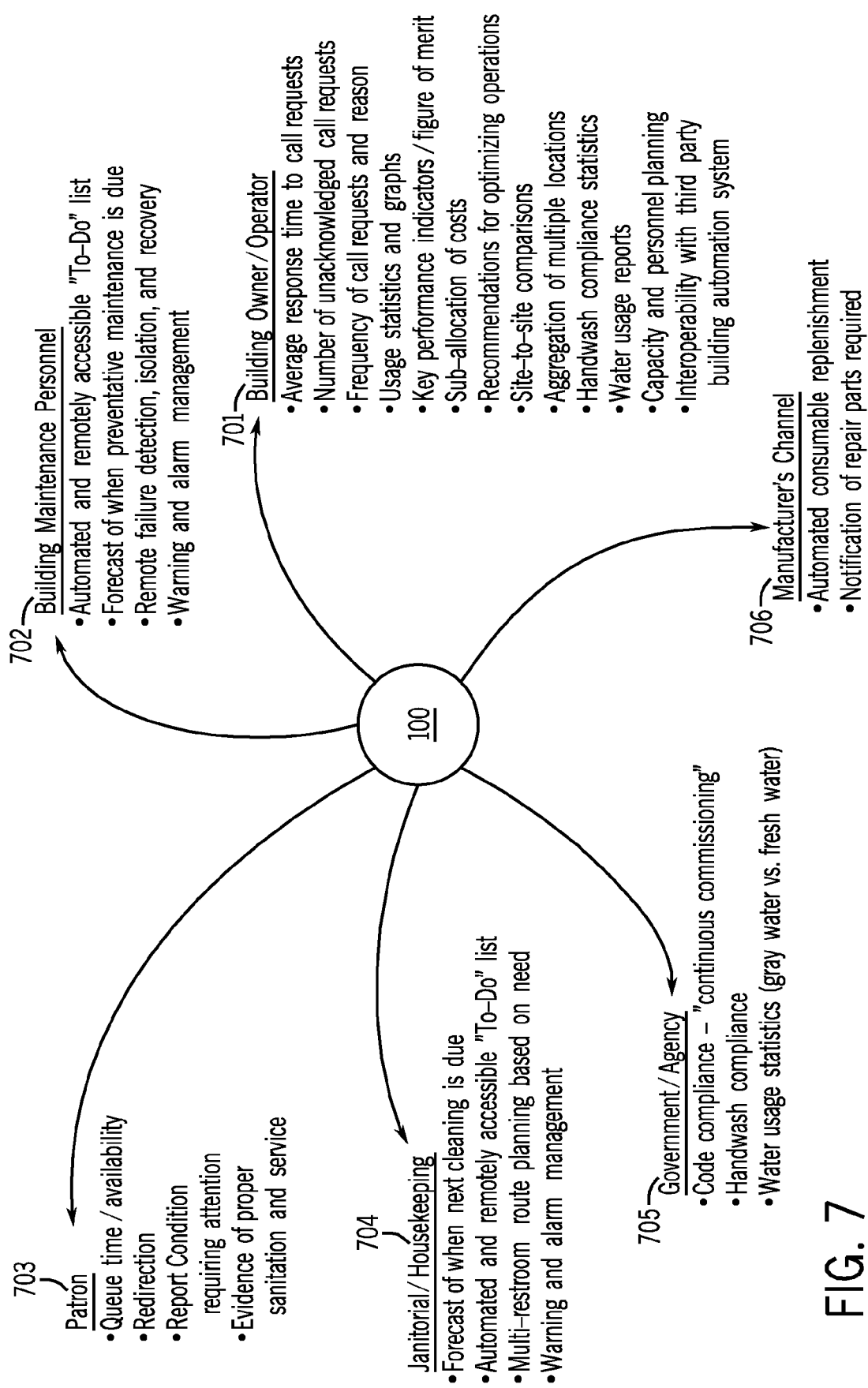
FIG. 7 illustrates one non-exhaustive list of stakeholders and the information provided by the restroom convenience center system to and/or used by those stakeholders.

Various stakeholders have been previously discussed in regard to interactions and usage of the restroom convenience center system 100. FIG. 7 illustrates one non-exhaustive list of stakeholders and the information provided by the restroom convenience center system 100 to and/or used by those stakeholders, including building owner/operations 801, building maintenance personal 702, patrons 703, janitorial/housekeeping 704, government agencies 705, manufacturer 706.

Figure 8A:
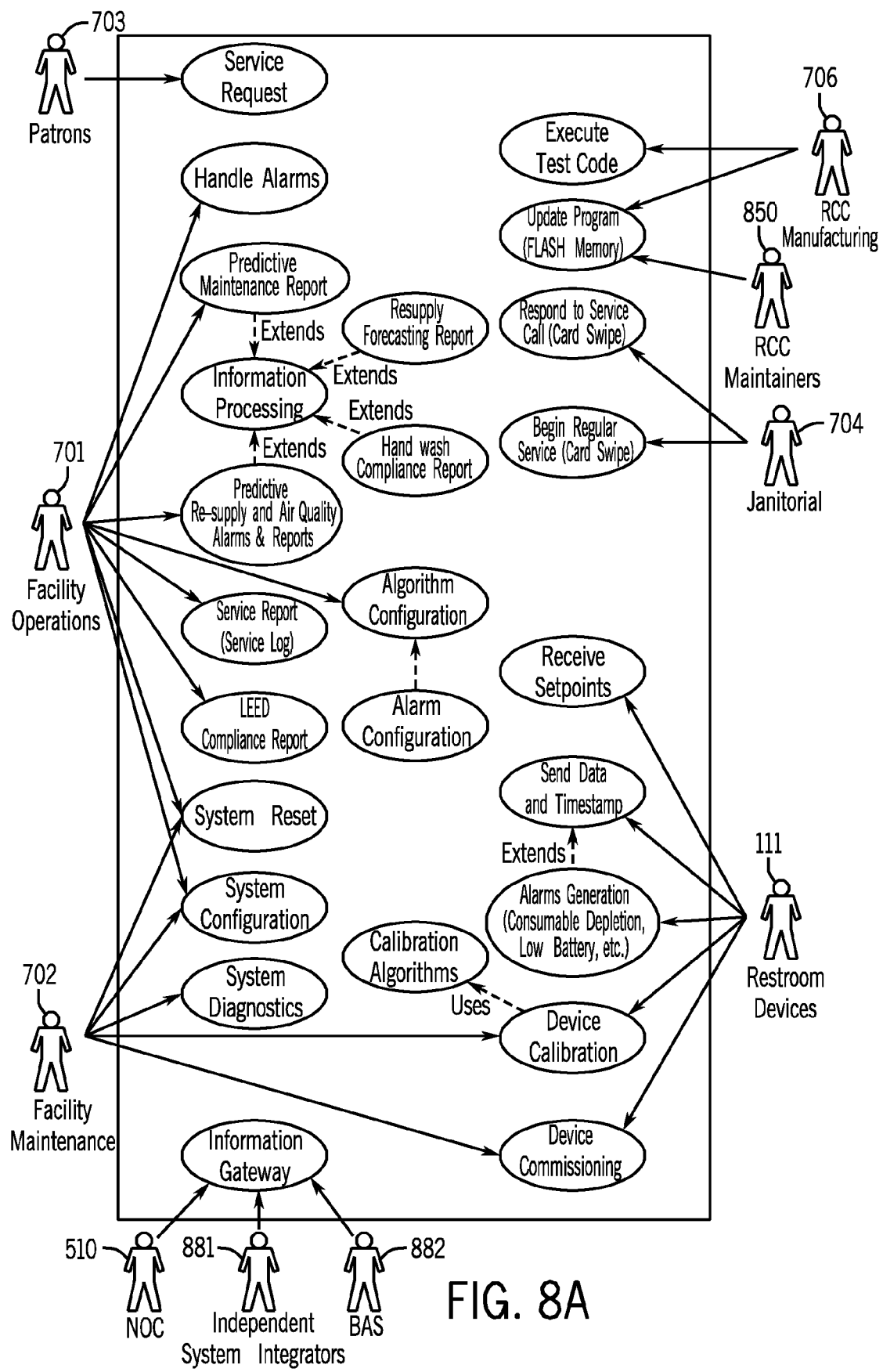
FIG. 8A is a first block diagram illustrating actions and events supported by various embodiments and how individual stakeholders would typically interact with the restroom convenience center system in a real-life scenario; the Network Operations Center (NOC), system integrators, and other Building Automation System (BAS) interfaces would typically be serviced through a separate "Information Gateway" interface which would provide higher level information objects than that required by the other stakeholders.
Figure 8B:
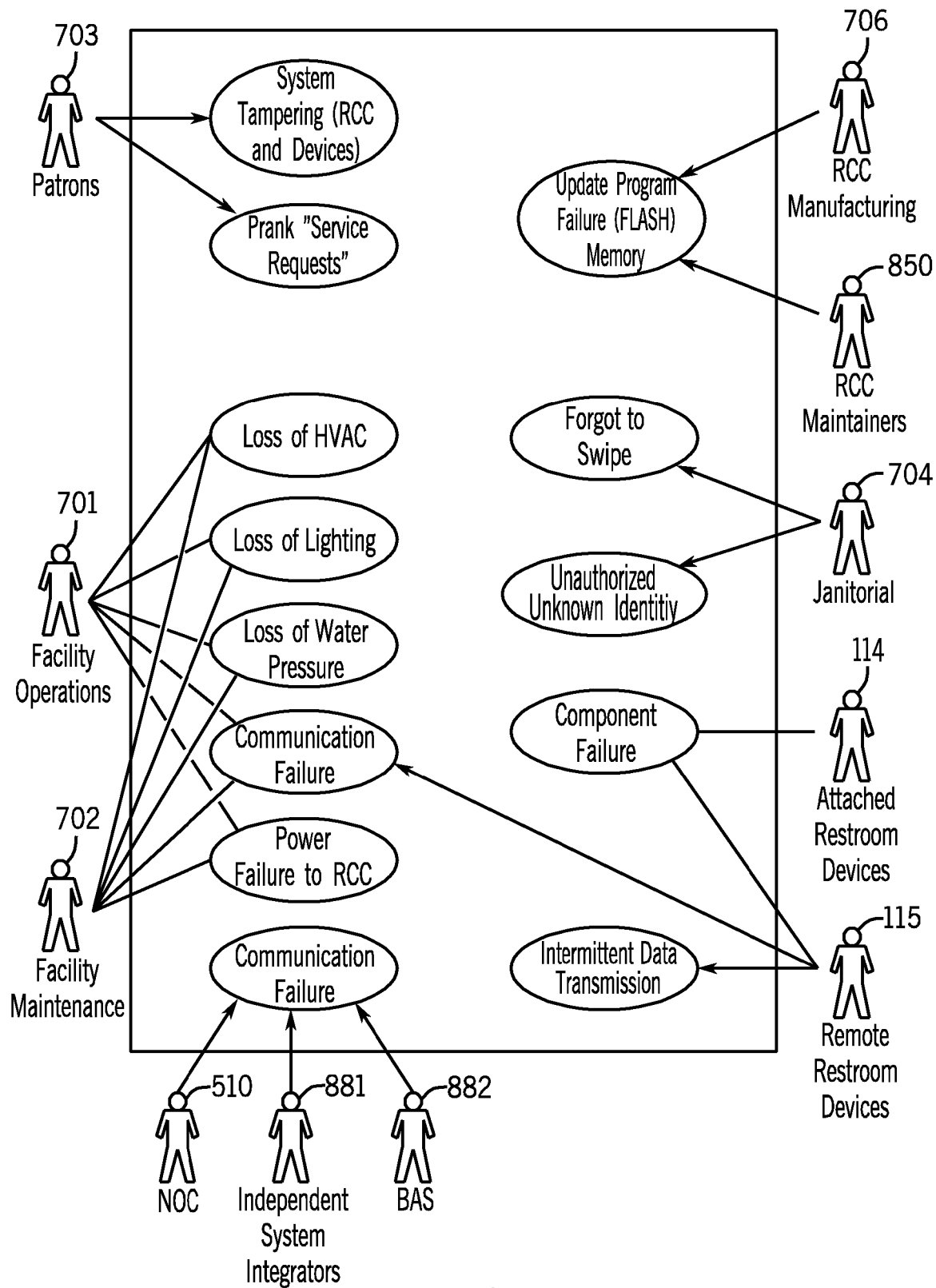
FIG. 8B is a second block diagram illustrating additional actions and events supported by various embodiments showing a particular emphasis on off-normal or the response to various failure scenarios.

More specifically, FIGS. 8A and 8B are detailed diagrams representative of various actions, events, and/or interactions that are contemplated in accordance with various embodiments. The stakeholders illustrated in FIGS. 8A and 8B are the patron 703, facility operations 701, facility maintenance 702, restroom convenience center system 100 manufacturing 706, restroom convenience center system maintainers 850, janitorial 704, and information sources 111. It should be noted that although FIGS. 8A and 8B represent human actors, such roles can comprise systems and devices, e.g., facility operations can be personnel as well as facility operations management systems.

FIG. 8A illustrates various actors and/or roles that may interact and be associated with restroom convenience center system 100 described herein in accordance with various embodiments, wherein such activities can be considered to be frequently performed. In the embodiment of FIG. 8A patrons 703, for example, can interact by way of service requests. It should be appreciated also that patrons 703 will interact with the restroom convenience center system 100 though their use of sensorized portions of the restroom 101, such as the urinals 134 or the faucets 136. Additionally, patrons' 703 actions can be directed and/or motivated by announcements, directions, etc., to, for example, move on to a different restroom facility due to long wait times being anticipated for use of the restroom 101 or the fixture 130 being disabled or wait times for the fixtures 130 being excessive. Facilities operations activities include: handle alarms, information processing (such as a predictive maintenance report, resupply forecasting report, and predictive resupply and air quality alarms and reports), alarm configuration, algorithm configuration, service report, LEED compliance report, system reset, and system configuration.

Facility maintenance activities may include: system reset, system configuration, system diagnostics, device calibration, algorithm calibration, and device commissioning restroom convenience center system 100 manufacturing activities include executing code testing and updating programs such as by flashing memory. Those monitoring the restroom convenience center system 100 may also perform updates to the programming.

Janitorial activities include responding to service calls and regular service of the restroom 101, but of which may involve the janitor login function. The restroom 101 devices, such as the fixtures 130, and other services devices also may interact with the restroom convenience center system 100 to perform activities such as receiving set points, sending data and timestamps, alarming generation, device calibration, and device commissioning. The NOL 510, independent system integrators 881 and BAS 882 all provide information gateway activities.

Those activities that are likely to occur less frequently are illustrated in FIG. 8B. For example, the patron may perform prank service requests or tamper with the restroom convenience center system 100. The facility operations and facility maintenance may experience a loss of HVAC, lighting, water pressure, communication, or power. The restroom convenience center system 100 manufacturing and restroom convenience center system 100 maintainers may experience a failure of the program updating. The janitorial staff also may forget to utilize the janitor login interface 172 or the login may result in an unknown or unauthorized entry. The restroom 101 devices may experience component failure or, particularly in the case of wireless devices, intermittent data transmission or total communication failure. Likewise, the NOC 510, independent system integrators 881, and BAS 882 may experience communication failure.

Thus, each stakeholder has certain activities and interactions with the restroom convenience center system 100, including potentially problematic interactions or indications that can be addressed by the restroom convenience center system 100. For example, the restroom convenience center system 100 can sense and respond to patrons that tamper with the restroom convenience center controller 110 and/or the fixtures 130, the sensors 112, the counters 158, etc. As described above, the restroom convenience center controller 110 can also distinguish between real and "prank" or accidental service requests. Additionally, through the use of the restroom convenience center system 100, facility operations and maintenance personnel or systems can be apprised of and respond to a loss in heating, ventilation, and air conditioning (HVAC) services, loss of lighting, loss of water pressure, communication failures, and power failures (e.g., to the restroom convenience center controller 110). Restroom convenience center controller 110 manufacturing and maintenance personnel can perform code testing and program updating with regard to, for example the restroom convenience center controller 110. Janitors on the other hand, can respond to service calls or simply being routine and regular service, and log such service by way of swiping a smart card (or other identifying device). Additionally, janitorial staff that either forgot to swipe their card or result in unauthorized entry/ unknown identity can also be sensed and addressed in the restroom convenience center system 100. Interactive Stakeholders, such as NOC 510 operators, building automation system (BAS) operators 881, and/or independent system integrators 882 can access the restroom convenience center system 100 via some manner of information gateway (e.g., embedded web pages, LAN connection, etc.) For example, if the updating program function (via flashing the memory) fails, restroom convenience center controller maintainers 850 and/or manufacturing personnel 706 can interact therewith. In addition, the restroom fixtures 130 can interact with the restroom convenience center system 100 via the use thereof, where set points can be received, data and timestamps of such usage or determined and transmitted, alarm and/or notification generation. It should be noted that the calibration of algorithms, device calibration, as well as device commissioning can be effected by or in response to usage. Moreover, failed or intermittent communications with and the failure of wired information sources 214 and wireless devices 215 can be sensed and addressed as well.

Whereas FIGS. 1 and 3 illustrated overview diagrams of a restroom 101 and its respective elements, e.g., the restroom fixture 130, the sensors 112, activators, etc., FIG. 9 is a more detailed illustration of the elements, users/service staff, communications aspects, and interactions there between. FIG. 9 illustrates a restroom convenience center controller 110 as the "hub" of the restroom 101. Certain of the peripheral devices 113 and/or the sensors 112 are shown to be connected to the restroom convenience center controller 110, e.g., the patron counter 158, plumbing devices, temperature sensor 162, the tamper sensor or switch 181, and the air quality sensor 156 being hardwired to the restroom convenience center controller 110 and a second one of the air quality sensors 156 being wirelessly connected thereto. Additionally, various bathroom controls and machine-to-machine links to external systems are shown with respect to the restroom convenience center controller 110.

D. Restroom Convenience Center System Operation—Capturing Sensor Data

Figure 10:
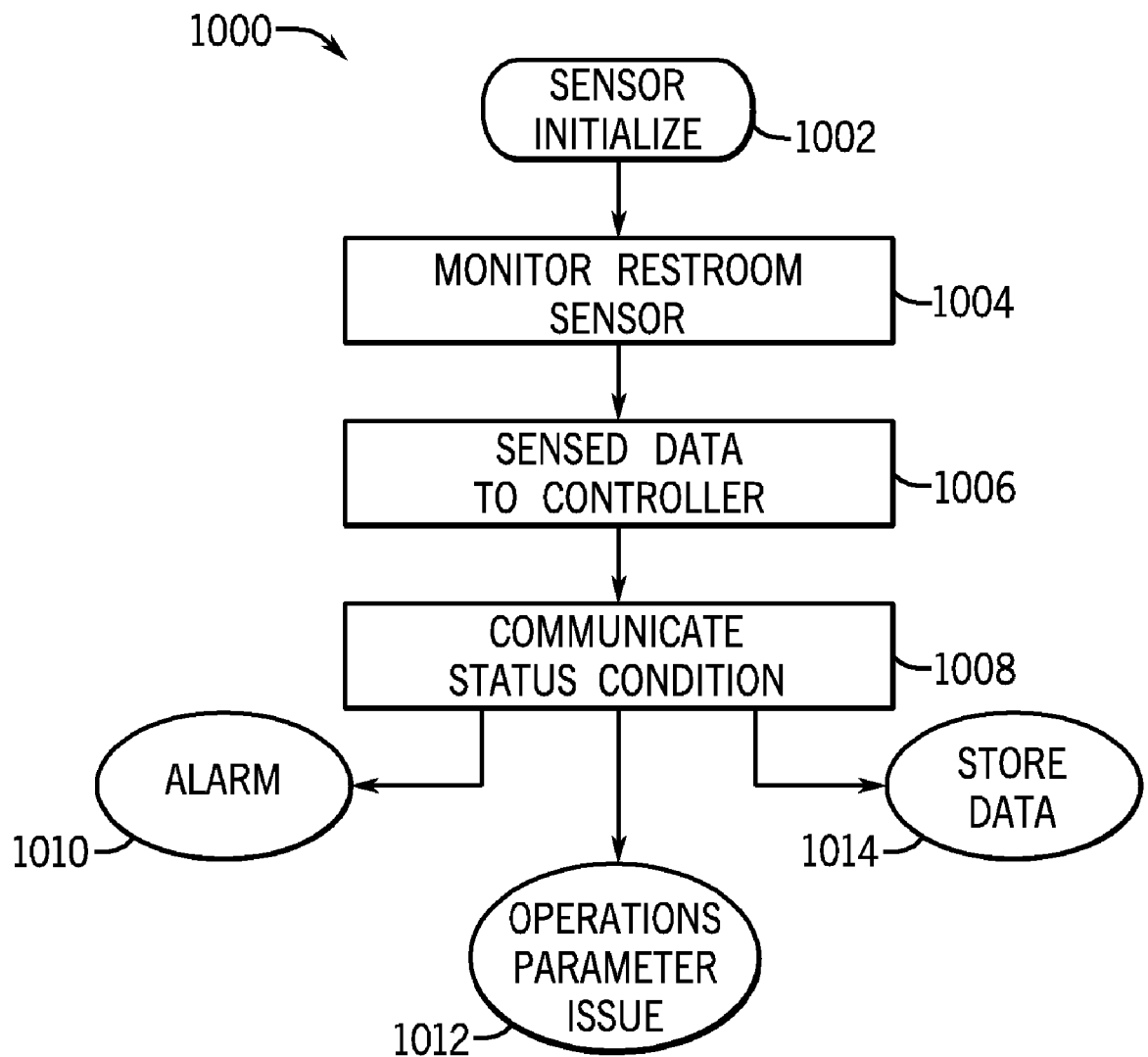
FIG. 10 is a flowchart illustrating a method of monitoring and processing restroom sensor data according to an embodiment.

In the broadest sense, the sensors 112 employed within the restroom 101 and/or the fixture 130 controllers pre-assigned functions by monitoring, and/or sensing one or more first pieces of data therein at 1004 (FIG. 10). For example, a patron counter 158 (see FIG. 1) is operable to identify a traffic amount within the restroom 101 to generate a count associated therewith. A presence sensor 150 is operable to identify when the water closet 132 or the urinal 134 is flushed to likewise generate a count (and also timing information as described herein). As described herein, timing information can also be collected and used for user information and predictive purposes as well which will be further described hereinafter.

As illustrated in FIG. 10, the sensor 112 sends the data associated therewith to a respective restroom convenience center controller 110 in a series of steps. At step 1002, the sensors 112 are initialized. At step 1004, the sensor is actively monitoring the restroom 101. At step 1006, sensed data is sent to the controller 110. At step 1008, the status condition is communicated based on an analysis of the sensed data. At step 1010, an alarm is sent. At step 1012, operations parameters are issued. At step 1014, data is stored. The restroom convenience center controller 110 is configured to receive such data and through the use of predictive algorithms, heuristics, and/or inferential statistics applied to the data, infer information, such as a status condition of the restroom 101 associated with the respective functions at 1008.

In one embodiment, the sensor data is brought into the restroom convenience center system 100 using a selected media and protocol, but the sensor's functional profile remains the same with the data being "normalized" when it is stored in memory. An application programming interface (API) can then be used to flatten out the hierarchical representation of the sensor data to ease the burden of application development. This embodiment provides for improved speed of application development and flexible and modular communication options due to the normalized data forms used for the sensor data. A program needing access to the data from the sensors 112, such as to make probabilistic predictions described below, would access only the required parameters rather than a sensor's full functional profile variable set. The sensor and device data formats may be defined by a schema. The "flattened" sensor data may be provided as "Meta" data to an application, simplifying the need for tedious parsing operations.

The status condition can thus be considered to be indicative of a need for at least one corrective measure and is communicated, such as to the NOC 510, a cell phone, PDA, computer workstation, or other devices, wherein such status conditions can initiate the transmission of a fault or alarm notification (actionable or informational), one or more operating parameters, or a data report relating to use or traffic in the restroom 101 at a given time or over a period of time.

In one embodiment, information regarding changes over time are utilized as well as static "snap-shots" regarding the state of the restroom 101. For example, the air quality sensor 156 may detect a high VOC level. This may be predictive of either usage of high water volumes by the water closet 132 or may be predictive of a clogged form of the water closet 132. Thus, to discriminate between the events of the example above (high VOC associated with usage vs. a clogged bowl) logic may be used. For instance, one method would be to first examine the rate of change associated with the air quality sensors 156. Next it would be valuable to know whether the restroom 101 is currently occupied, such as from the state of the presence sensors 150. An examination of the time stamps for multiple flushes might also help to discriminate between a legitimate air quality sensor 156 event in the making vs. a clogged bowl. It should be appreciated that a combination of logic, statistics, and pattern recognition can be combined to provide a high probability of forecasting the state based on indirect sensor inputs. This type of timing analysis also is applicable to other of the fixtures 130 in the restroom 101.

Based on the received data, the controller 110 is further operable to ascertain and communicate a status condition associated with the various monitored functions. For certain data, the restroom convenience center controller 110 may include a "threshold" value for which the respective sensor data is accumulated until the respective threshold is exceeded and a status condition is determined. Thus, the state table 1200 (FIGS. 12A-C), discussed below, is not utilized to determine the state of the restroom 101 until the appropriate values for each of the sensors 112 are reached. Thus, values corresponding to different time windows may be combined when determining the state. In one embodiment, the controller 110 is operably coupled to the one or more sensors 112, and configured to receive first states data therefrom associated with a first set of features, which the sensors 112 monitor, to determine second state data associated with a second set of features not necessarily monitored.

E. Threshold

In one embodiment, the restroom convenience center controller 110 estimates the future state of the restroom 101, or the fixtures 130 or other features or components within the restroom 101, by determining the current state of the restroom 101 or the components therein and evaluating such current state information over time. One manner of determining the current state is through the use of a state table 1200. The process of populating the state table may vary widely depending on the specifics of the application. For example, for purposes of consistency, a fast food restaurant chain may want all the restroom convenience center system 100 state tables to operate strictly in accordance with a set policy or combination of policies. This is in contrast to an application such as an airport where responsiveness to prioritized needs drives a requirement for the system to be adaptive. In the former case, an application would simply compare the normalized sensor data with the "pre-determined" table of allowable states complete with pre-determined thresholds and weightings. The latter case will involve conventional and well known stochastic methods and predictive models, such as the finite Markov chain. Markov is a stochastic methodology which predicts a future action based upon existing data and probabilities of future states. If a restroom is at state 5 according to FIG. 12 patron visits are very high and a patron call button has alarmed. In a Markov decision chain a change state can be decided by several approaches concerning the probability of those approaches, In state 5 a.) the patron visits could reduce and no further patron calls will be experienced, or b.) the patron visits will remain at the present rate OR increase without a further patron call received. The actual probability for each of the above (as well as others that can be considered) can be estimated and a decision/action made based upon the probabilities. As can be seen, as more system data is accumulated and processed, information about traffic patterns at specific times can affect the probability that patron visits will reduce simply because the system has learned the new information and it was extrapolated in the probability. Also see the data of FIGS. 22A-22D and 23A-23D, which show the behavior of such patron visits, and a look up table can be utilized for performing the above described Markov decision process. Using such known stochastic methods, it should be possible to predict the restroom 101 state at a future point with higher accuracy occurring over time. The state table 1200 includes a list of states 1210, sensor data 1220, and the response 1230 corresponding to the state. While the state table 1200 of FIGS. 12A-C includes 64 possible states, it should be appreciated the possible states are a function of the number of inputs and also that using a similar technique to a Karnaugh-map they can be factored down into a lesser set of discrete response scenarios. Fuzzy logic may be applied to the data contained in the state table that takes into account prior states, trending, and predicted next state.

It should be appreciated that a wide variety of factors may exhibit a correlation, to one degree or another, with the "state" of the restroom 101, a portion of the restroom 101, or a consumable within the restroom 101. For a given installation, it is desirable to utilize the fewest number of the sensors 112 necessary to provide the desired levels accuracy and precision in predicting future states of the restroom 101.

Thus, in one embodiment, the system 100 is configured to utilize a wide variety of information to determine the appropriate state table 1200 reflective of the restroom 101 and/or the facility as a whole. It should be appreciated that any combination of information may be used to establish the thresholds and state table and that some measure of increased accuracy of the predictions can be achieved the more information is used. Such information may include useful data relating to the restroom 101, including layout, location within a building relative to patron traffic and content, to the general user, including gender and age, to the facility in which the restroom 101 is located, including purpose such as school or office building and layout such as whether the restroom 101 is located near a lunch room or other heavy patron traffic and relating to external factors such as temperature and calendar date or other external factors which are particularly significant or unusual days of the year or widespread illness of users (of which all the above parameters can be entered into the system predictive function) indicative of predictable use level information. Such information may further include baseline statistical predictions or sensor data such as how long a typical user (both male and female) washes their hands following a solid waste event as compared to a liquid waste event or the air quality sensor 156 output that corresponds to cigarette smoke or various other gases that may be present in the restroom 101.

The information may correlate to a known impact on the state table 1200, thresholds, or algorithms of the present invention. Table 1 provides nonlimiting examples of such correlations all of which can be established with statistical methods for predictive future use.

TABLE 1

| | | |
|---|---|---|
| Gender = | male | Lower correlation between water closet 132 use and hand washing |
| | female | Higher correlation between water closet 132 use and hand washing, higher occurrence of accessing facility without using WC |
| Date = | normal | No adjustment |
| | holiday | Reduced traffic expectations |
| | high traffic day (sporting event at a school or election day at a civic center) | Increased traffic expectations |
| Time = | morning | No adjustment |
| | lunch | Increased traffic expectations |
| | evening (at/before quitting time) | Increased traffic expectations |
| Venue = | school | Increased focus on monitoring of noncompliances |
| | office building | Increased focus on cleanliness of restroom |
| | airport | Peak periods expected, higher volume of sink users not using urinal or water closet 132 |
| Configuration = | waterless urinals | Increased impact on VOC |
| | handicap accessible WC | Reduced likelihood of usage of WC, if in a business venue increased tendency for lower use of toilet paper due to use of water closet 132 for changing clothes |
| | women's facility (no urinals) | Increased reliance on peripheral sensors |
| Doorway Parameters = | open doorway | Increase in sensitivity of VOC |
| | single doorway | No adjustment |
| | multiple doorways/ revolving doorway | Lowered thresholds for replenishment |

TABLE 1-continued

| | | |
|---|---|---|
| Rstm Mgmt Policies = | office | Normal maintenance schedule |
| | school | Increased time allotted for addressing noncompliances |
| | stadium | More frequent scheduling of maintenance |
| Warning/Alarm/ Report Notification Means and Protocol = | gas station | Higher thresholds leading to generation of notification |
| | office | Lower thresholds leading to generation of notification |

The state table 1200 for a school will likely be very different than the state table for a similarly sized office building or athletic stadium and other different facilities. For instance, the school's state table might contain lower thresholds and higher weightings for VOC detection than the office building. Installation parameters such as gender, venue, etc. affect the thresholds, weighting, ratios and other aspects of the state table. A higher visits/hand wash ratio at a restaurant might result in a more aggressive consumable replenishment threshold in the state table than a restroom located in a public park. FIG. 6 illustrates a table 610 including one possible set of benefits, needs, or requirements 630 for various markets 620. It will be appreciated that such factors may be varied and FIG. 6 is provided as a non-limiting example.

One of the configuration parameters available for building the state table involves entering a facility schedule for normal operations, holidays, special events and for occurrence of characterizable sudden events, such as arrival of a multiple number of airplanes at one area of an airport when the scheduled times were spaced apart. Such a "state" could statistically project the increased level of patron use and prepare and service the restroom 101 accordingly. Since the operation of the restroom convenience center system 100 will be implemented as a state machine, a heavy usage condition or a situation where the available resources are unable to service the backlog, the restroom convenience center system 100 will transition for the normal operation state to one of several off-normal states to begin redirecting patrons or other pertinent actions. This off-normal state will prioritize requests among several restroom convenience center system 100 to service the restroom 101 is in the order of worst need first.

Figure 17:
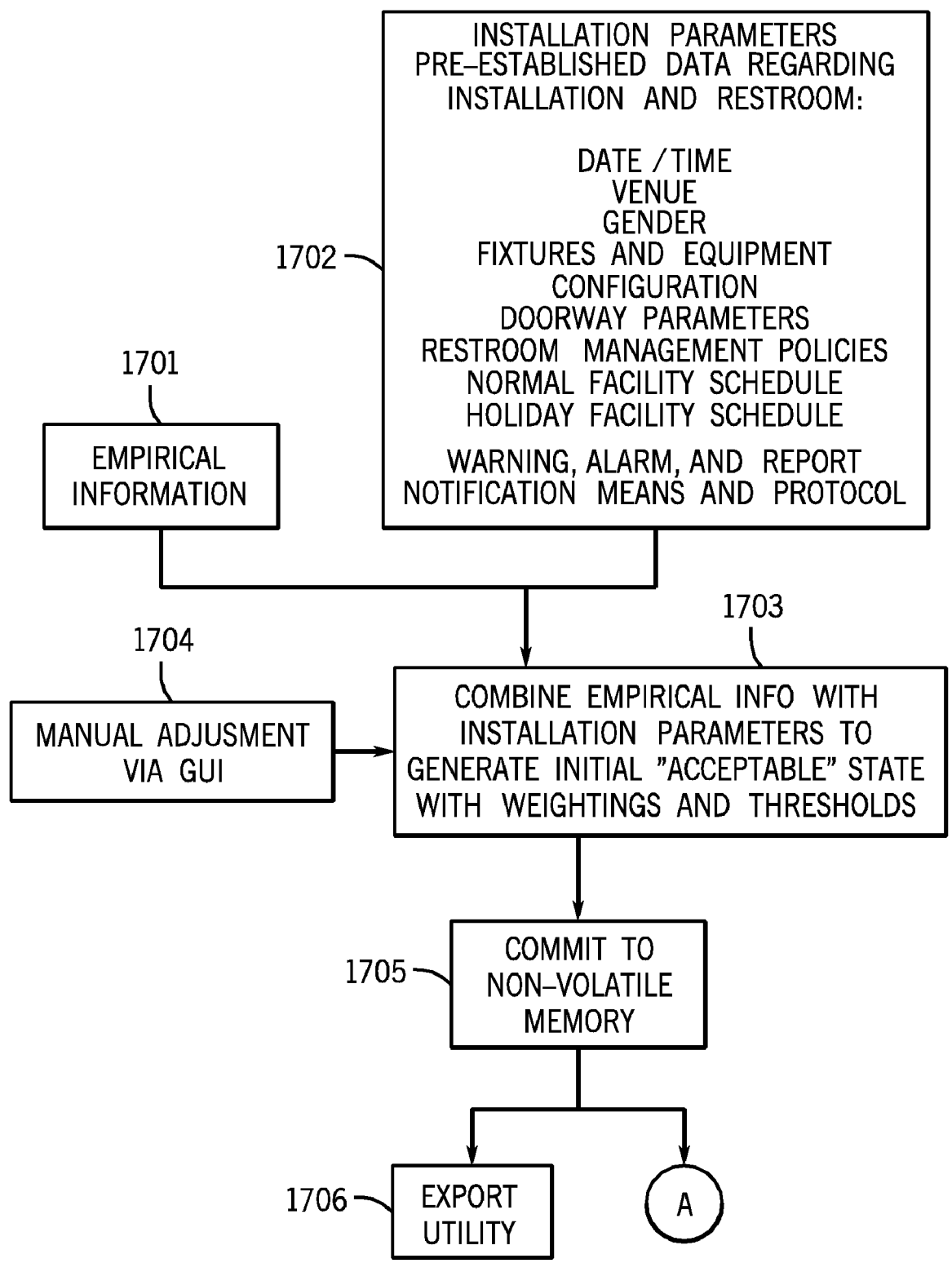
FIG. 17 illustrates a flow chart depicting one embodiment of configuration and setup for the restroom convenience center.
Figure 18:
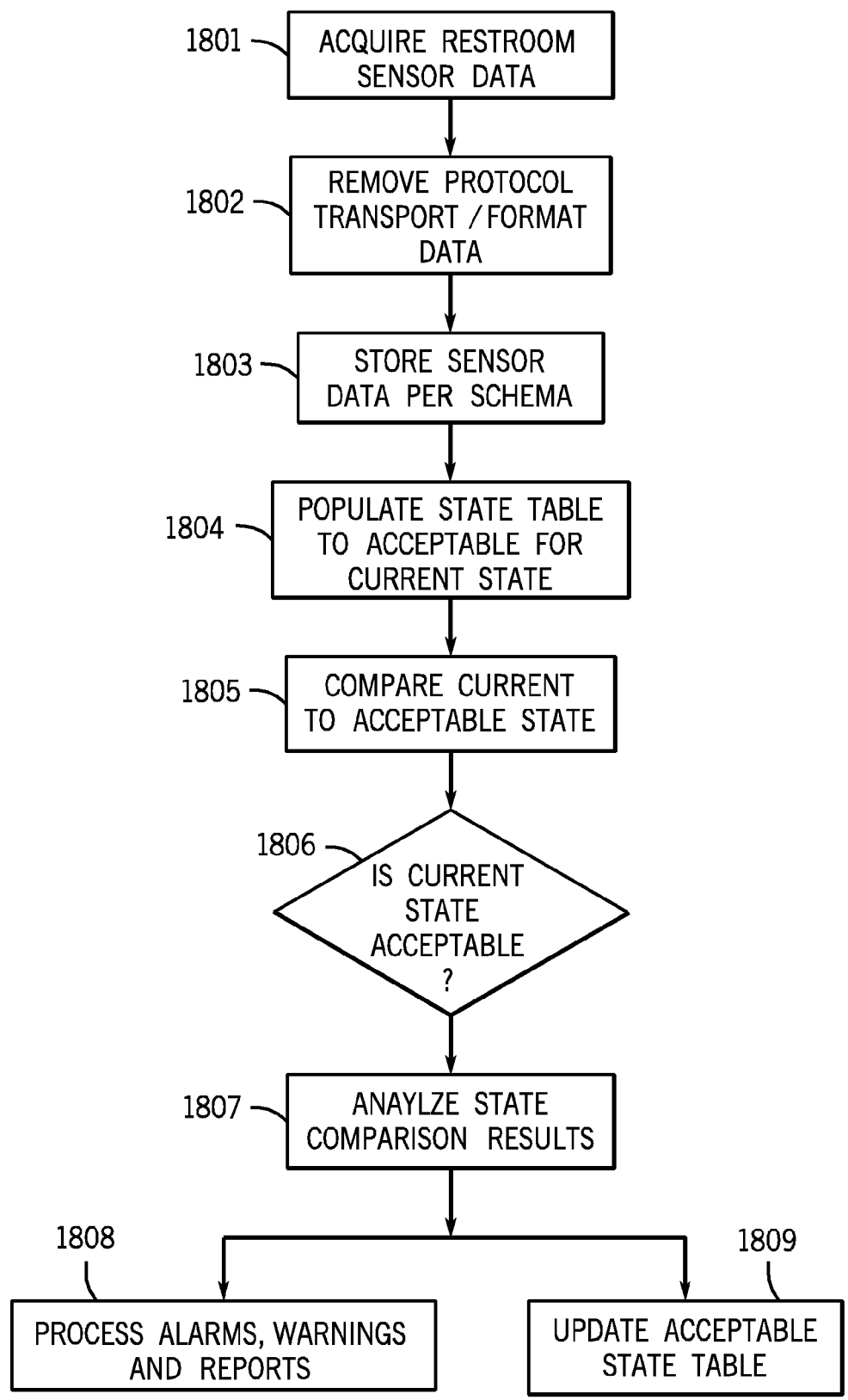
FIG. 18 illustrates a flow chart depicting one embodiment of the main operational logic for the restroom convenience center.
Figure 19:
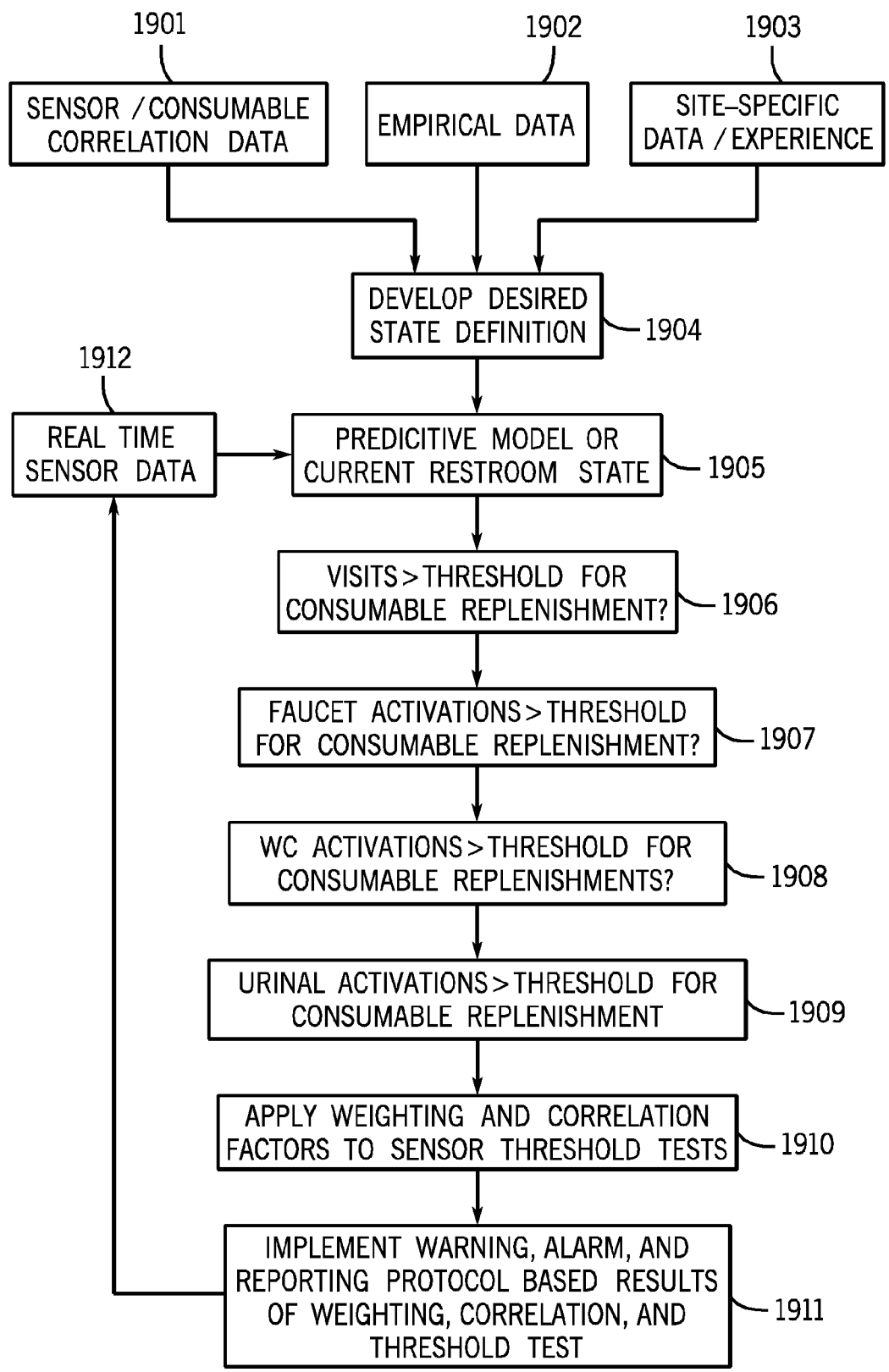
FIG. 19 illustrates a flow chart depicting the logic for applying sensor data to a state table and predetermined thresholds.

FIGS. 17-19 generally depict specific exemplary embodiments of logic that maybe used with the present invention. FIG. 17 illustrates a method 1700 of configuring and setting up the state table 1200 and thresholds for use in a particular installation. At step 1701 empirical data is entered and at step 1702 installation parameters are entered, at step 1703, the empirical data and installation parameters are utilized to generate initial states with weightings and threshold for predicting desired states or consumable levels in the restroom 101. The generated data may be further modified by manual adjustment via the LUI or embedded web pages. At step 1705, this generated information is stored in a memory. The generated data may be exported at step 1706 or proceed to step 1805 of FIG. 18.

Turning now to FIG. 18, one embodiment of a main operation logic 1800 of the restroom convenience center system 100 is depicted. At step 1801, restroom sensor data is acquired. At step 1802, a remove protocol is performed and the data is transported and formatted. At step 1803, the sensor data is stored pursuant to a predetermined schema. At step 1804, the state table is populated for the current state. At step 1805, the current state is compared to the acceptable state. At step 1806, a decision is made regarding whether the current state is acceptable. If it is, the system 100 returns to step 1801.

If not, then the results are analyzed at step 1807. Alarms are processed at step 1808 and the acceptable state table is updated at step 1809.

Turning now to FIG. 19, an alternative embodiment is depicted illustrating a method of operation 1900. Sensor/consumable correlation data, empirical data, and site-specific experience are gathered at steps 1901-1903 respectively. At step 1904, the desired state definition is developed. At step 1905, a model of the current state is predicted. At step 1906, a determination is made regarding if visits are greater then a predetermined threshold for consumable replenishment. At step 1907, a determination is made regarding if faucet activations are greater then a predetermined threshold for consumable replenishment. At step 1908, a determination is made regarding if water closet activations are greater then a predetermined threshold for consumable replenishment. At step 1909, a determination is made regarding if urinal activations are greater then a predetermined threshold for consumable replenishment. At step 1910, the weighting and correlation factors are applied to sensor threshold of steps 1906-1909. At step 1911, warnings, alarms, and reporting are implemented based upon the weighting, correlation, and threshold. Realtime sensor data is gathered at step 1912 and the system 100 returns to step 1905.

Turning to specific factors that may impact the state table and probability determinations, factors that may impact the predictability of the state for the given fixture 130 are the location of the fixture 130 within the restroom 101, the overall layout of the restroom 101, the traffic pattern within the restroom 101 and the occurrence of high volume patron traffic due to a special event or a sudden influx of traffic, such as an unexpected coincidence of plane arrivals at an airport not in accordance with the regular schedule. For example, for the restroom 101 layout shown in FIG. 1, it may be determined, either through prior experience, actual observations or accumulated statistical data associated with use of the instant restroom layout and location that patrons tend to use the first faucet more frequently due to that first faucet being located nearer to a restroom door or more proximate dispensers of consumables. Thus, such information can also be factored into the above-described conventional and well known statistical algorithm or heuristics to further enhance the predictability of when the soap dispenser 142 associated with that first faucet 136 will be depleted. Therefore, the restroom convenience center controller 110 configuration can also utilize and take into account a Cartesian mapping (method of identifying location of fixtures within a drawn restroom grid) of the restroom fixture 130 and probabilistic models of the restroom fixture 130 usage. Moreover, with the minimal addition or utilization of the patron counter 158, the direct data can be utilized by the restroom convenience center controller 110, for example, to also predict when the restroom fixture 130, such as the aforementioned faucets 136 are likely to be occupied and thus determine information that can be utilized to direct patrons to, for example, an unseen faucet 136 in the restroom 101 facility or another restroom 101 altogether that may be currently experiencing less patron traffic/usage. Hence, patrons' behavior can be anticipated as well as modified/directed to maximize the usage of an asset or alternative restroom facilities without a risk of a monitoring system being overly intrusive from the perspective of the patrons.

In one embodiment, patron call information may be used for quality control purposes, or may further be used to dynamically alter thresholds for supplies and maintenance requests. For example, if it is determined that an average response time for supply replenishment requests is 20 minutes, the threshold at which at an automated request is generated may be altered to ensure that future replenishment occurs prior to the supplies being exhausted, thereby minimizing future manual patron requests. In the above manner, the controller 110 may better predict how to service various needs associated with the restroom 101.

In one embodiment, restroom traffic is monitored as the primary predictor and driver of the state table determinations, for example, using the patron counters 158 as the sensors 112 in one or more locations within the restroom 101. In one example, usage is defined differently than traffic in the restroom 101 because not all patrons who enter the restroom 101 use a water closet 132, or the faucet 136, but instead many enter for grooming purposes, and thus are not necessarily consuming supplies (i.e., using one of the restroom fixtures 130). Consequently, in another aspect of the invention, the restroom controller 110 or the global command unit may take the restroom traffic data and usage data and generate use/traffic historical profiles and use such data to generate usage thresholds or use such data for other purposes, as may be desired.

In one example, an air quality sensor 156 senses the presence of a volatile/offensive gas or compound. If no flushing of a water closet 132 or urinal is sensed for an appropriate time span, the restroom convenience center controller 110 may infer that a patron has entered the restroom 101 and is smoking a cigarette therein or otherwise causing generation of unwanted gases. In another example, a representative fixture 130, such as the faucet 136 may have a presence sensor 150 associated therewith, while the adjacent fixture 130 does not. Upon receiving a certain number of counts from the faucet sensor 153, the restroom convenience center controller 110 can apply, as described herein, a conventional and well known predictive algorithm in conjunction with comparing the count to a predetermined number of counts to determine to a sufficient degree of probability that, for example, paper towels need to be replenished. Further, such data can be analyzed in combination with external data, such as the day being that of a special event having a time dependent rising profile, or a sudden notice of a statistically large event, such as numerous off schedule air flights have arrived together at an airport, to enable service action to be taken in accordance with predictive determinations for such an event.

Turning now to a specific example of a state table, FIGS. 12A-C shows a state table which can be utilized in accordance with various embodiments to determine appropriate actions that can or should be taken in response to the generated, indirect or inferential data described above. FIGS. 12A-C illustrates a plurality of states that can be experienced in relation to thresholds or occurrence of statistically significant events that are surpassed with respect to various sensors 112, or in combination with incoming data notices, in a restroom facility. It should be appreciated that FIGS. 12A-C are used for illustrative purposes and that the invention is not limited to the types or quantity of sensors 112 listed in the state table of FIGS. 12A-C. Further, it should be appreciated that a state table in accordance with the present invention may be sized so as to correspond with the number of sensor inputs or may be compacted by various methods to reducing the total number of potential states.

The state table allows for a determination of the current state of the restroom 101 given a set of indications from sensors 112. For example, if the water closet 132 sensor 112 is activated x number of times for a given time period and for the particular statistical conditions occurring for the restroom 101, the restroom convenience center controller 110 determines whether x surpasses a predetermined threshold set for an allowable number of activations before requiring service based on an average number of times a water closet 132 is supposed to be flushed for a particular period of time (and for the known statistical conditions at that time). If x does surpass the predetermined threshold, it may be assumed that, for example, a patron is repeatedly attempting to flush the water closet 132 due to the water closet 132 becoming clogged (or is deliberately causing repeated water use for inappropriate purposes). Hence, the restroom convenience center controller 110 can access the sensor state and response matrix and determine that the current state, i.e., state 8 (FIGS. 12A-C), requires that servicing personnel respond by inspecting the water closet 132 for potential equipment failure and/or abuse. It should be noted that a plurality of combinations and states beyond those illustrated in FIGS. 12A-C can be implemented in the sensor state and response matrix. Moreover, as mentioned above regarding the particular conditions, the different thresholds that might trigger one or more responses can be customized depending on the size, location, predicted demographic, e.g., men or women, and predicted frequency of use of the restroom 101 facility and/or restroom fixture 130 therein, among other factors (such as described above).

A fixture 130 that is explicitly included in the make up of the system state table can be based upon actual counts, should that capability exist, or inferred data calculated from another fixture 130 proximate to the first with the inferred count adjusted by physical position and occupancy quotient.

Based on the sensor data and analyses described herein, well known predictive algorithms based on conventional statistical methods can be used to estimate the percentage of consumables depleted or the need for preventative maintenance, etc. An alarm is dispatched to the configured recipient destinations when the estimated percentage exceeds a configured level. The algorithm is reset when consumables are restocked, such as when an input is provided (manually or automatically via a key-card type system or via RF tags on the consumables). The level of consumables within each restroom 101 may be tracked. In addition, the restroom convenience center 100 may track the total consumable stock (such as at a building), such that consumables (or maintenance parts) can be ordered automatically when supply is below a threshold. In one embodiment, the estimated percentage of maximum inventory is provided to the restroom convenience center controller 110 via web page configuration. An easy means is provided to indicate 100% consumable restocking. A means is also provided to indicate less than 100% restocking levels.

The restroom convenience center controller 110 monitors an accumulated value particular to each type of the fixture 130 or device. The values are monitored until they meet configured criteria. Accumulated values are manually reset (via web page interaction or interaction with an interface in the restroom 101, such as a janitor login interface 172 providing an input to the controller 110 denoting restocking) when equipment maintenance or equipment replacement is performed. There may be multiple accumulated values per multiple devices. When the criteria are met, the alarm type, device identifier, restroom convenience center controller 110 identifier, alarm trigger criteria, alarm time, and equipment ID are reported to a configured recipient. Possible values of monitored parameters are: water total flow, device duty cycles, device activations, device time in service, number of service calls, facility temperature, particular users of the site in view of special events or particular days in the year and even other factors such as widespread illness or unusual weather conditions. In one embodiment, a report presenting the current value of all devices' accumulated values and threshold is available via a web page, as discussed further below.

In other words, data can be collected with respect to already-existing sensors 112 that are conventionally utilized to sense the presence of a target user and for example, turn an associated fixture 130, such as the faucet 136, on or off. Whereas the conventional sensors 112 and restroom facility "systems" merely utilize a disjointed series of the sensors 112 to automate the fixture 130 operation, various embodiments described herein can extrapolate the on/off data to predictively ascertain useful information when correlated with at least relative time data and other sensor data correlated therewith. For example, various embodiments gather a number of times that the first faucet sensor 153 goes on and off. Such data can be combined/aggregated with time data that is relative to, e.g., a predetermined average time that a restroom user takes to wash his/her hands. This combined/aggregated data can then be applied to one or more predictive algorithms to determine with sufficient specificity, when soap dispensers associated with the faucets 136 and the first faucet 136 need to be replenished. That is, "direct" data, e.g., the on/off sensor data, can be utilized to extrapolate and/or predict "indirect" data, e.g., when one or more soap dispensers in the same restroom facility will likely be consumed and thus require replenishing.

For example, one embodiment may set the usage value for the toilet paper in the water closet 132 as N and N=0 to start. The restroom convenience center system 100 assigns an impact on N for the sensor 112, where certain sensors 112 only slightly increase N and others provide a larger increase. An alternative embodiment involves determining the likelihood of a usage based upon all of the sensors 112 in the table, i.e. the water closet 132 activation plus an air quality indication is more indicative of a toilet paper usage than faucet and air quality.

One embodiment of the invention would be to sensorize a reference restroom 101 in a sufficient manner to predict the state of another base restroom 101. Additional restrooms 101 at the same general location may then only include a minimal set of the sensors 112 or the sensor 112 such as providing only patron counters 158 (positioned at a door) at the remaining restrooms 101. The door patron counter 158 would then act as a "bias" that is used to adjust where that particular restroom's needs are against the more fully sensorized reference restroom 101.

For the purposes of illustration the state table 1200 is shown by a series of 0's and 1's to indicate whether a particular device is above or below threshold or expected value. In one embodiment, the 0's and 1's represent continuous analog values, discrete counts, and probability density functions. Thus, in certain embodiments, thresholds for the state table 1200 could be populated based purely on empirical data obtained from the actual venue or similar installation.

F. Restroom Convenience Center System Operation—Correlation Table

It should be further appreciated that the accuracy and precision of the described predictive aspects of the invention may be improved in some cases through the use of additional sensors 112. Over time in a certain context it may be possible to accurately predict the need for service based only on number of visitors to the restroom 101. However, each time a new sensor 112 is added to the system 100, a more accurate prediction of the current state can be made. However, highly useful correlation information for predictive calculations can be obtained from a correlation table 1100 to map the relative correlation between the various sensors 112 and states of the restroom 101 (or the fixture 130/consumables and other devices therein). FIG. 11 illustrates one non-limiting example of a correlation table 1100. In the illustrated embodiment, sensor input 1110 includes faucet activations, urinal activations, water closet activations, patron visits, air quality, and patron call status. For each of these sensor inputs, the correlation for various consumable usage 1120 is provided as high, medium, low, or no correlation 1130. It is intuitive that there would be a strong correlation between water closet activations and toilet paper usage, just as there would be a strong correlation between faucet activations and soap usage. However, a correlation also exists between water closet flushometer activations and soap usage although not as strong as that between faucet activations and soap usage. Thus, the flexibility of the present invention allows for different combinations of the sensors 112 and accumulated historical data and comparison with current device data allow for different predictive approaches to predicting the current state of the restroom 101 and predict alarm states in the future.

Once the sensor data has been used to determine, such as via the state table, the current (or predicted) state of the restroom 101, the restroom convenience center system 100 can also determine whether certain thresholds have been exceeded through the use of correlations. One way to do this is to establish a correlation factor for the water closet valve actuations to toilet paper usage. The correlation table (e.g., FIG. 11) indicates there is a high degree of correlation between water closet valve actuations and toilet paper usage. For a given installation, it may be known (or assumed) that in the case of male patrons, a water closet 132 is sometimes used in place of the urinal 134, so it would be desirable that the system 100 remove this presumed action from counting towards the value of toilet paper depletion especially in a male restroom. This is in effect, a statistical negative weight which can be included to predict more precisely when consumables are to be replaced, as opposed to merely assuming one flush event equals use of toilet paper. That is, if a user is using a water closet 132 for liquid waste and therefore not using toilet paper, the correlation between the water closet 132 actuation and the use of toilet paper must be adjusted. In one embodiment, conventional stochastic models may be used to generate the state table and correlations. Another approach to further quantify population of the state table is to make use of the statistics method known as the "Delphi" technique. The Delphi technique would essentially treat each of the sensor inputs with it's own set of thresholds as an "expert". The initial thresholds would be set qualitatively based on experience such as, but not limited to, "look at the restroom state after 85 visits", "a roll of toilet paper gets used up about every 35 water closet 132 activations, after about 125 hand washes the towels should be checked", etc. Each sensor 112 could be polled to send data, or may push data, to the application when it reaches, or is approaching, warning or alarm state and all of the sensor input's "expertise" could be summarized to determine whether the sensors 112 all think the toilet paper should be replaced, or the towels need replenishment, or other corrective action is needed. Thus, each different sensor 112 (or information regarding the restroom) may be treated as providing an independent "opinion" as to the state of the restroom 101. For example, it may be know that there is a high correlation between water closet activations and toilet paper usage. Likewise, it may be also known that there is a correlation between water closet activations and hand towel usage, albeit not as strong as for water closet activations to toilet paper. Using the Delphi technique the mean of the sensor inputs can be determined and the range of responses analyzed to make a decision.

G. Restroom Convenience Center System Operation—Learning

The restroom convenience center system 100 can utilize various "learning" or "smart computing" techniques to adapt to a given installation or set of conditions. To correlate the data with other information, the system 100 again relies upon the state table forcing a discrete number of conditions that can be detected and further enabling the option for the system 100 to react in a pre-planned manner or one that adapts and learns over time. The system 100 also can include embedded or stored historical use data for the restroom 100 and even the fixtures 130 and the dispenser 142 which can be called on to assist in the learning process. Further, "manual" feedback, or rather actual observations, is one way for learning to occur. It should be appreciated that maintenance and janitorial personnel can physically inspect the restroom 101 and enter into the restroom convenience center system 100, such as through the LUI 180, any items that were found to be out of compliance with established policy. The patron call device 173 is another input to the restroom convenience center system 100 which can cause learning to occur in the system 100. The patron call device's 173 initiation of learning in the restroom convenience center system 100 would be reduced to practice by employing logic and statistical techniques to result in information. For example, it may be determined that based on the last x occurrences of this specific condition, there is an y % chance that a patron call will be initiated to report an unacceptable housekeeping condition. If y is above a certain predetermined threshold, the restroom convenience center system 100 will initiate an alarm, such as a text message to the cleaning personnel located in closest proximity to the restroom, predicting the need for service next. It should further be appreciated that, in certain embodiments, it will be equally important for the servicing personnel to report a "no service required" event as well for learning to occur in this scenario, as a source of feedback to the system 100. One of ordinary skill in the art will appreciate there are numerous other conventional, well known ways in which the system 100 can learn and which are used herein. Pattern matching is an example of another technique that can be used as a stimulus to induce learning for restroom convenience center system 100 applications. The underlying algorithm used by the restroom convenience center system 100 in a given embodiment might initially assume a Gaussian distribution for the patron's use of a particular fixture 130 which is translated to a value in the state table representing a warning, alarm, trend variable, or other quantity of interest. A background algorithm will then begin to check actual experience against the Gaussian model and make appropriate adjustment based on the error.

In one embodiment, the predictive aspects are improved by having the system 100 periodically set to a known "acceptable" state. As mentioned previously, the patron call device 173 may be used to "true up" the system 100 by allowing for an unacceptable condition to be reported that can be a catalyst for the system 100 to recalibrate based on learning from the specific conditions that led to the unanticipated shortage of consumables for instance.

Further, the restroom convenience center system 100 may utilize an adjustment upon the occurrence of a certain event, such as if an excessive number of patron calls due to unacceptable conditions or housekeeping inspections indicate the need for services is occurring prior to the system actually providing a warning or alarm, a routine can be automatically or manually initiated that will provide for a more aggressive algorithm. A qualified patron call request to report an unacceptable maintenance or housekeeping condition will trigger a recalibration of the algorithm to become more aggressive in its prediction of facility needs. A restroom 101 with little to no usage of the patron call capability is one that is probably well maintained. These visits are time-stamped by the restroom convenience center system 100 as part of the electronic log. Therefore, one example of the restroom convenience center system 100 application program might walk down the state table looking for any value to go over threshold which would initiate a notification. This additional "aggressiveness" might be obtained by adjusting some or all thresholds downward by an amount, such as, for example, 10%. Another method might provide increased weighting to a sensor input or combination of inputs that conventional data analytics algorithms show to be good predictors of actual activity over the default state table settings. Another embodiment might implement simple logic that provides notice if the patron counter 1580R the water closet 132/urinal activations AND the faucets go over threshold, then the thresholds are adjusted as described above. Thus, for particular installations the predictive accuracy may increase as a larger universe of observed data is gathered.

H. User Interface

The use of graphical user interfaces as a part of or in combination with the restroom convenience center system 100 has been previously described. In certain embodiments, user interfaces provide specific information and functionality. FIGS. 13A-13G, FIGS. 14A-H, and 15A-H are representative screen shots of exemplary embedded web pages that can show valve failure alarms for various restroom fixture 130, a restroom overview, and various performance-related data. Generally, the user interfaces 1300-1306, 1400-1407, and 1500-1507 can indicate whether or not water-related fixture 130 are not operating and whether or not those fixtures 130 have been turned off, as well as general maintenance alarms.

Figure 13A:
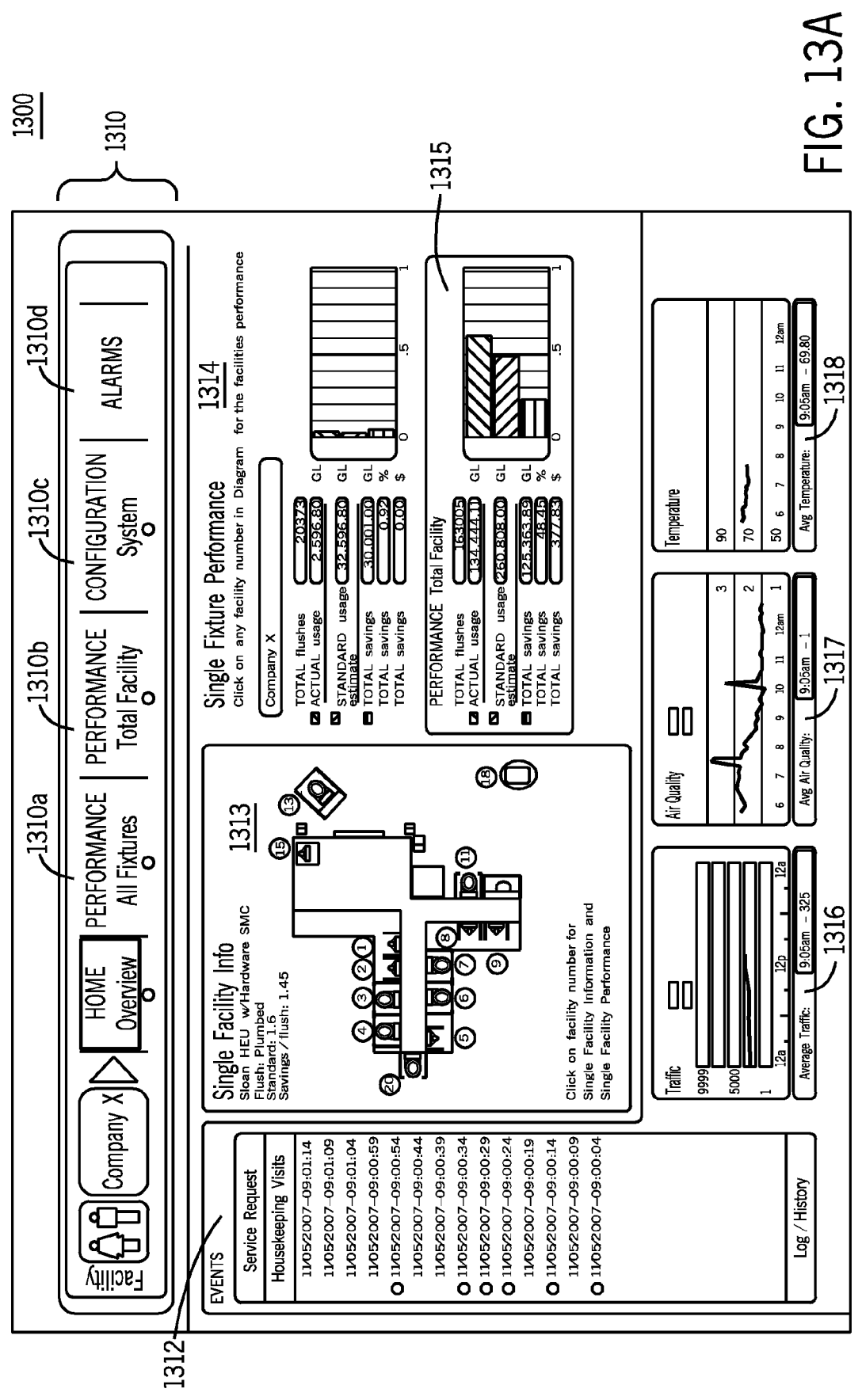

More particularly, FIG. 13A shows a screen shot 1300 of a overview page indicating the status of the restroom convenience center system 100, including a toolbar or menu bar 1310 allowing for access to additional pages. In the example of FIG. 13A, the options include "overview" "performance: all fixture 130" 1310A, "performance: total facility" 1310B, "configuration system" 1310C, and "alarms" 1310D. The overview screen 1300 further includes individual displays providing certain information, in one embodiment "snapshots" summarizing information available from more detailed pages. For example, an events log 1312, a diagrammatic representation of a selected restroom 1313, an indication of a selected fixture 130 performance 1314, and the performance of the whole facility, as well as performance charts regarding traffic 1316, air quality 1317, and temperature 1318. In one embodiment, the overview page provides for interactive and dynamic display of information, such as allowing a user to select an individual fixture 130 from the diagram 1313 resulting in the display of information related to that fixture 130 in the areas 1314-1318 fixture 130.

Figure 13B:
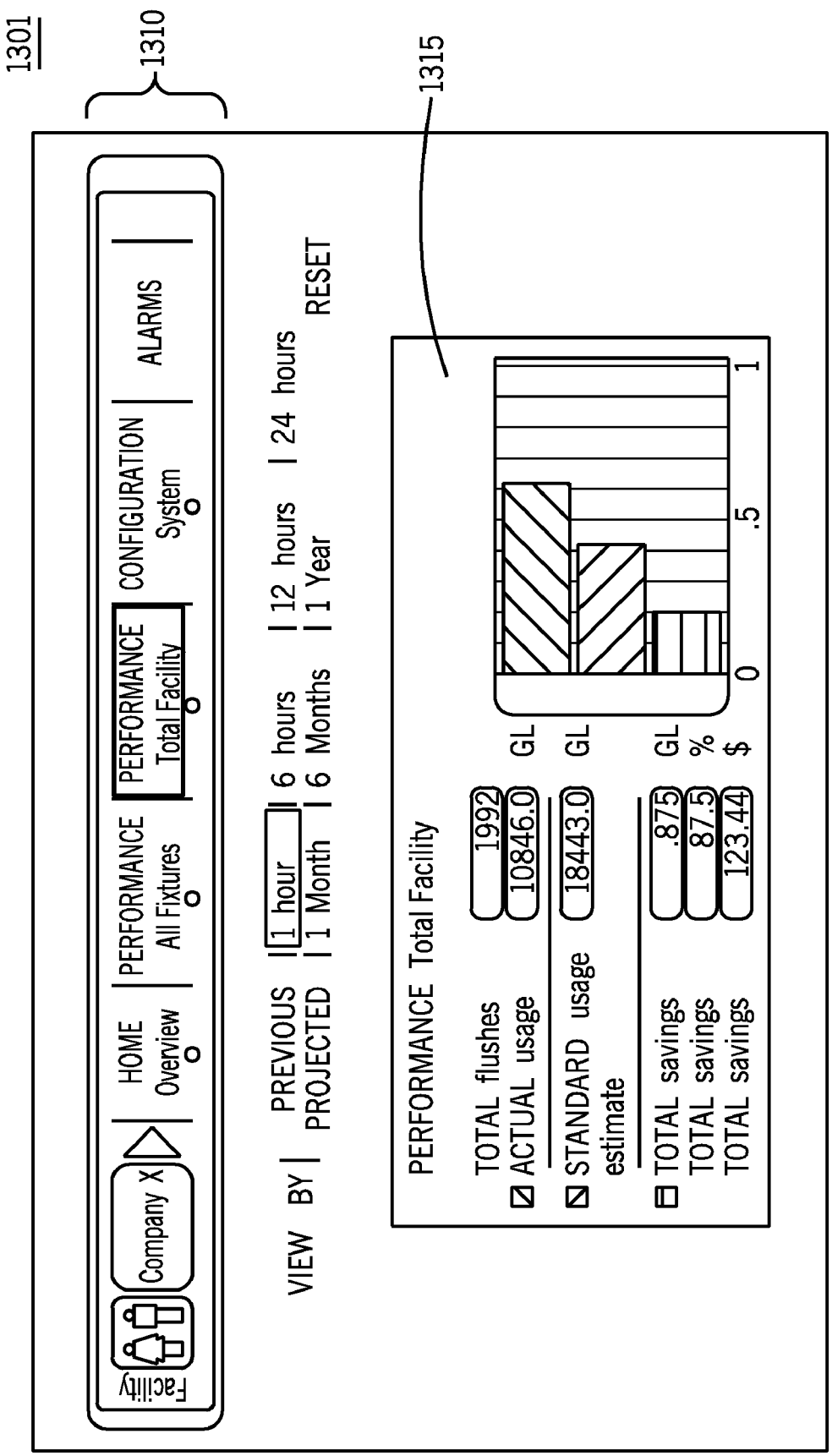
Figure 13C:
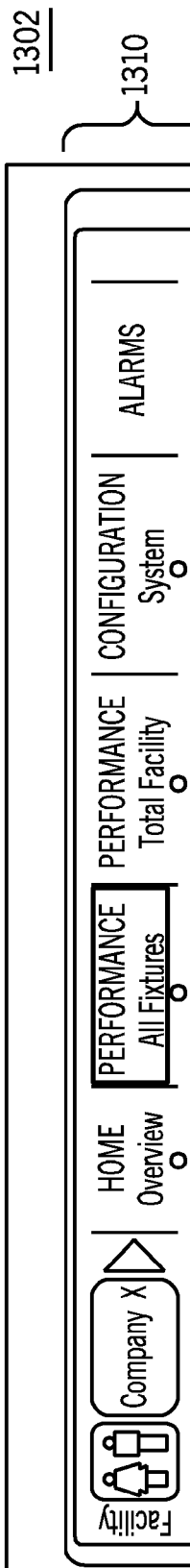
Figure 13D:
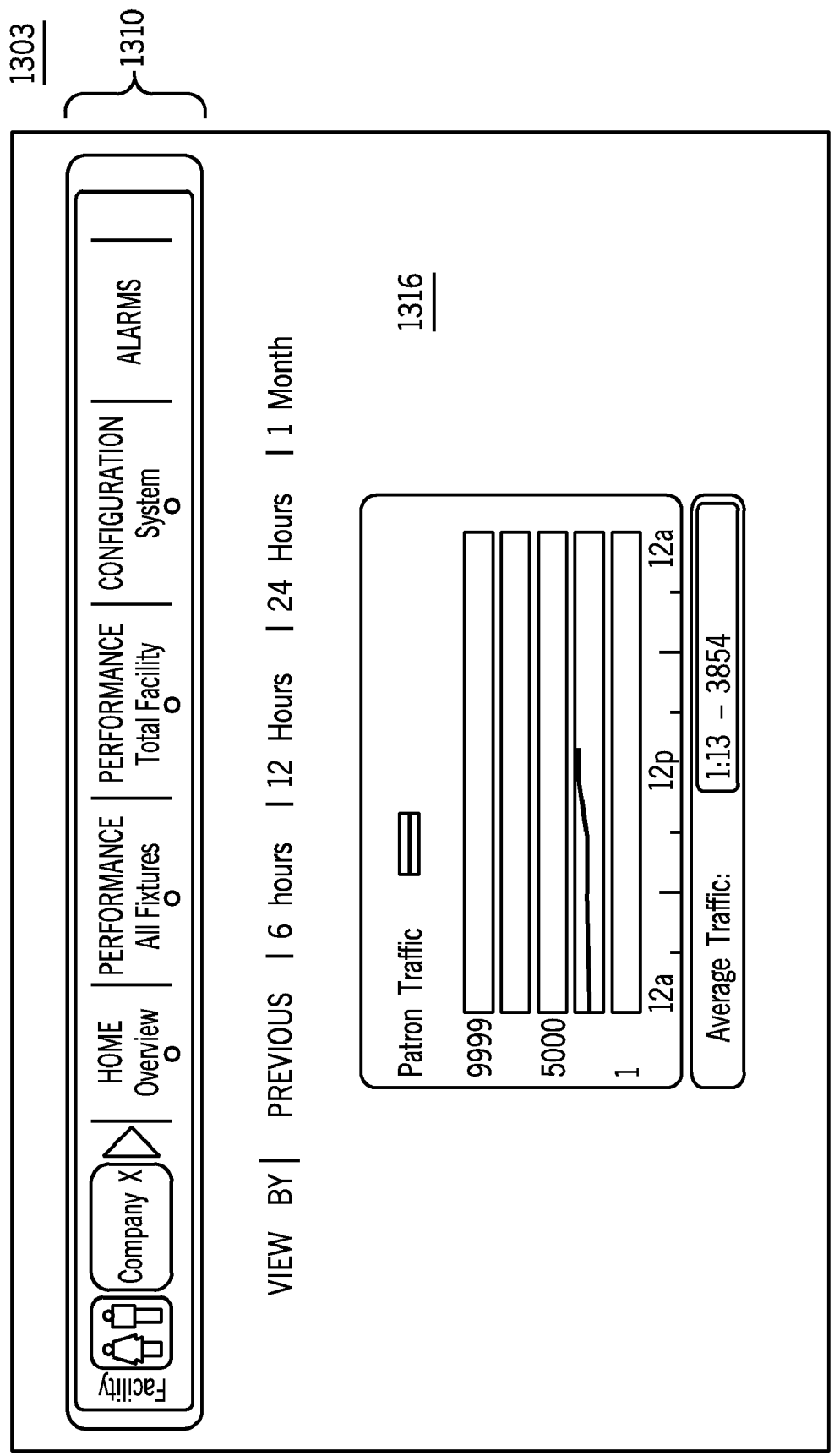
Figure 13E:
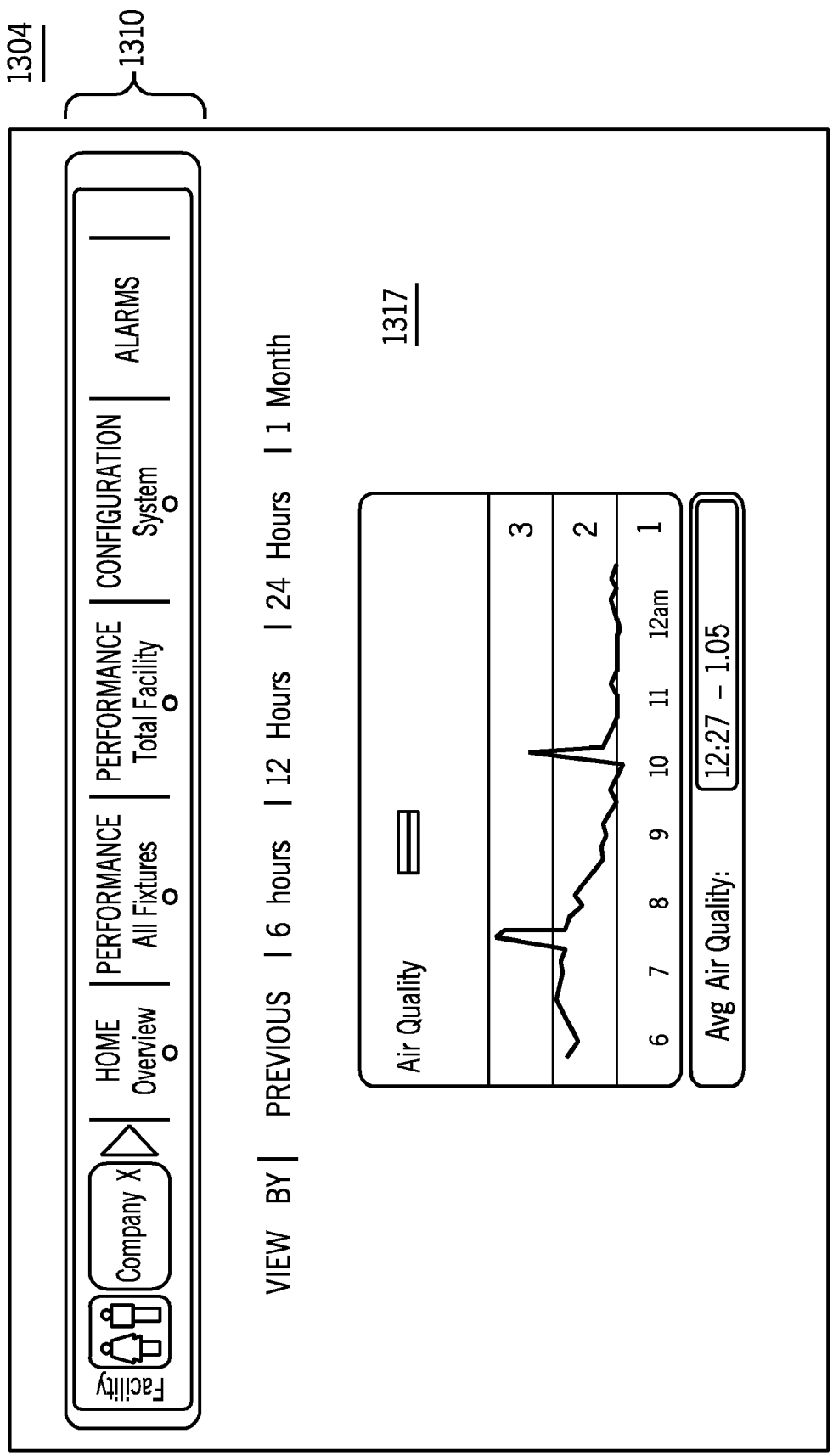
Figure 13F:
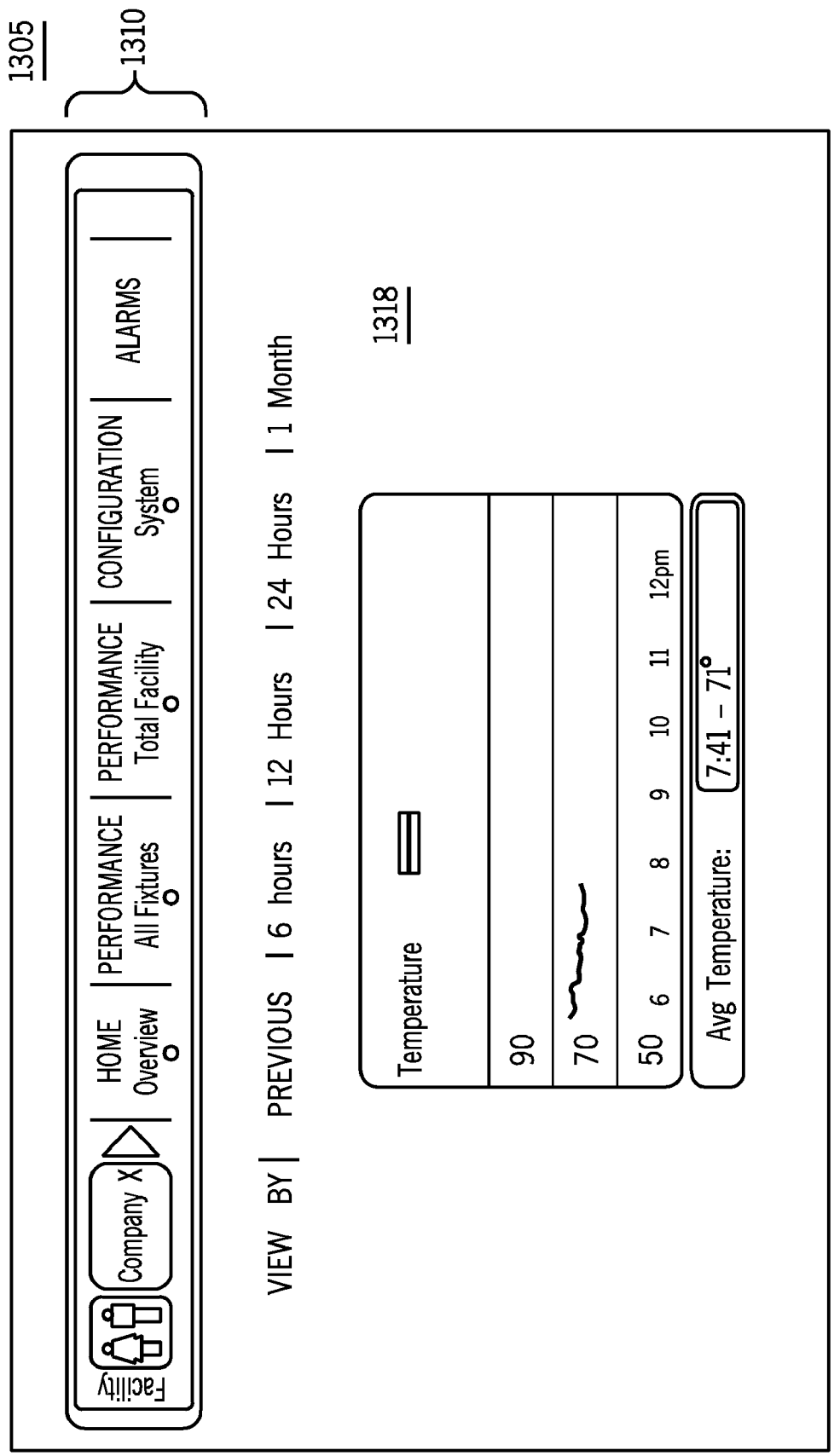
Figure 13G:
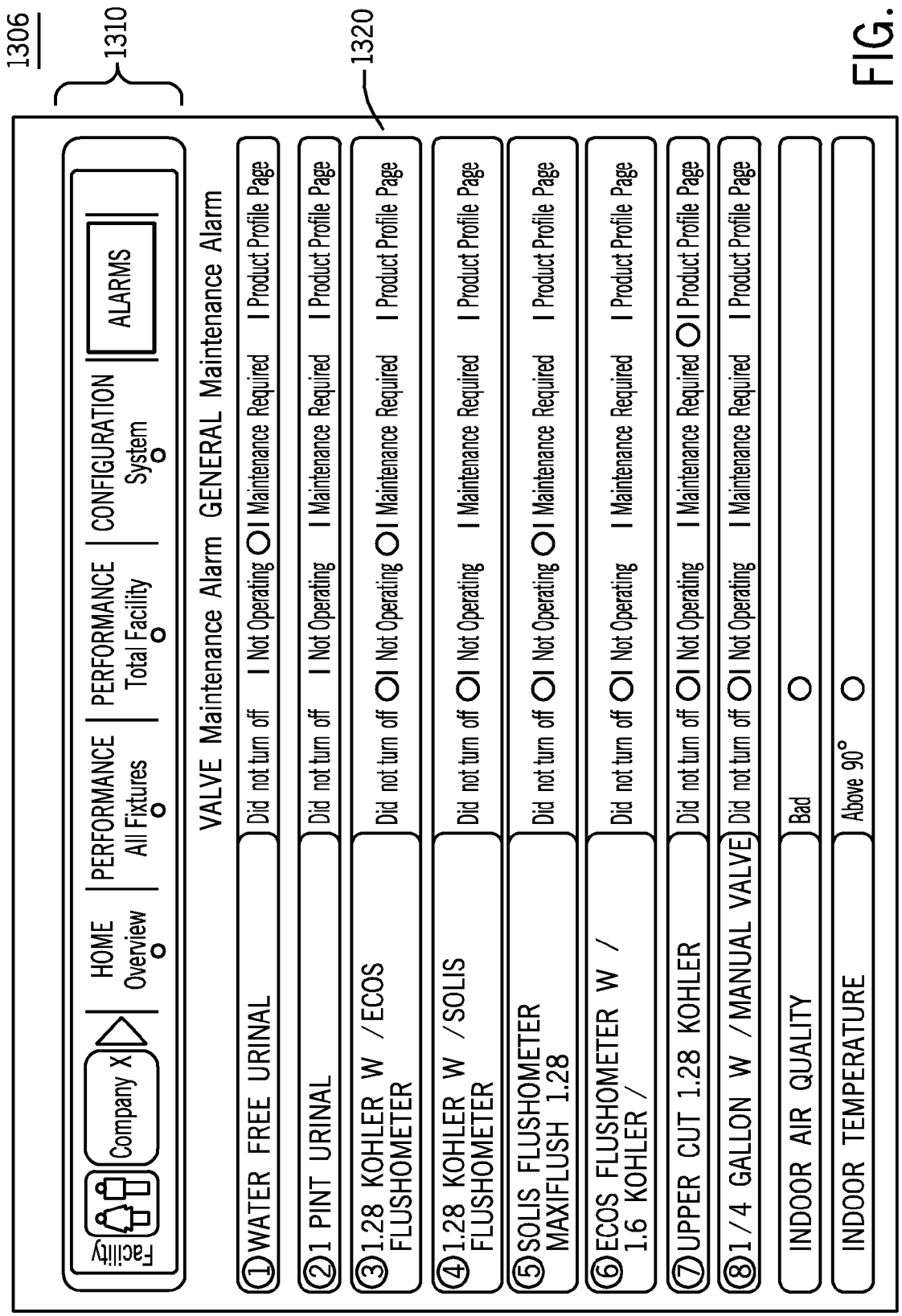

FIG. 13B illustrates a performance screen 1301 for the entire facility and FIG. 13C illustrates a performance screen 1302 for all fixture 130. The performance screens 1301 and 1302 can be used to track information such as water savings or other "green" metrics. FIGS. 13D-F illustrate information regarding specific sensor data, patron traffic, temperature, and air quality, respectively. FIG. 13F illustrates an alarm screen 1306, which provides a user with an overview of particular alarms that have occurred in the restroom convenience center system 100. In addition, it should be appreciated that information may be made available in various forms and corresponding to various time periods. Data may be displayed in various line graphs, although other methods of representing data can be employed to present such data to an end user, either visually, textually, or both. It should be noted that the embedded web pages illustrated in FIGS. 13a-13d also include adaptive menus and navigation controls to allow an end-user to navigate to and from such embedded web pages.

Figure 14A:
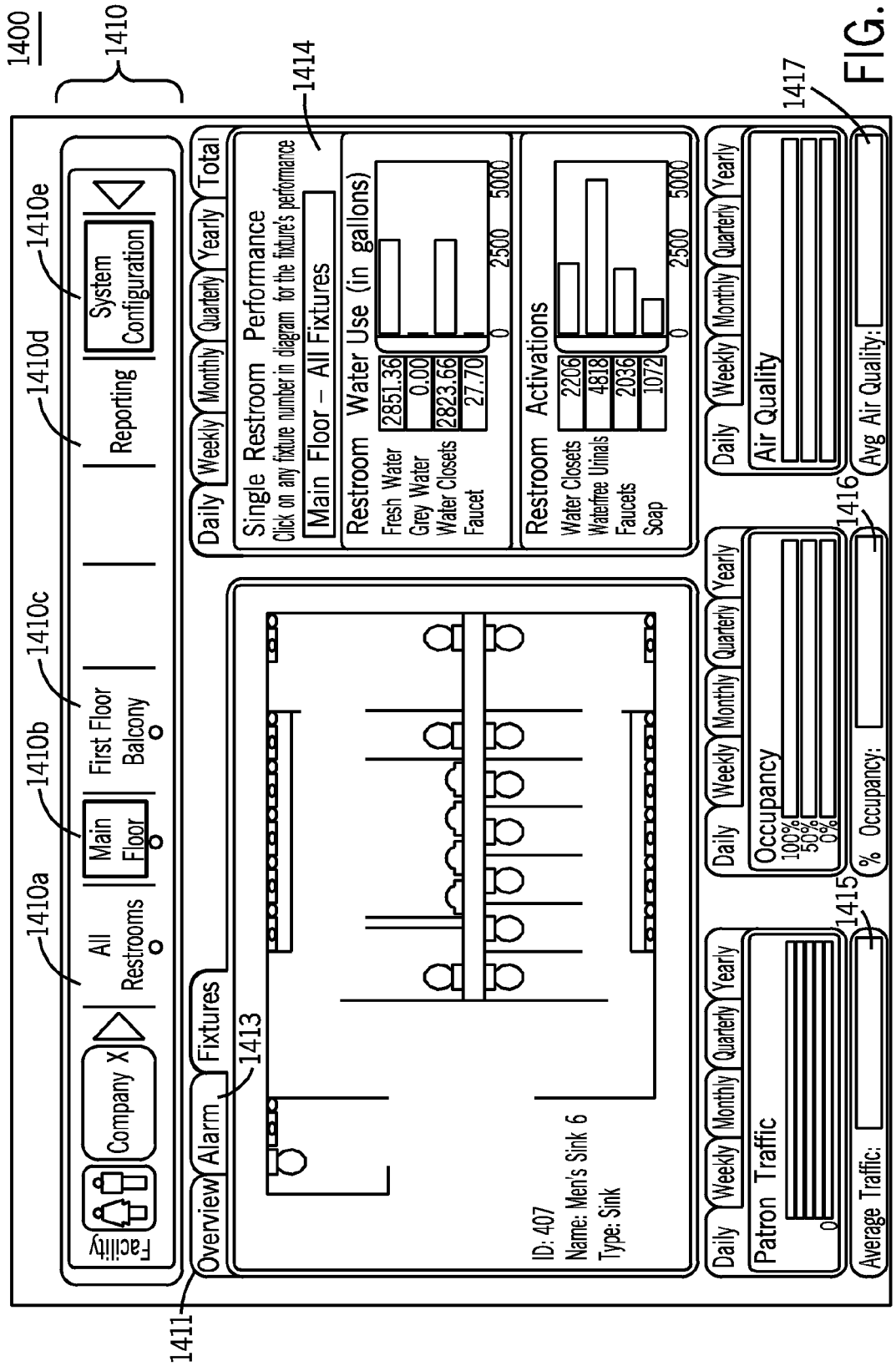
FIGS. 14 A-H illustrate an alternative embodiment of a web interface showing a typical GUI of various monitoring elements of the system for a large public installation.
Figure 14B:
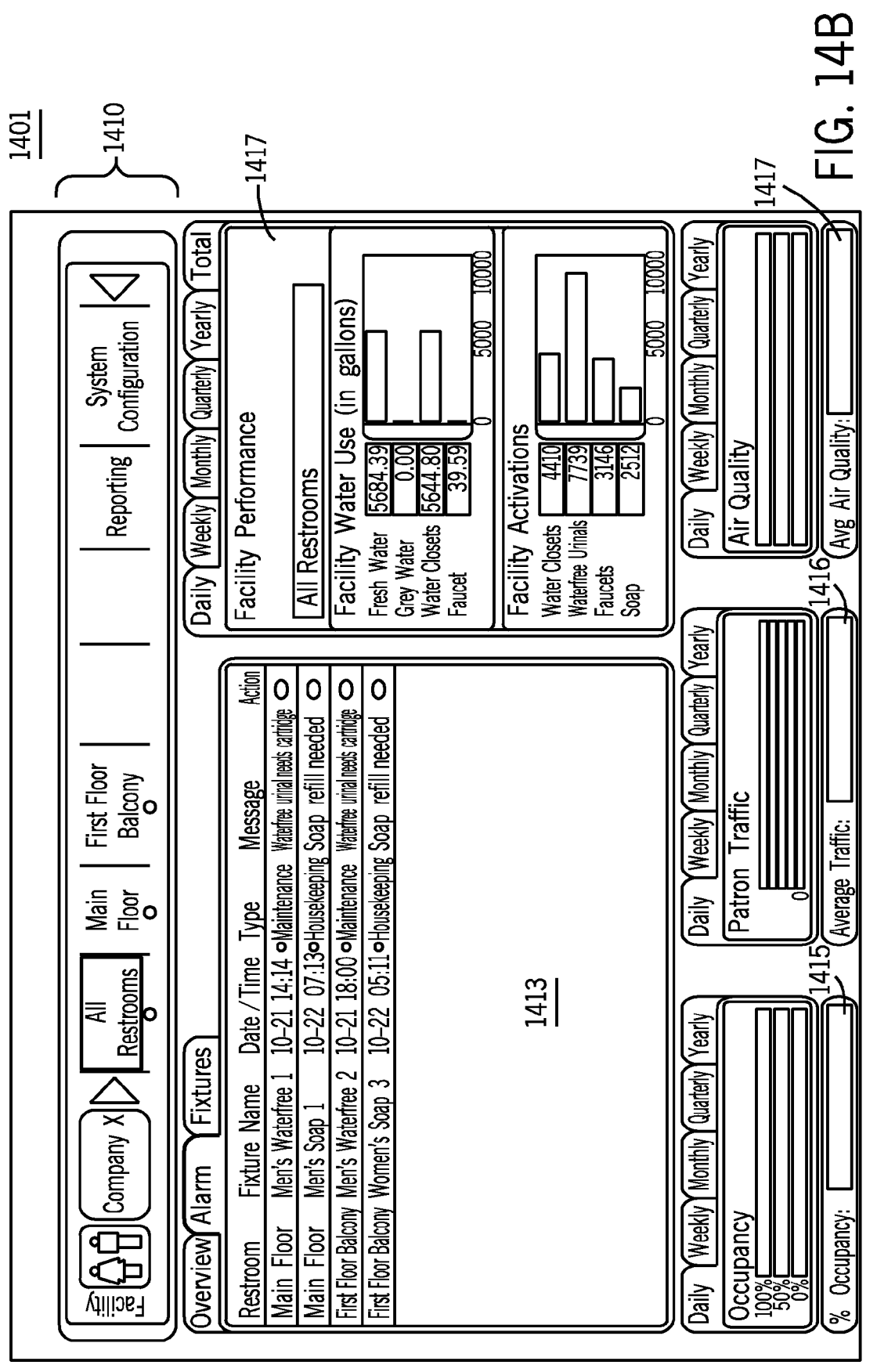
Figure 14C:
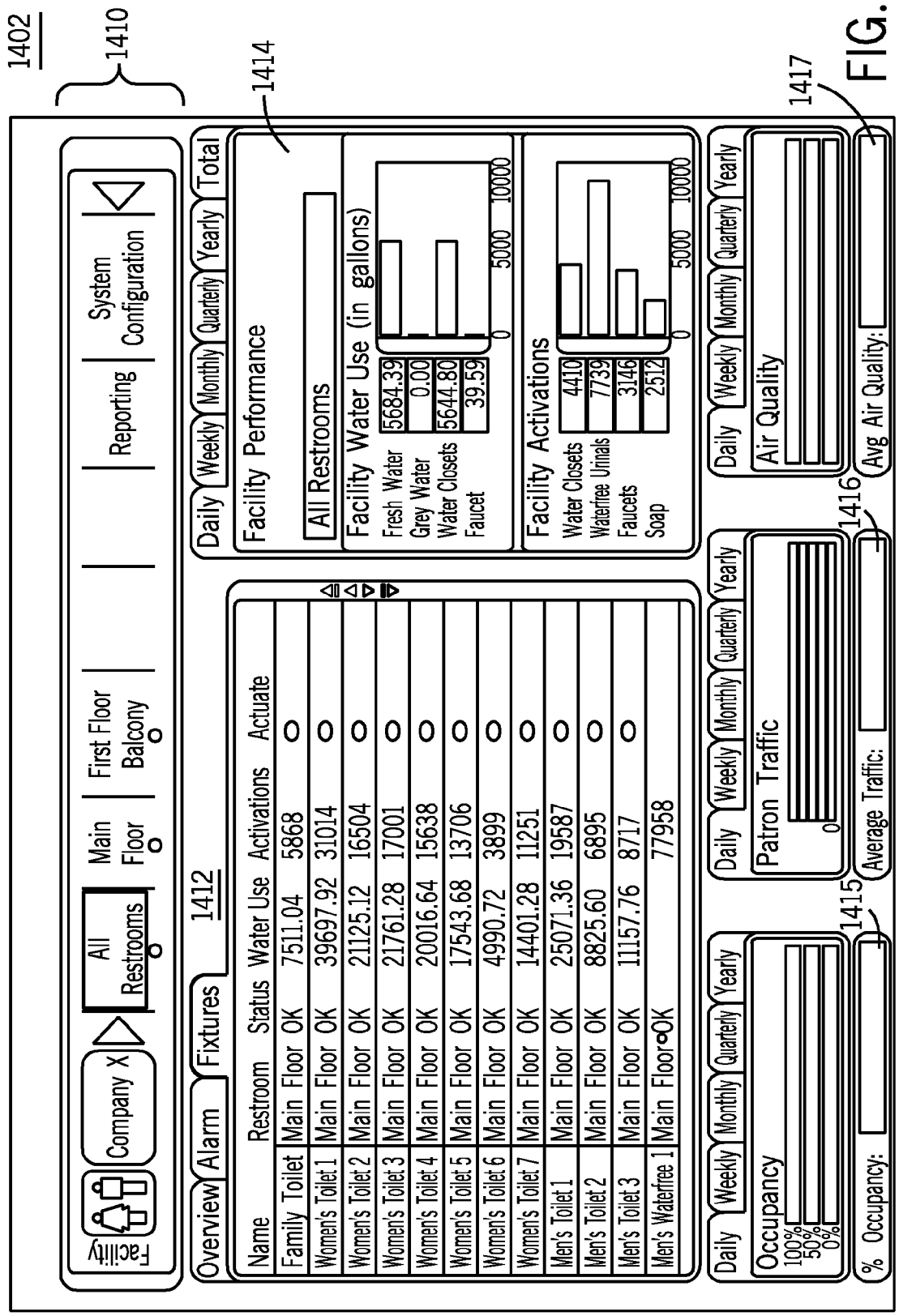
Figure 14D:
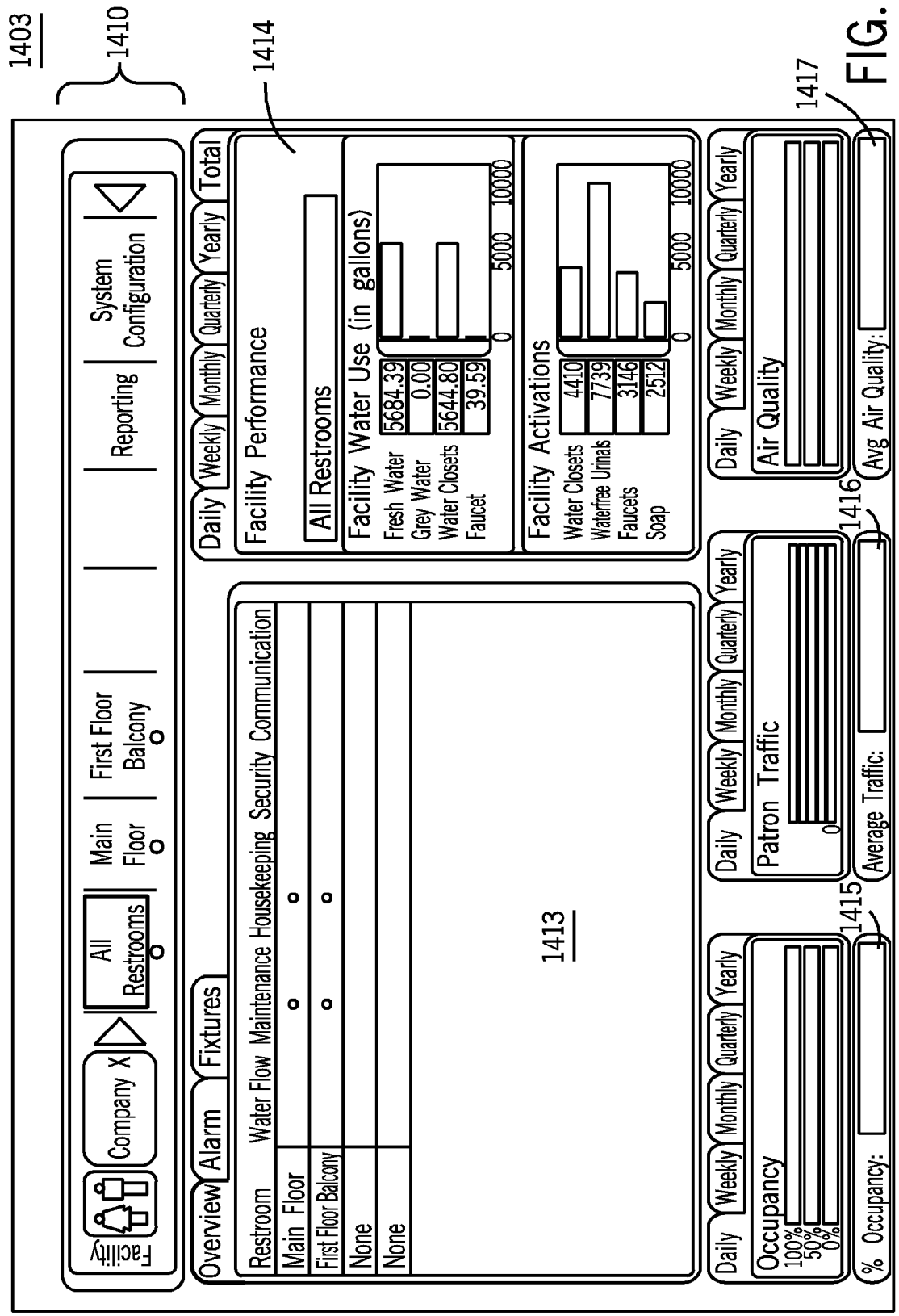
Figure 14E:
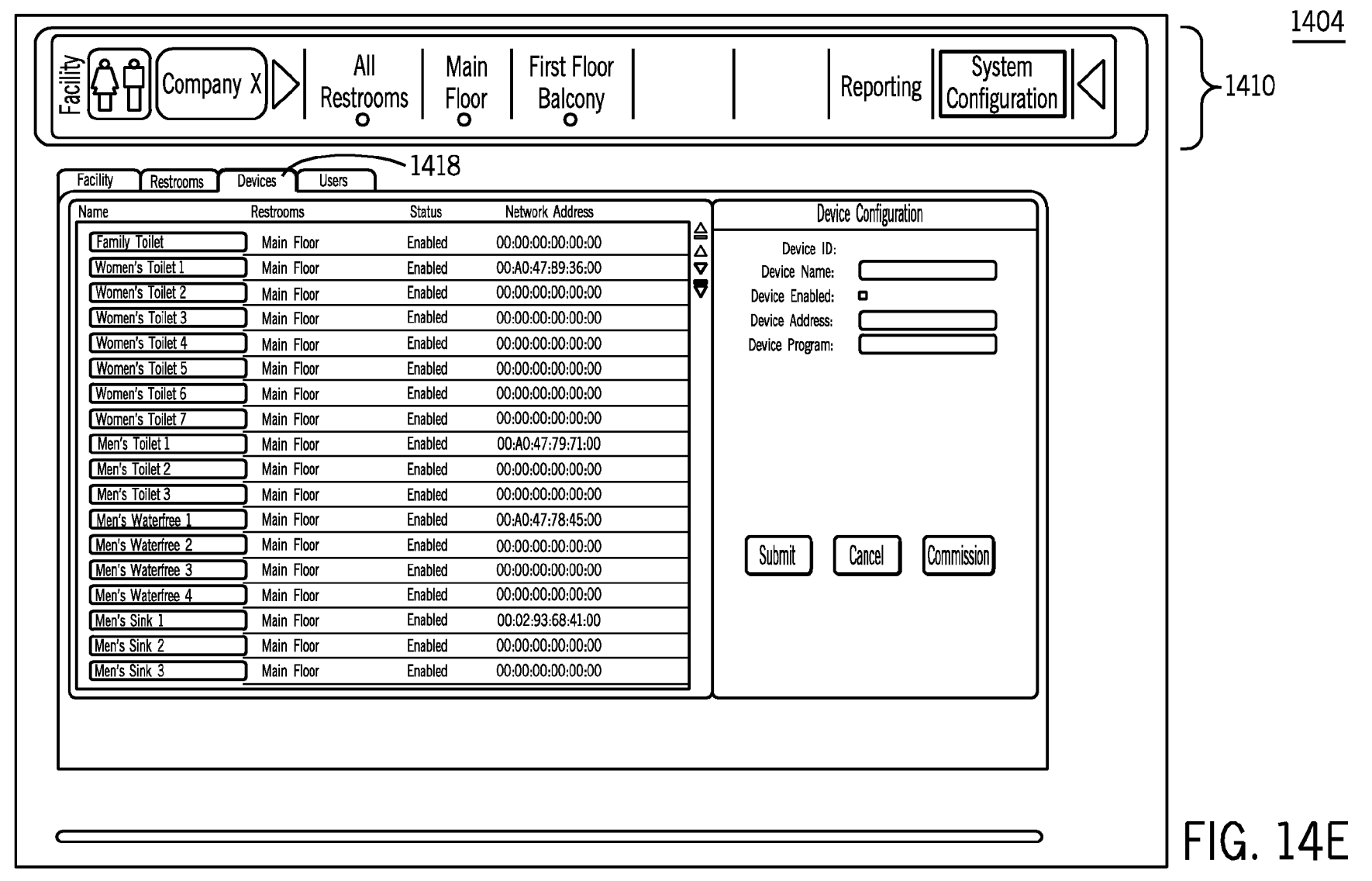
Figure 14F:
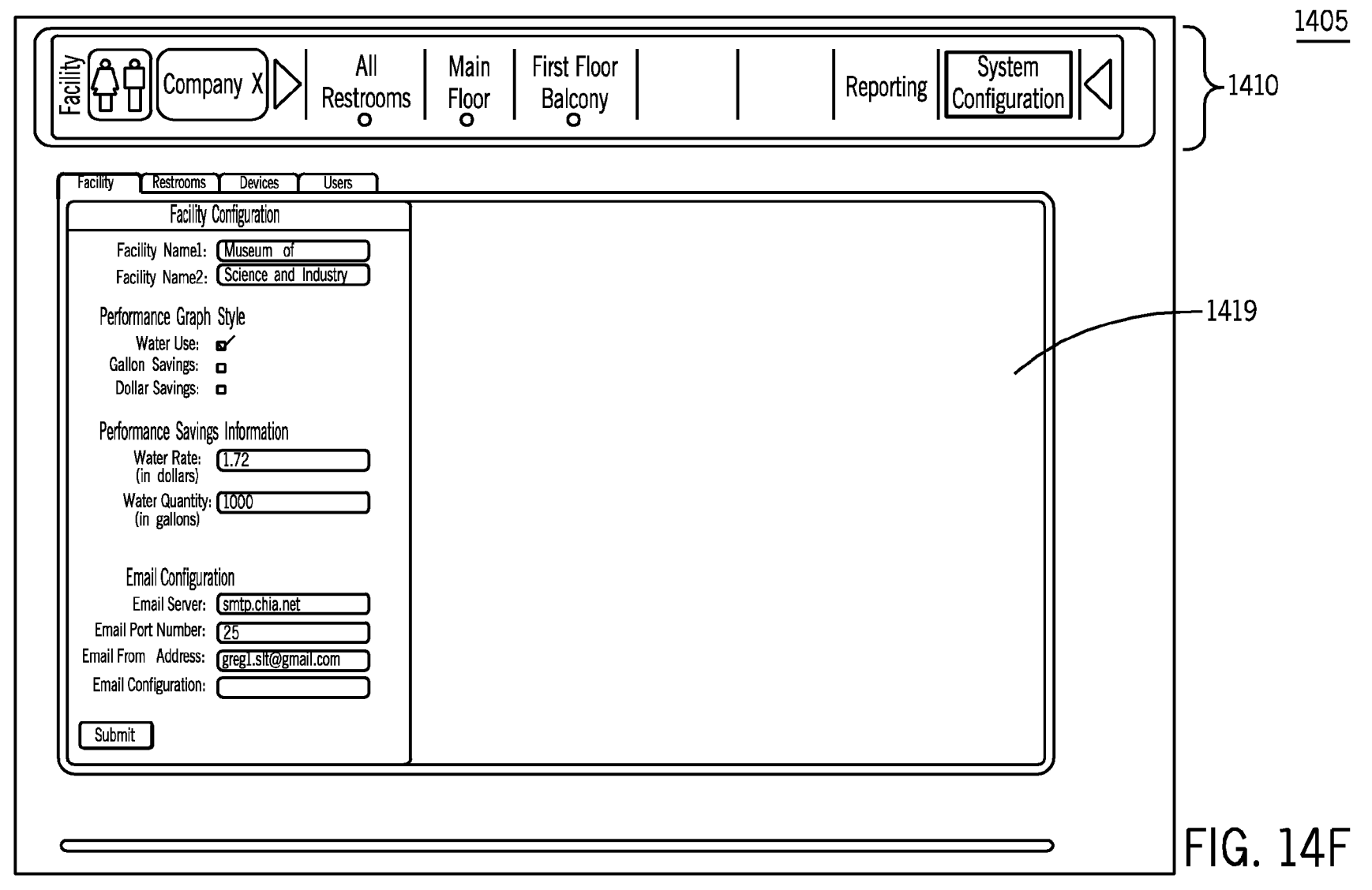
Figure 14G:
Figure 15A:
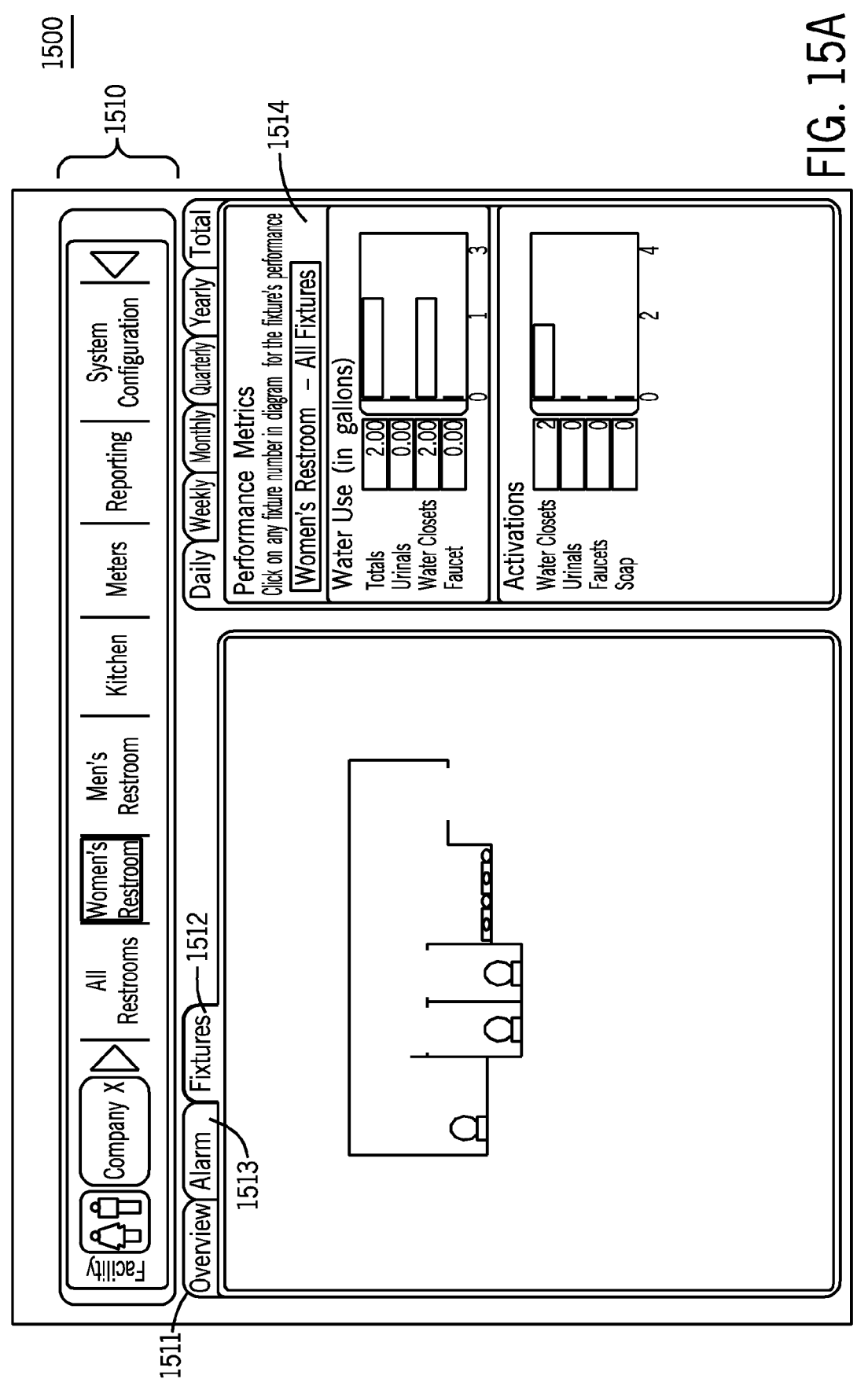
Figure 15B:
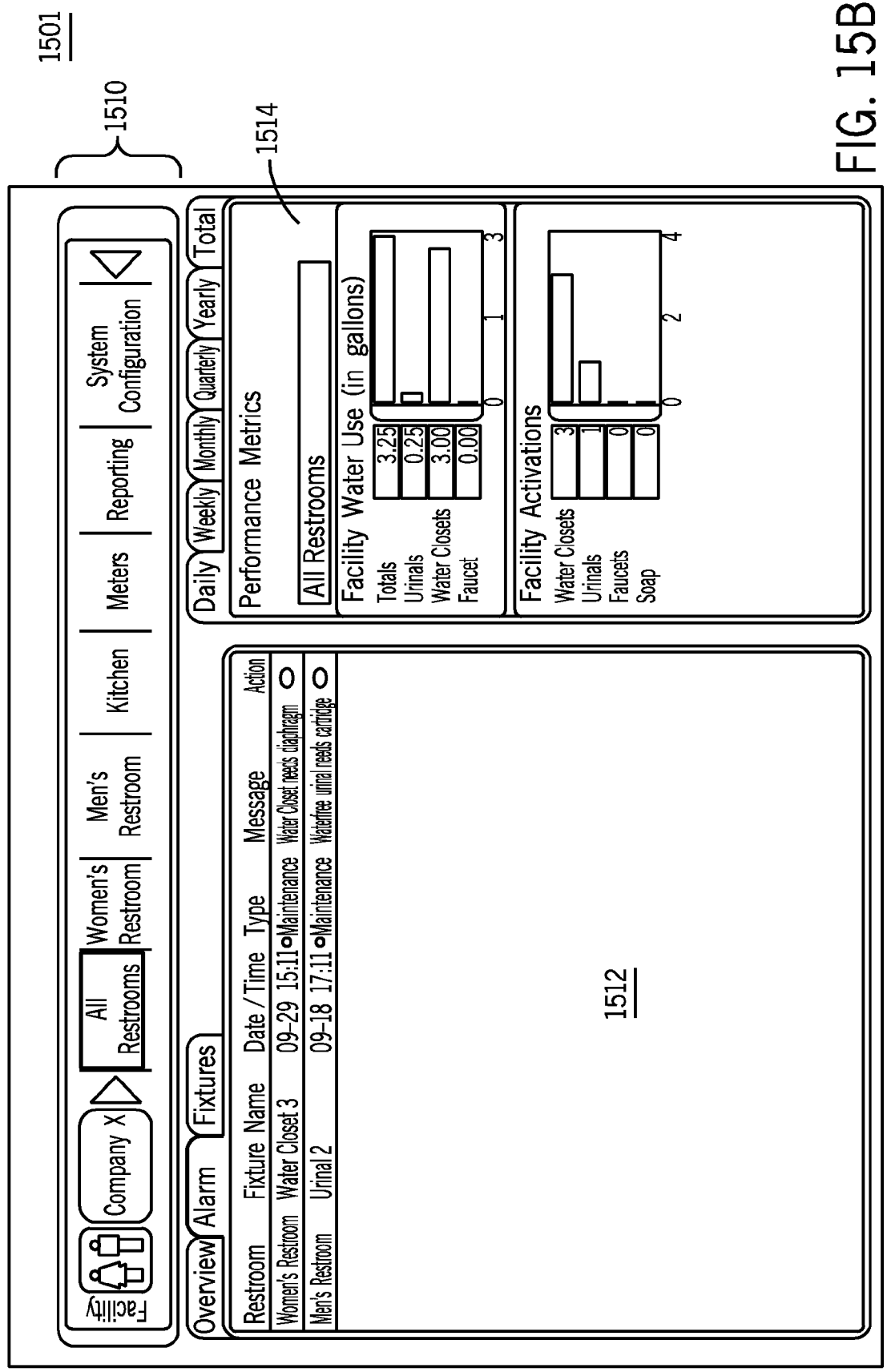
Figure 15C:
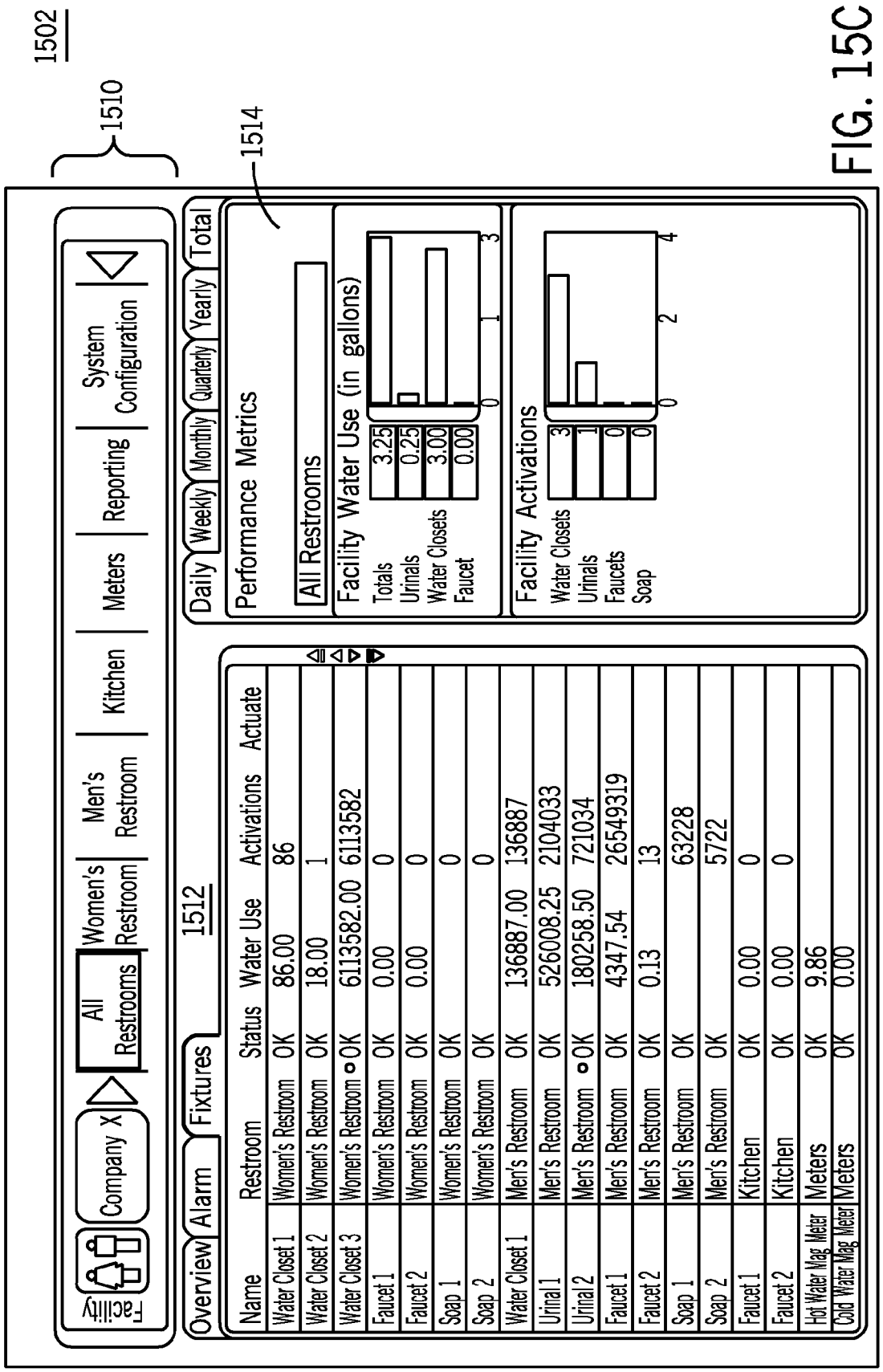
Figure 15D:
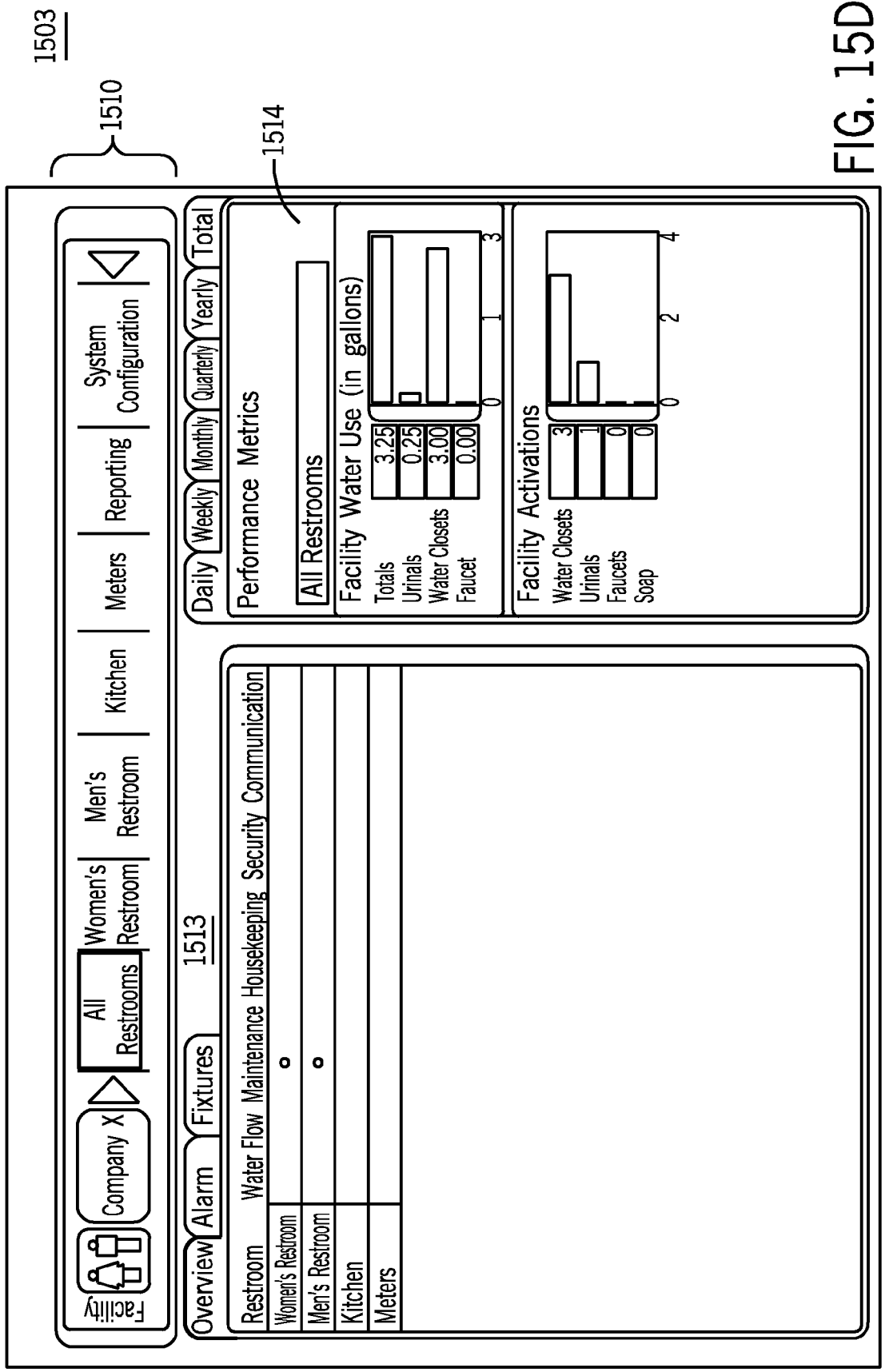
Figure 15E:
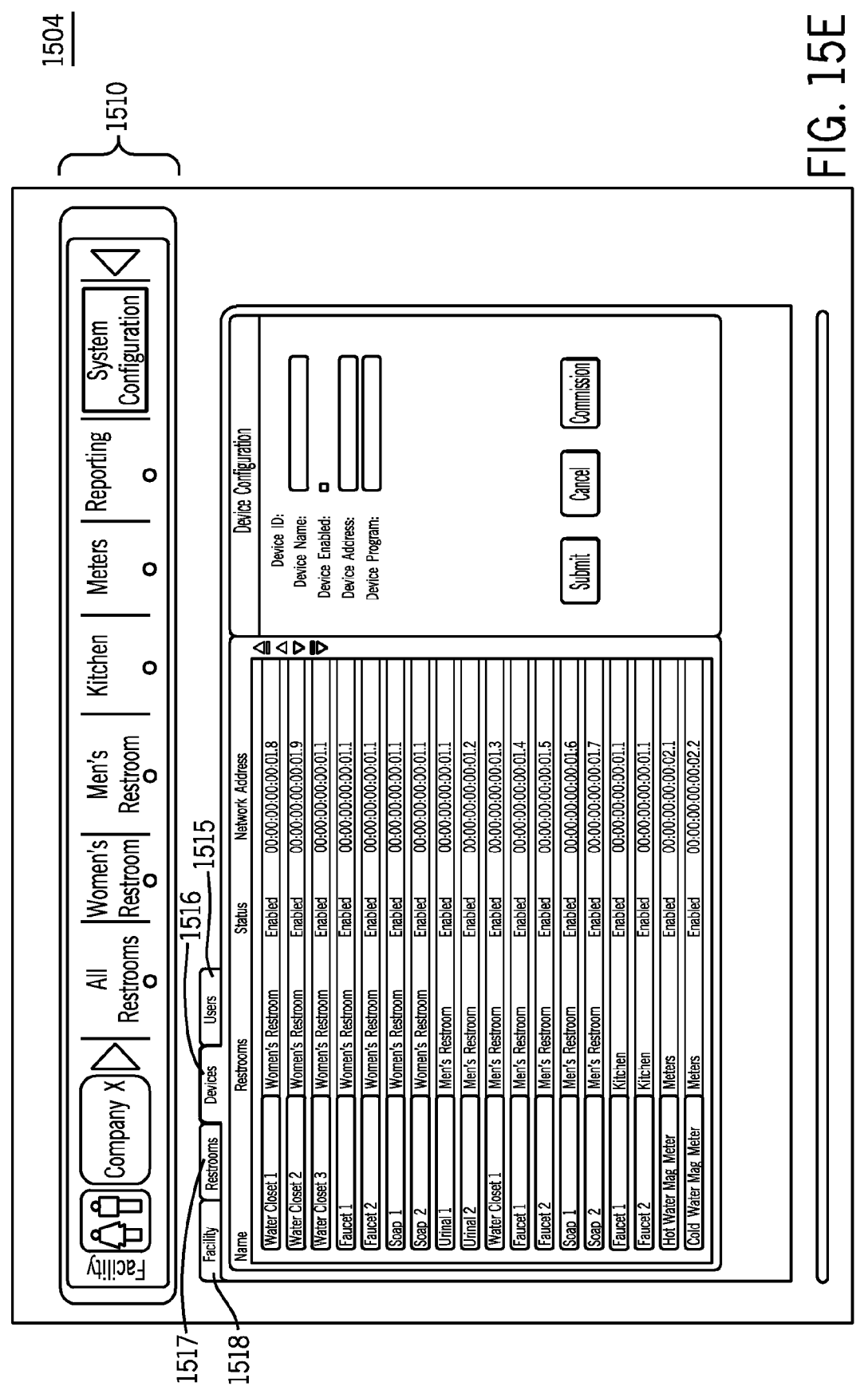
Figure 15F:
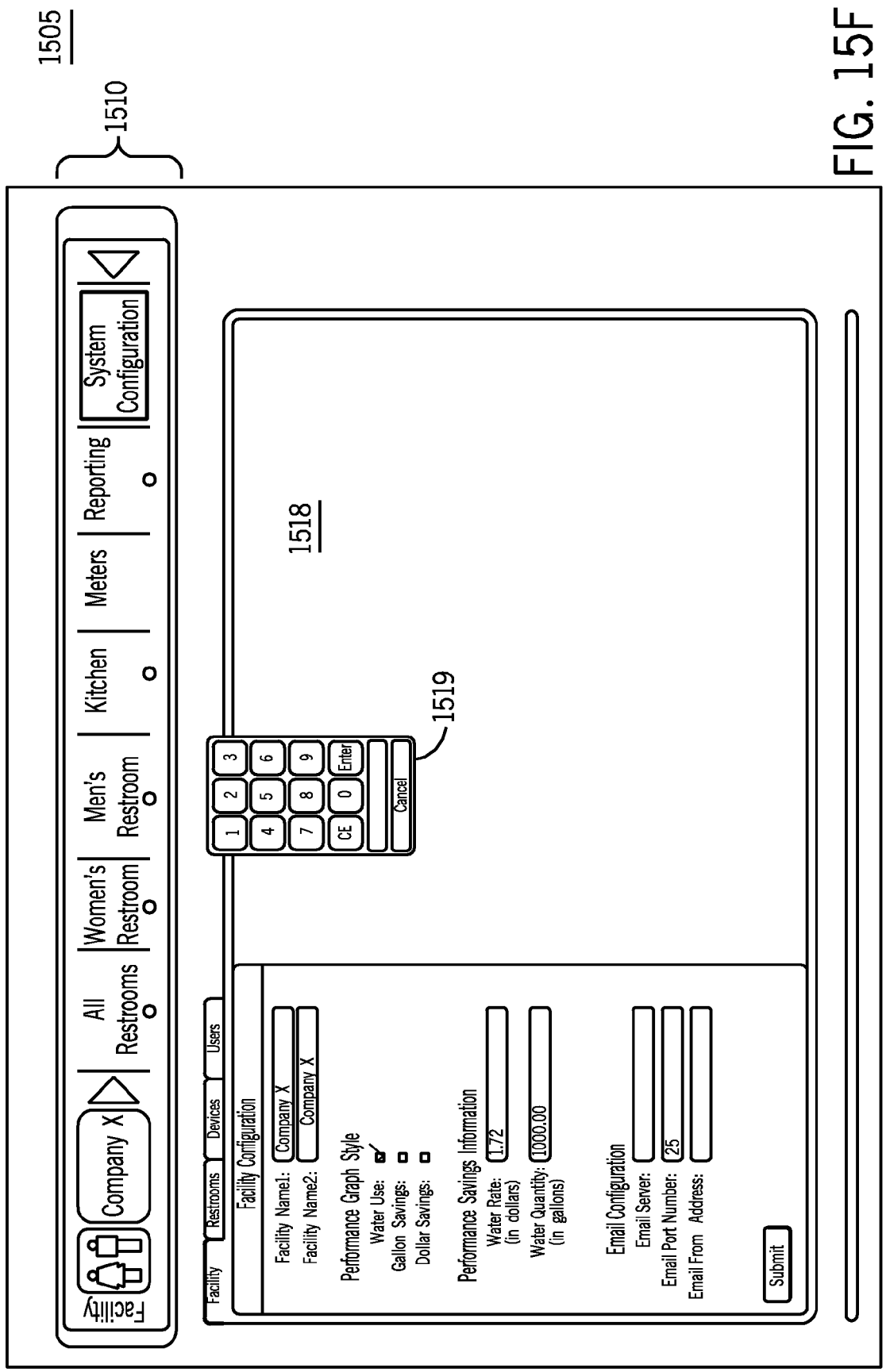
Figure 15H:
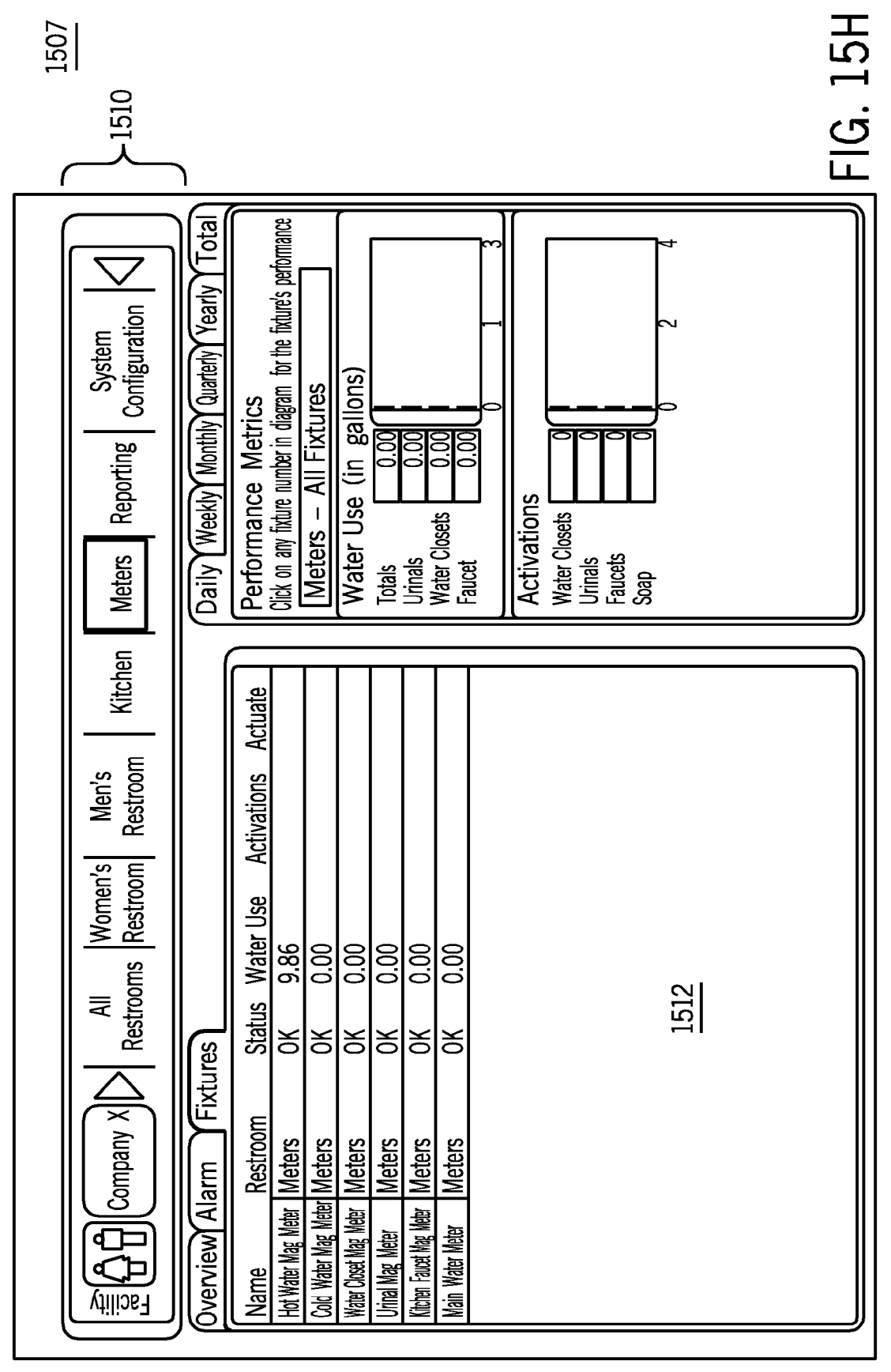

FIGS. 14A-J illustrates an alternative embodiment of user interface screens 1400-1407. The screens 1400-1407 include a tool bar or menu 1410. The menu 1410 includes, in the embodiment illustrated, links for selecting "all restrooms" 1410A, "main floor" 1410B, "first floor balcony" 1410C (corresponding to various subgroups within the facility), "reporting" 1410D, and "system configuration" 1410E. Screen 1400, of FIG. 14A, includes an overview of the information available to a user. One portion of the screen 1400 provides a tab for an overview 1411, fixture 130 1412, and alarms 1413. A second portion 1414 includes information relating to fixture 130 and their performance for the selected fixture 130 or group from the first portion. Additional information is provided via patron traffic 1415, occupancy 1416, and air quality 1417 displays. FIGS. 14B-D illustrate various embodiments of these screens 1401-1403. FIGS. 14E-F illustrate system configuration screens 1404 and 1405 respectively indicating devices screen and facility screens. The system configuration screens may be used to alter the restroom convenience center system 100 functionality and/or the functionality of the fixture 130. FIGS. 14G-H depict reporting screens 1406-1407 for reports 1420 and logs 1421 respectively FIGS. 15A-J illustrate alternative embodiments for the screens 1400-1407 for a different exemplary facility, depicted in user interface screens 1500-1507.

In one embodiment, once the ZigBee nodes for those devices have been added to the restroom convenience center controller 110 system, the system operator may then add individual devices to the restroom convenience center controller 110 system configuration using the embedded web pages in the restroom convenience center controller 110. The operator can enter identifying information and other details for each device added to the system 100, including the physical location and identifying marks or serial numbers for the unit.

Additionally, the embedded web pages can be used to modify the restroom convenience center controller 110 configuration parameters described above. That is, an end user can provide system and network parameters, facilities parameters and/or instructions, consumables, services, and notifications parameters, heuristics information, as well as calendar data related to the above parameters, e.g., for scheduling and timing replenishment actions and also even allow entry of information related to unusual or non-recurring events which will impact service or alarm conditions. Furthermore, the embedded web pages can be utilized to present various event reports, e.g., system events, facility events, and network events, such as those already described above. Various other pieces of information can be presented as well, including but not limited to, histograms, forecasting and trending data, diagnostic information, export/restore information, as well as hypertext transfer protocol (HTTP) information.

In one aspect of the present invention, restroom usage is compared to a predetermined threshold (either simple thresholds or complex states resulting from correlation of various sensed events or other statistically significant events), and if exceeded, the restroom controller generates an alarm notification with a time/date stamp and transmits such alarm to a user via one or more devices and/or sends the alarm to the global command unit. The time/date stamp can be useful in evaluating response times to such alarms which then can be further used to dynamically adjust various thresholds to ensure that alarms are set at appropriate times so as to avoid one or more of the supplies being completely exhausted.

The restroom convenience center controller 110, as described above, can be configured to deliver alerts and alarms regarding various events and conditions to responsible personnel via email. If notifications are to be delivered to a cellular handset, the text-messaging email address of that handset should be supplied as an address (e.g. 12165551234@myvzw.net). Alerts may include any of the conditions described above, and resulting alarms and/or notifications can be tagged as urgent or requiring immediate attention. Additionally, different email addresses may be assigned to different categories of alert and alarm conditions, depending upon who the responsible parties are for resolving various conditions. Alert and alarm conditions may either reset themselves if the condition is reversed, or be cleared by a system operator using the embedded web pages in the restroom convenience center controller 110.

In addition, or alternatively, based on the monitored fixture 130 usage and the generated fixture 130 usage profile, the method may further query whether the monitored usage activity of one or more of the fixture 130 deviates from the predetermined or dynamically generated usage profile. If so, an alarm notification is generated and time-stamped, and then transmitted to a user via one or more devices and/or sends the alarm to the global command unit.

Data may also be exported on-demand by accessing the embedded web pages and selecting an immediate export. This may be done for maintenance or diagnostic purposes.

As discussed above, the restroom convenience center system 100 and method of the present invention advantageously provides for real time monitoring of one or more of the fixtures 130 associated with the restroom 101, and such system and method is expandable to the monitoring and control of multiple restrooms in a large venue, for example. By providing such real time monitoring, alarm notifications associated with such functions can be communicated in a timely manner, thereby facilitating improved service need or preventive maintenance response.

Various embodiments allow the restroom convenience center controller 110 to monitor facilities usage generate an alert condition when it determines that a piece of equipment may need periodic maintenance due to accumulated usage and wear, such as those fixture 130 and aspects described above. Once maintenance has been performed on the concerned components, a system operator would acknowledge the maintenance activity to the restroom convenience center controller 110 through embedded web pages which allow interaction at the restroom convenience center controller 110 server of NOC 510-level. It should be noted that interaction with the restroom convenience center controller 110 can also be implemented remotely. For example, each restroom convenience center controller 110 consists of a system of a plurality of buildings that can be accessed, configured, modified, etc. via the embedded web pages.

In one embodiment, the user interfaces may be used to depict a restroom "figure of merit". The figure of merit gives a stakeholder information regarding a desired feature of the restroom 101 important for that stakeholder or facility. It also can provide a metric for comparing different restrooms. For instance, the figure of merit metric would be particularly useful to a fast food chain or service station business which is trying to distinguish its brand from competitors. The figure of merit could be used to print out lists of "outstanding performers", those that are "in compliance", and those that require remediation. In one embodiment, a figure of merit would be a composite score based on a number of factors, including a low number of legitimate patron call requests, availability of consumables, fixture 130 and device availability (nothing broken and off-line), VOC levels, crowding, and time of overcrowding of the restroom 101.

I. Example Usage Scenarios

Additionally, by estimating restroom traffic, the restroom convenience center controller 110 can determine how long on average it should take to deplete the consumables (soap, towels, water closet 132 paper, etc) in the dispenser 142 and send an alert via email to the party responsible for stocking the restroom 101 and ordering supplies. Moreover, the restroom convenience center controller 110 can send an email directly to the supply depot requesting a shipment of supplies, thus automating the resupply process. It should be noted that the restroom convenience center system 100, including one or more restroom convenience center controller 110 and one more sensors 112 for each restroom facility, can be scaled appropriately depending upon the environment. In other words, a first restroom facility can be outfitted simply with a single restroom convenience center controller 110 that it is able to harness the collective randomness of previously unused and/or discarded data gleaned from existing presence sensors 150 to effectively predict indirect water usage, consumable replenishment, and appropriate service responses, as well as redirect patron traffic to alternative ones of the restroom fixtures 130 and/or other restroom facilities.

In one exemplary preferred embodiment, the restroom convenience center system 100 interfaces with a user such that selected critical sensor information can be used to monitor general availability of the fixture 130 in the restrooms 101, monitor the presence of a user in certain general locations of the restroom 101 and collect critical timing information needed to evaluate service requirements and fixture 130 availability in the restroom 101.

Figure 16A:
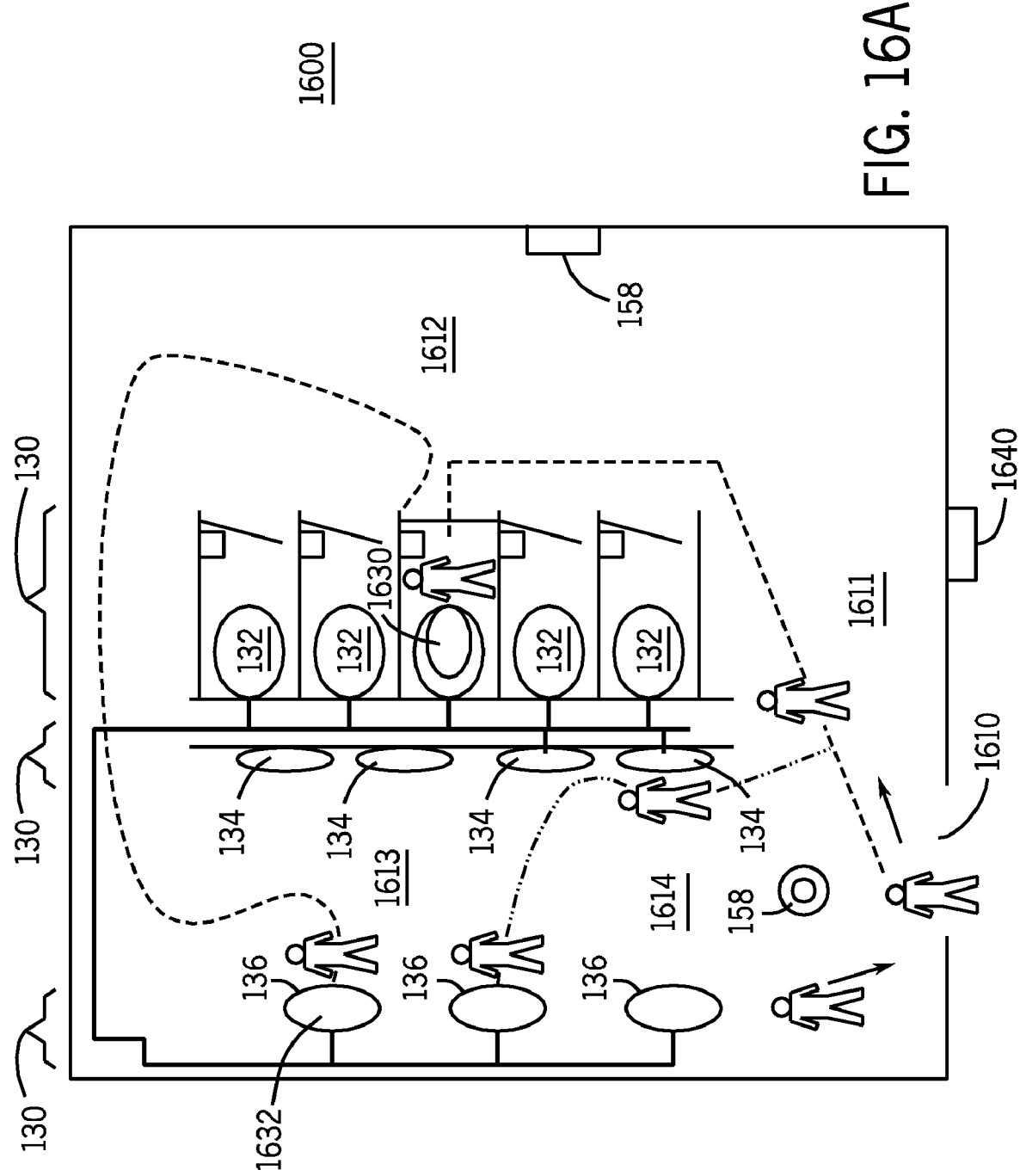
FIG. 16A illustrates a potential low volume traffic pattern occurring in one embodiment of the invention.

During a low service level state, illustrated in FIG. 16A, the restroom 1600 can be characterized by no visible queues at fixture 130 (such as water closets 132 or faucets 136) such that the restroom 101 has excess capacity. As the user enters the restroom 1600 via a door 1610 to a first area 1611, the user activates a patron counter 158, which generates a time stamp data for entry into the restroom 1600. This time stamp date is stored by a memory component; either of the patron counter 158 or the restroom convenience center controller 110. The user then moves to any location within the restroom 1600, or can even decide to immediately leave. If the user moves to the water closet 132 or the urinal 134, the presence sensor 150 can detect general location and even position at the given water closet 132 or the urinal 134. Once the user engages the selected fixture 130, additional timing data is collected and stored by the memory component and used for system processing, analysis and action items, such as consumables replacement or repair of an apparently nonfunctional fixture 130. Then, once the user engages a specific fixture 130 1630 at a second location 1612 out of the fixture 130, such as the water closet 132, the urinal 134, the faucet 136 and a hand drying component (not shown), the presence sensor 150 (associated with the water closet 132, urinal 134, and faucet 136) moves into an alarmed state and an accumulated time is also stored for use by the restroom convenience center controller 110. Once the user disengages the selected fixture 130, the associated presence sensor 150 moves from the armed state, then to an activation state and then back to a standby mode state upon the user leaving the detection zone, thus awaiting a new user to repeat the timing cycle.

The user may then choose to go to a third location 1613 in the restroom 101 to engage another of the fixtures 1632, 1634, such as a changing or work station or the faucet 136. The user then initiates washing of their hands by activating faucet water flow and/or the soap dispenser 142. The faucet 136 has an associated sensor 153 (use FIG. 1) that activates a timing cycle much as was done for the water closet 132 or the urinal 134 to accumulate useful timing information (time elapsed as well as actual start and end time) for use by the processing system. For automatic faucets, as previously discussed, the logic of operation has the faucet 136 in a "stand by mode" or an "on mode", and thus, the time stamp will be for an "on mode" then to an "off mode" once user leaves the faucet. The sink can further include other disposables, such as soap, hand sanitizer and paper towels from dispenser 20. Once any user leaves the restroom 1600, via area 1614 the restroom convenience center controller 110 time stamps departure time for use by the processing system. The restroom 1600 can further include other features, such as the patron call device 173 which can be tracked by the restroom convenience center controller 110.

Figure 16B:
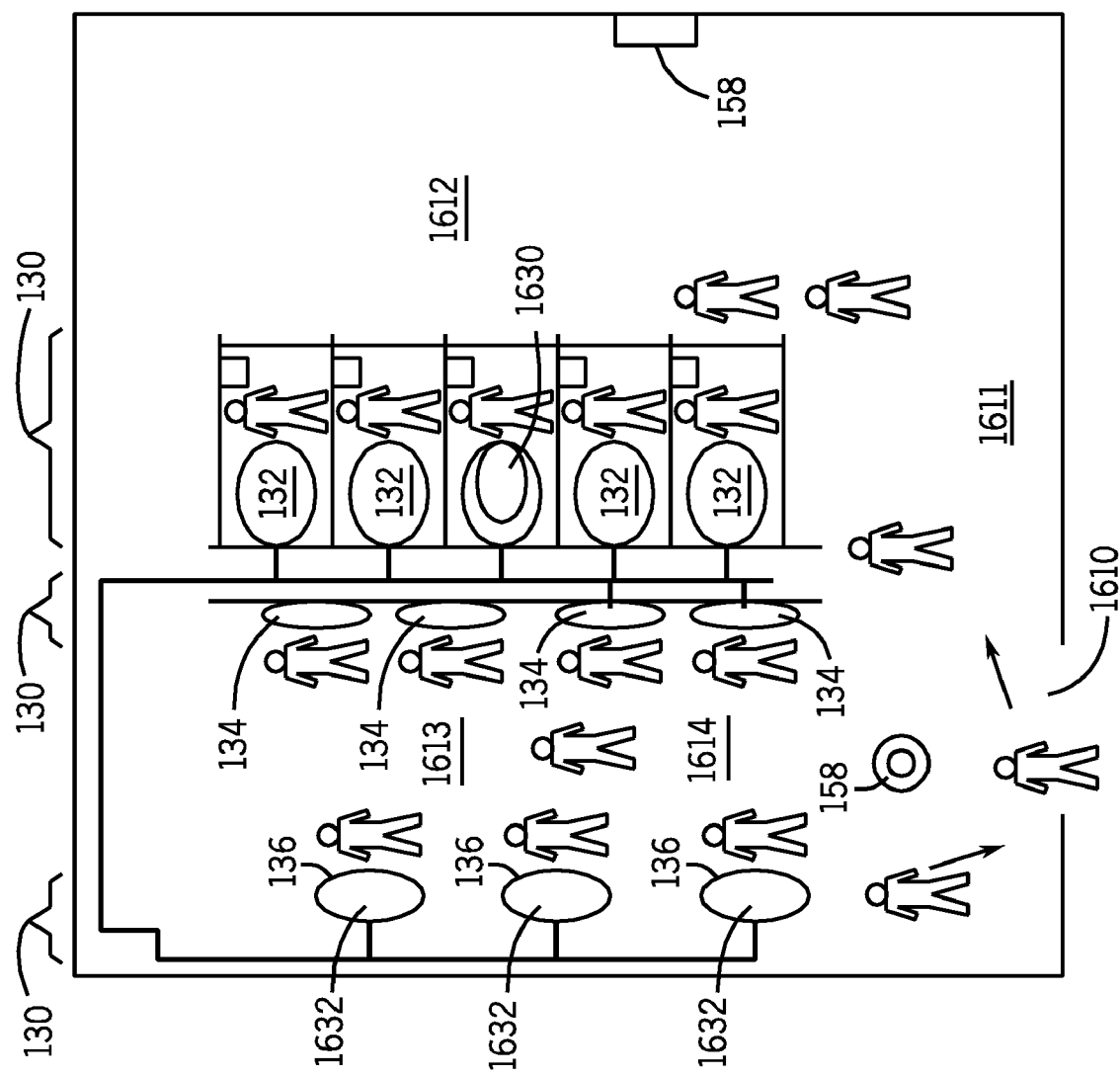
FIG. 16B illustrates a potential high volume traffic pattern occurring in one embodiment of the invention.

In another exemplary mode of operation when the restroom 101, illustrated in FIG. 16B, is operating during peak loading by users, more users are present then the number of the fixture 130. In such a situation, the user enters through the door 1610 and activates the patron counter 158 that generates associated time stamp data for use by the restroom convenience center controller 110. In the peak loading mode, queues develop for each of the fixtures 130 such that rapidity of time turnaround is logged for each of the fixture 130 and that data is processed for use by the restroom convenience center controller 110. This system 100 can then analyze the data and evaluate such information as ratio of users to fixture 130 being available with knowledge of departing versus entry of users (such discernment of entry versus departure can also be determined by appropriate joint use of a patron counter 158 and the presence sensor 150). In addition, during periods of frequent use of the restroom 1600, the air quality sensor 156 [not shown in FIGS. 16A-C] could have an associated peak in detection of gases and even particular profile characteristics of the status of use of the fixture 130 and time of use of each of the water closets 132. In addition, the timing information associated with the wash station (faucet) 136 can also be correlated to frequency, as well as, number and time of use of the faucets 136, thereby enabling gathering of data useful for restroom sensing of the consumables being expended and consequent scheduling of consumables replacement or other services.

Figure 16C:
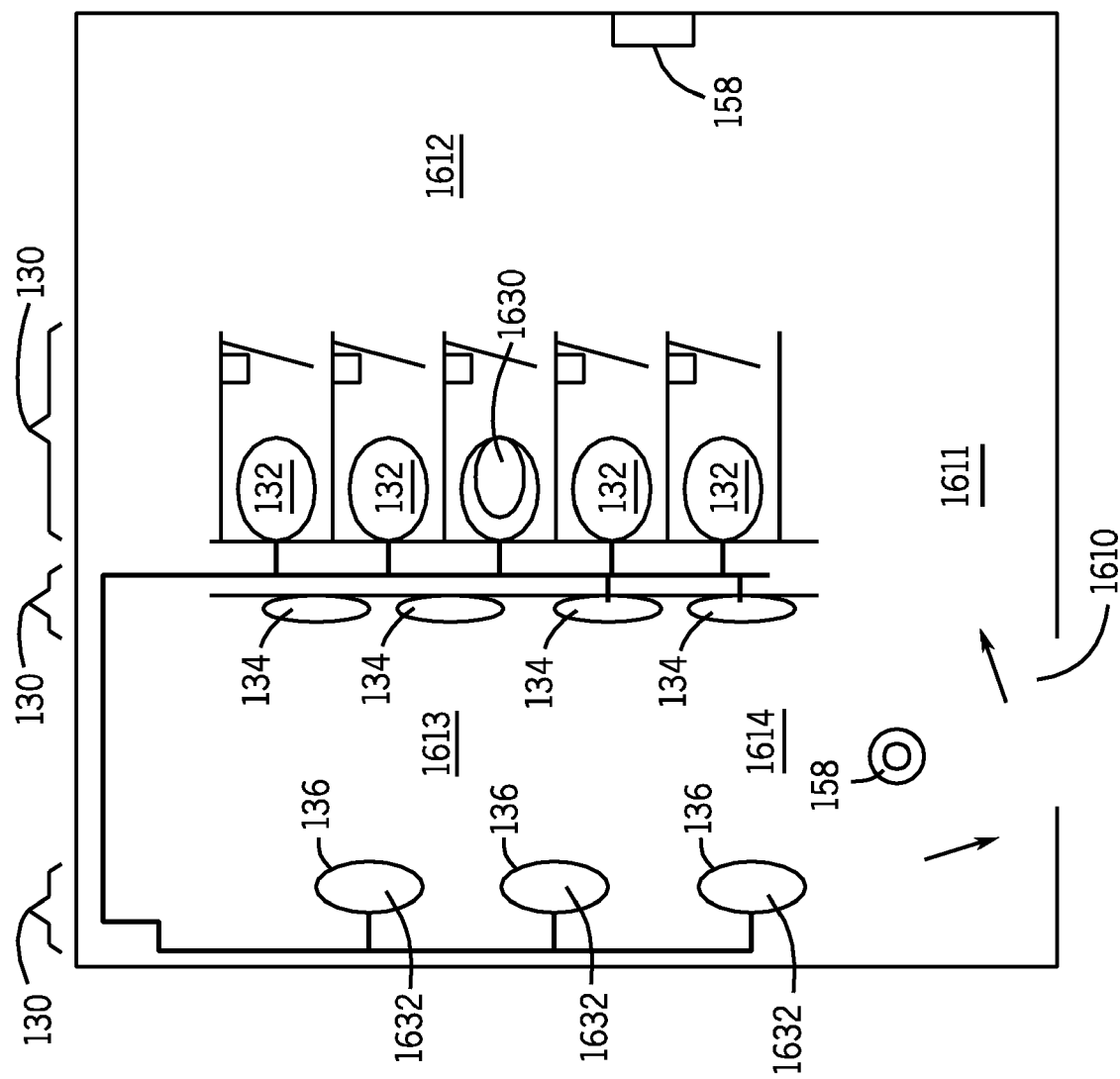
FIG. 16C illustrates a potential no volume traffic pattern occurring in one embodiment of the invention.

FIG. 16C illustrates the restroom 1600 of FIGS. 16A-B in a no volume traffic pattern, such as during period when a building is unoccupied.

In another exemplary aspect of the invention, the restroom convenience center system 100 can use the restroom data obtained as described herein, to provide potential users with helpful information. For example, informational restroom signage 1640 (FIG. 16A) could be provided at the entry to the restroom 1600 and even at each of the fixture 130 within the restroom 1600. Thus, when the restroom 1600 has available the fixture 130, such information can be displayed. When the restroom 1600 is under heavy use, the signage 1640 can indicate which of the fixtures 130 are available with associated wait times and can also indicate alternate available restrooms with fixture 130 ready for use in less crowded alternate restrooms. Further detailed information such as queue times can be provided via the external or even internal signage for specific fixtures 130. With knowledge of rate of entrance and exit by user, the restroom convenience center controller 110 can also apply various predictive models to project fixture 130 wait time and availability probabilities.

With reference to FIGS. 21, 22A-D, and 23A-D illustrate observed data from a sample restroom 101 with a patron counter 158 and flushometer fixture 130 counting flushes being provided. It will be appreciated by one of ordinary skill in the art that FIGS. 21, 22A-B, and 23A-D provide an indication of various thresholds, correlations, and weighting that could be used in accordance with the principles of the present invention. FIG. 21 is a table depicting raw data log of restroom entrances and fixture flushing over 47 days for two restrooms 101, one male and one female in a high traffic environment. It can be observed that there is very good one to one correlation between male visits and fixture flushing with only a 3½% difference in the number of users entering the restroom 101 and the number of fixture activations. By contrast, the female restroom has a 40% difference in the count of users entering the restroom and fixture activations. This shows consistent multiple flushing on the part of the female users when compared to the male users.

Figure 22A:
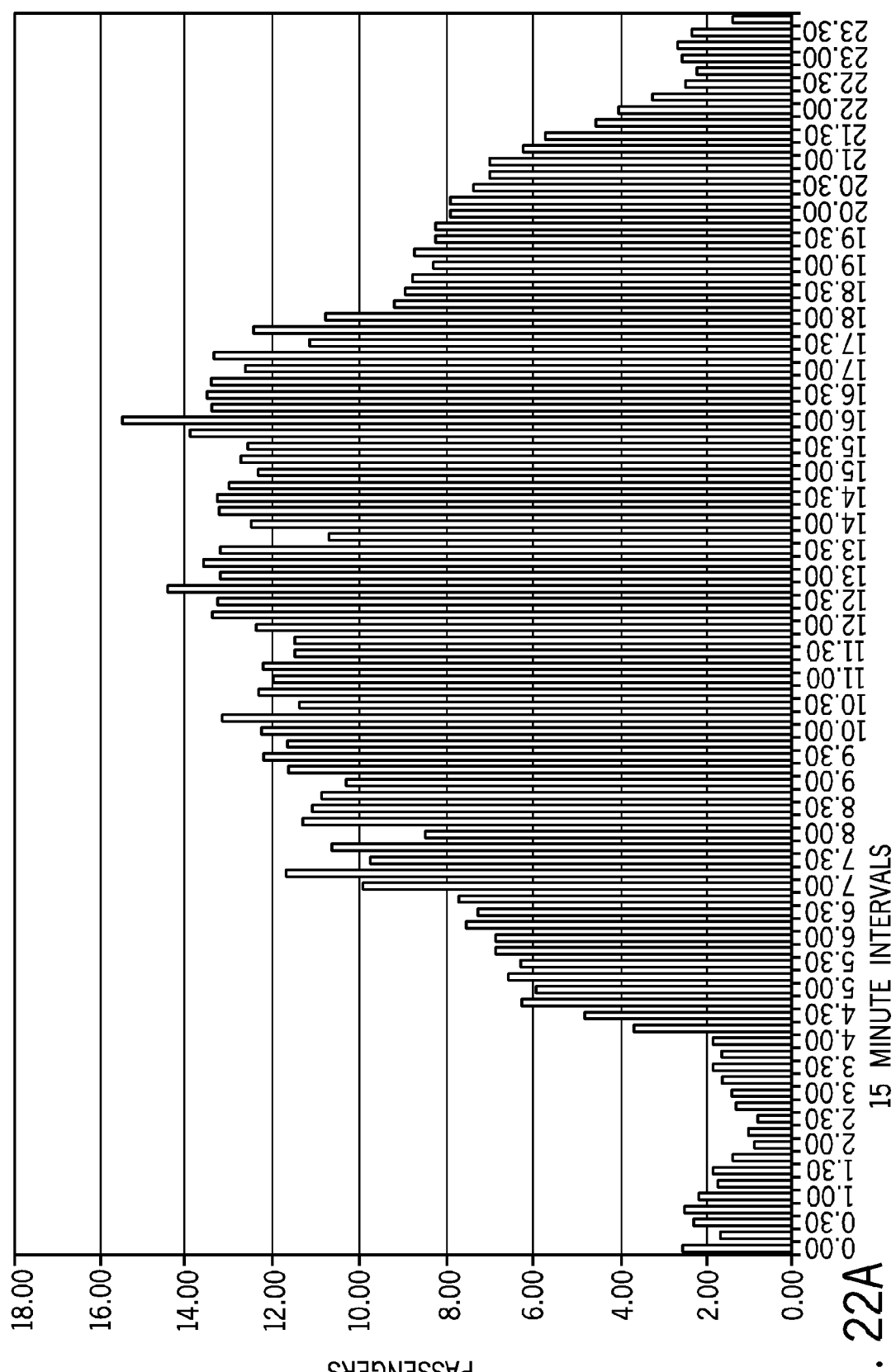
FIG. 22A illustrates a plotted graph of arrivals to a commercial female restroom versus time of day.
Figure 22B:
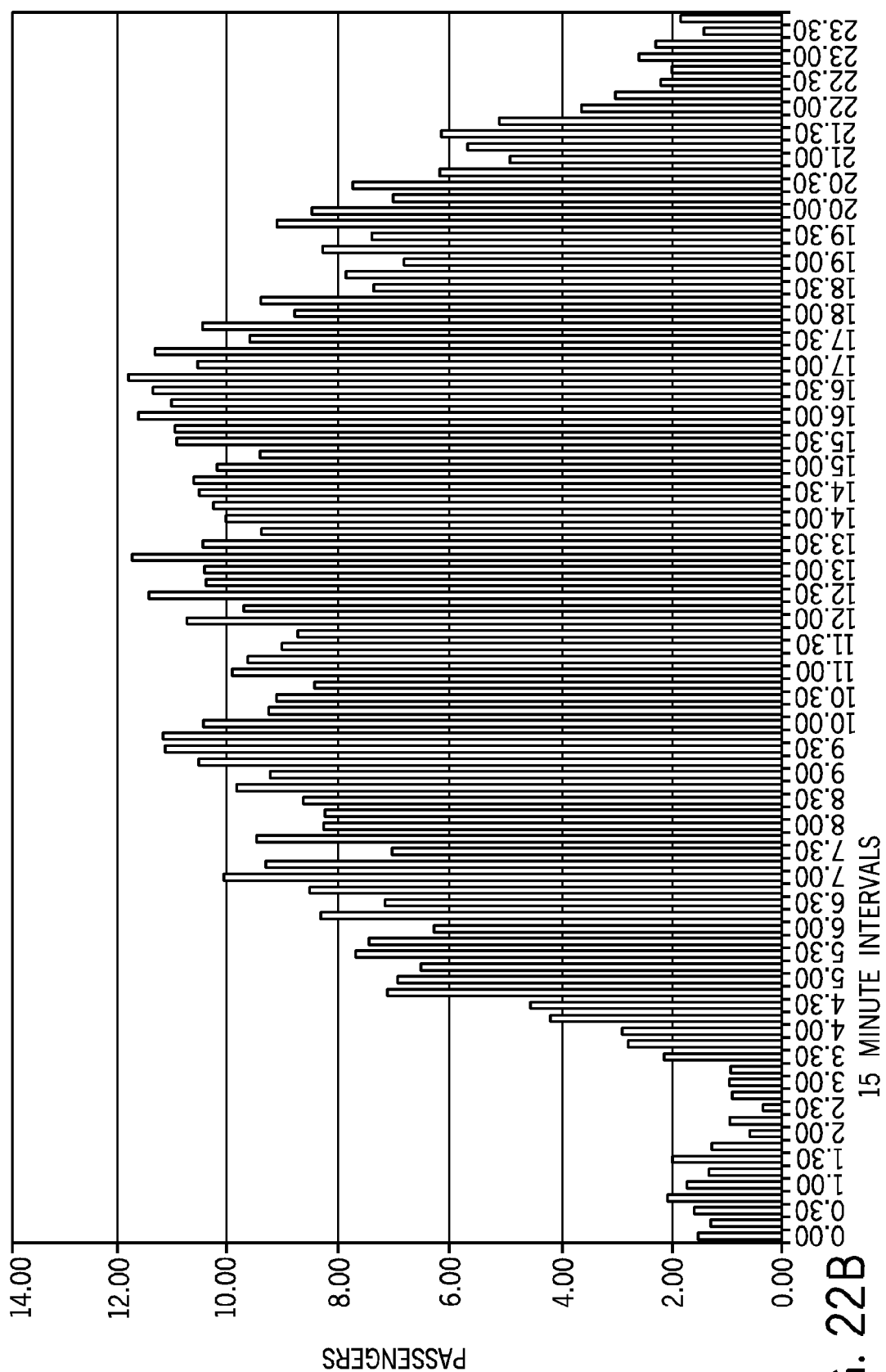
FIG. 22B illustrates graph data of another set of arrivals versus time of day.
Figure 22C:
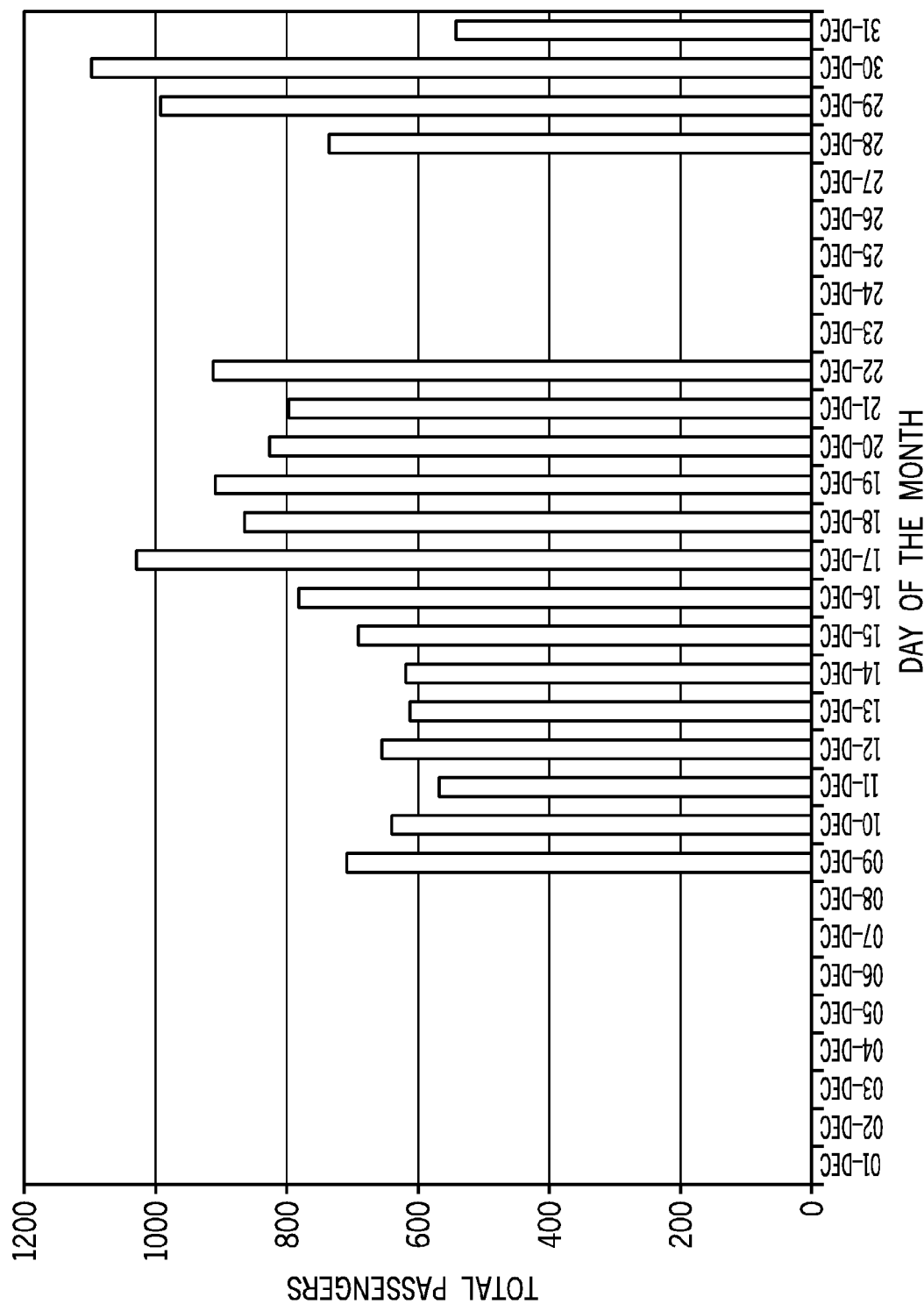
FIGS. 22C and 22D plot total arrivals per day over selected months to a commercial female restroom.
Figure 22D:
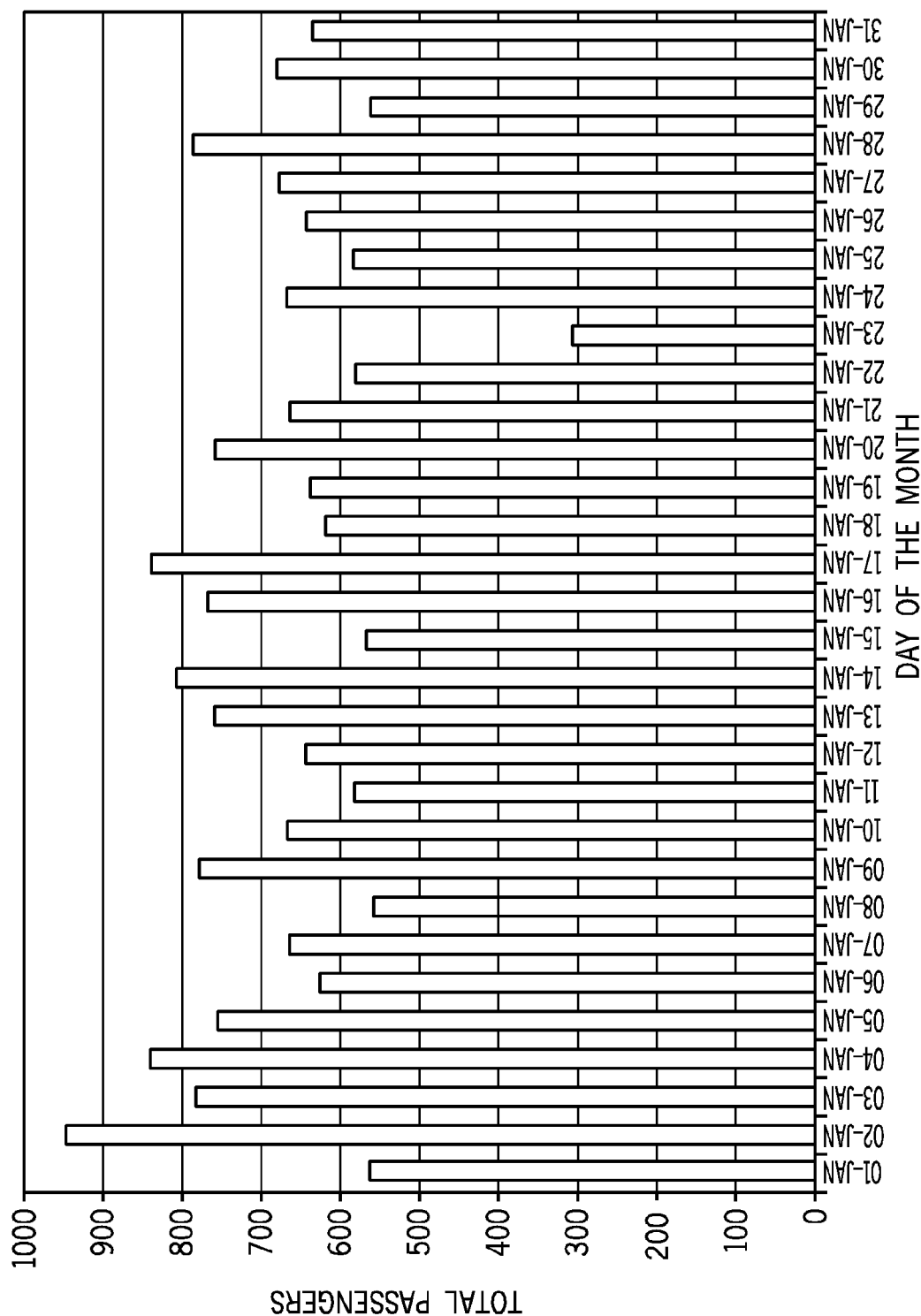
Figure 23A:
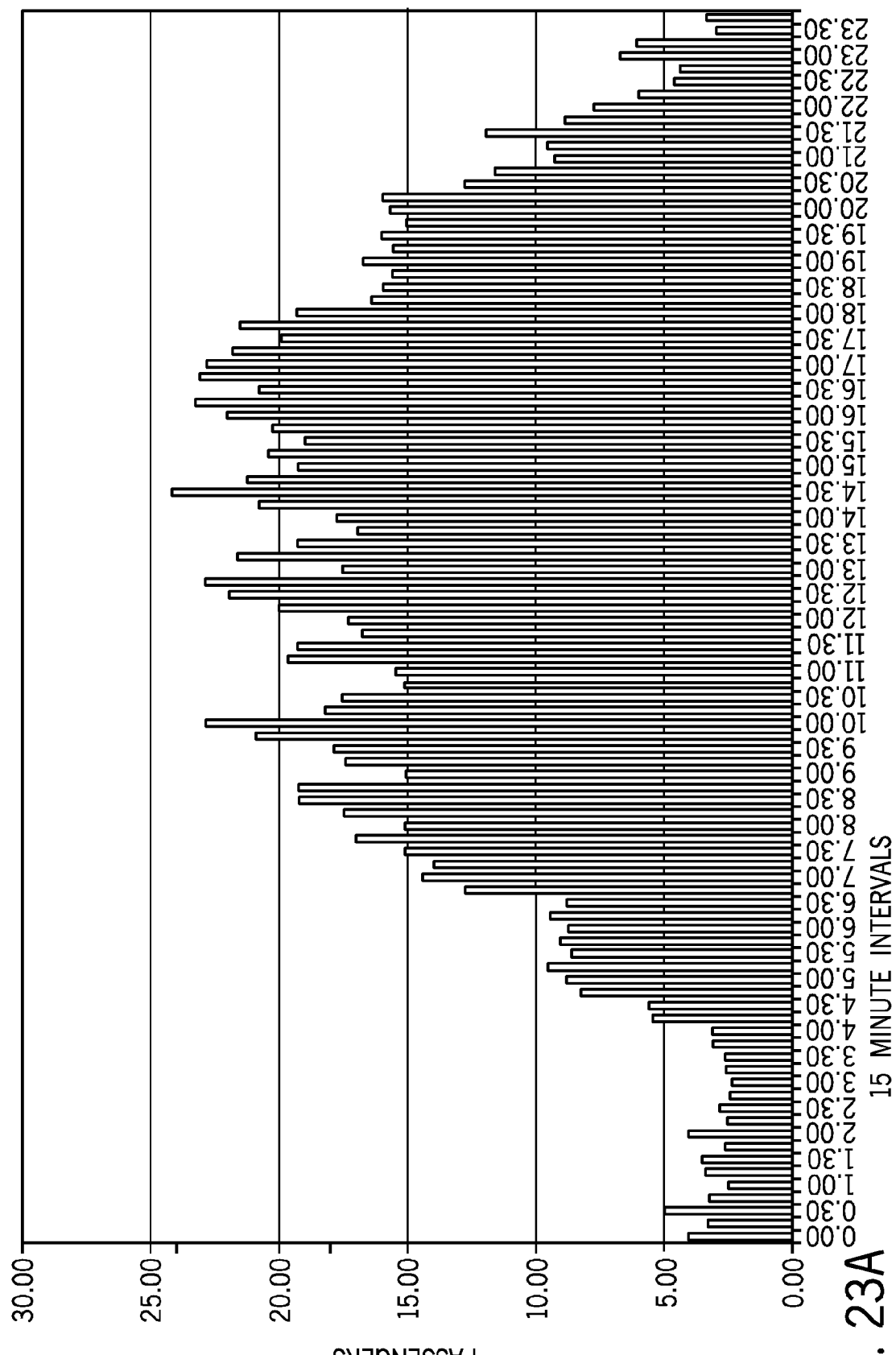
FIGS. 23A and 23B plots average counts of users entering a commercial male restroom versus time of day for selected months.
Figure 23B:
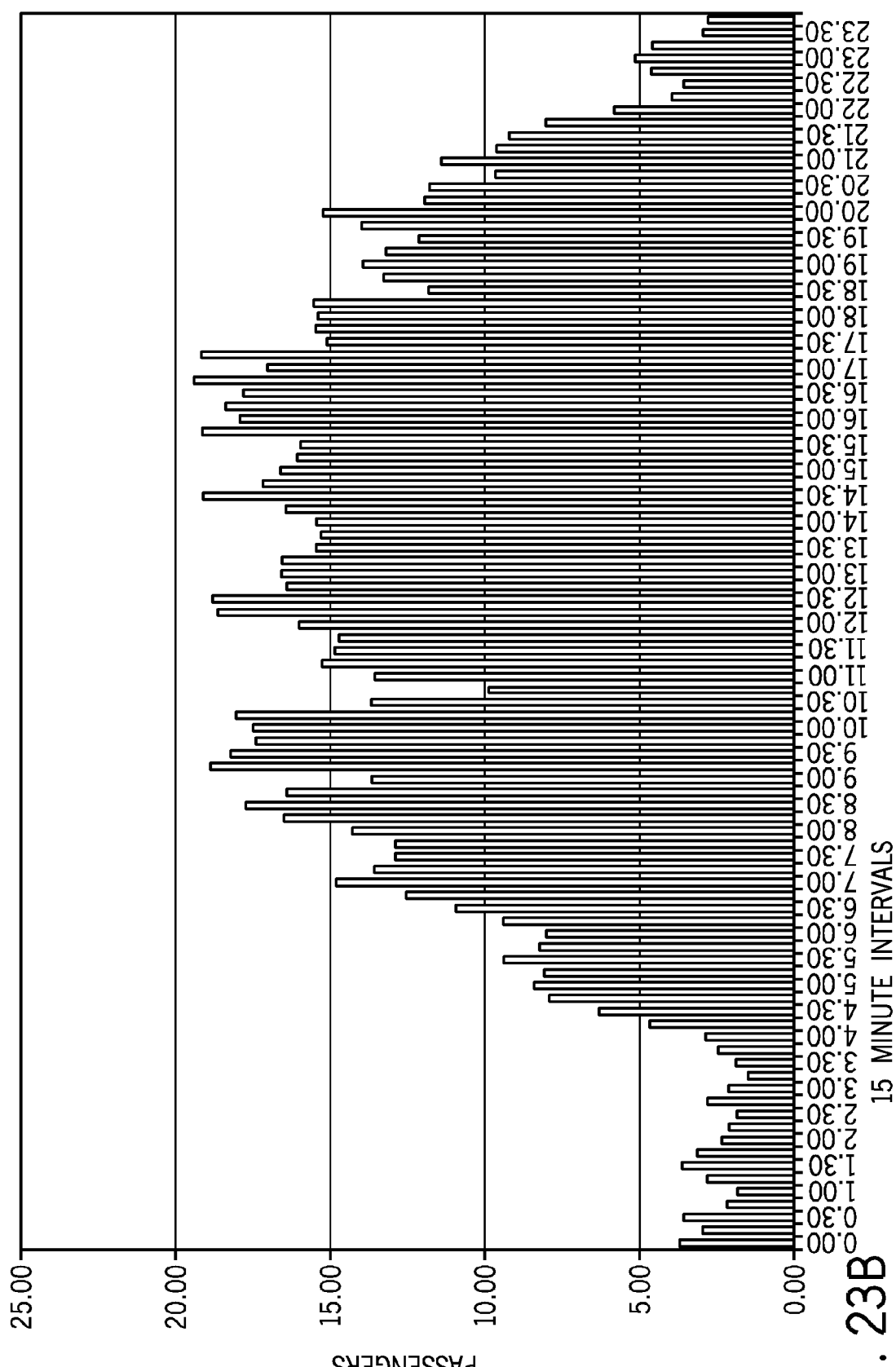
Figure 23C:
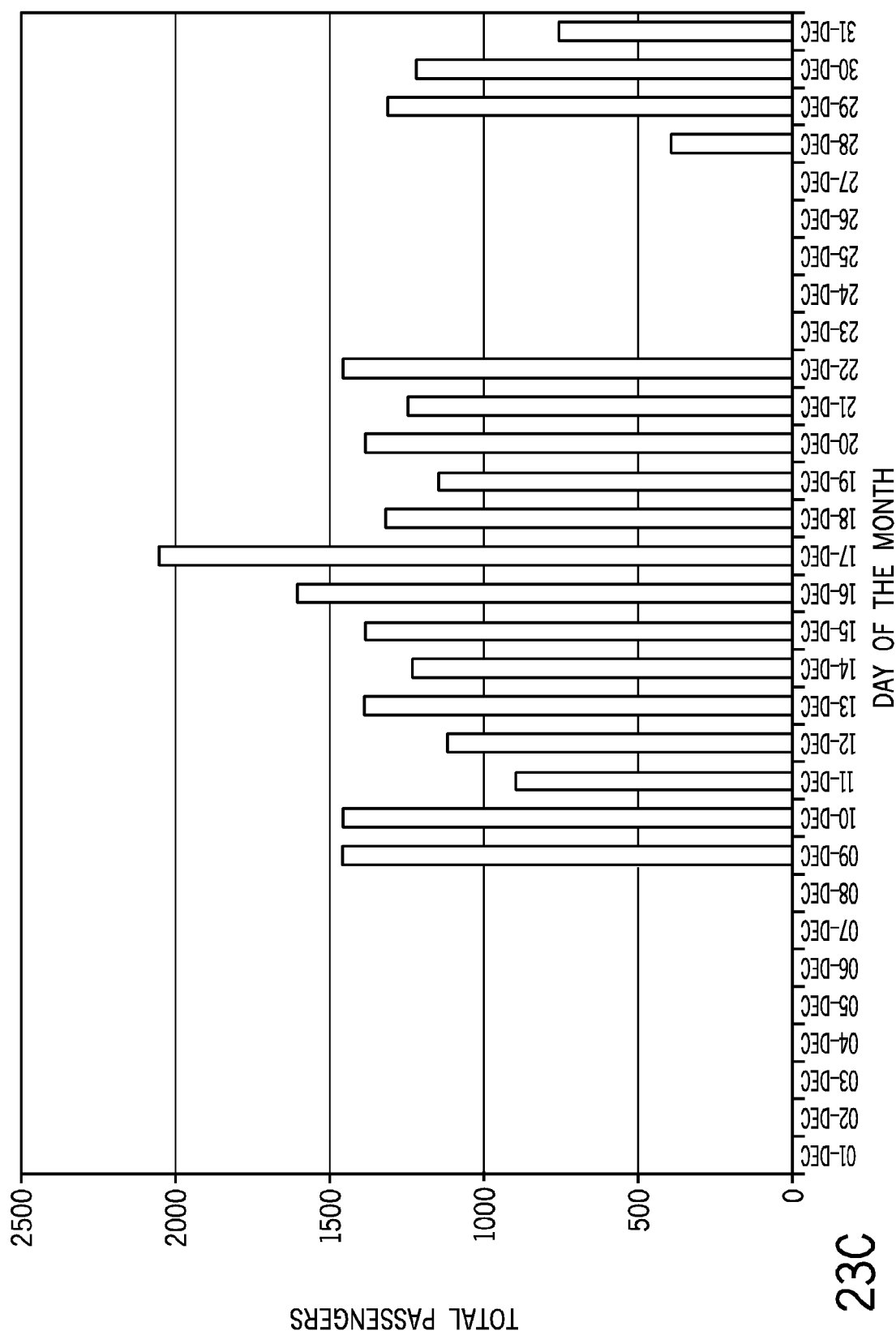
FIGS. 23C and 23D plots total counts of users entering a commercial male restroom versus time of day for days of selected months.
Figure 23D:
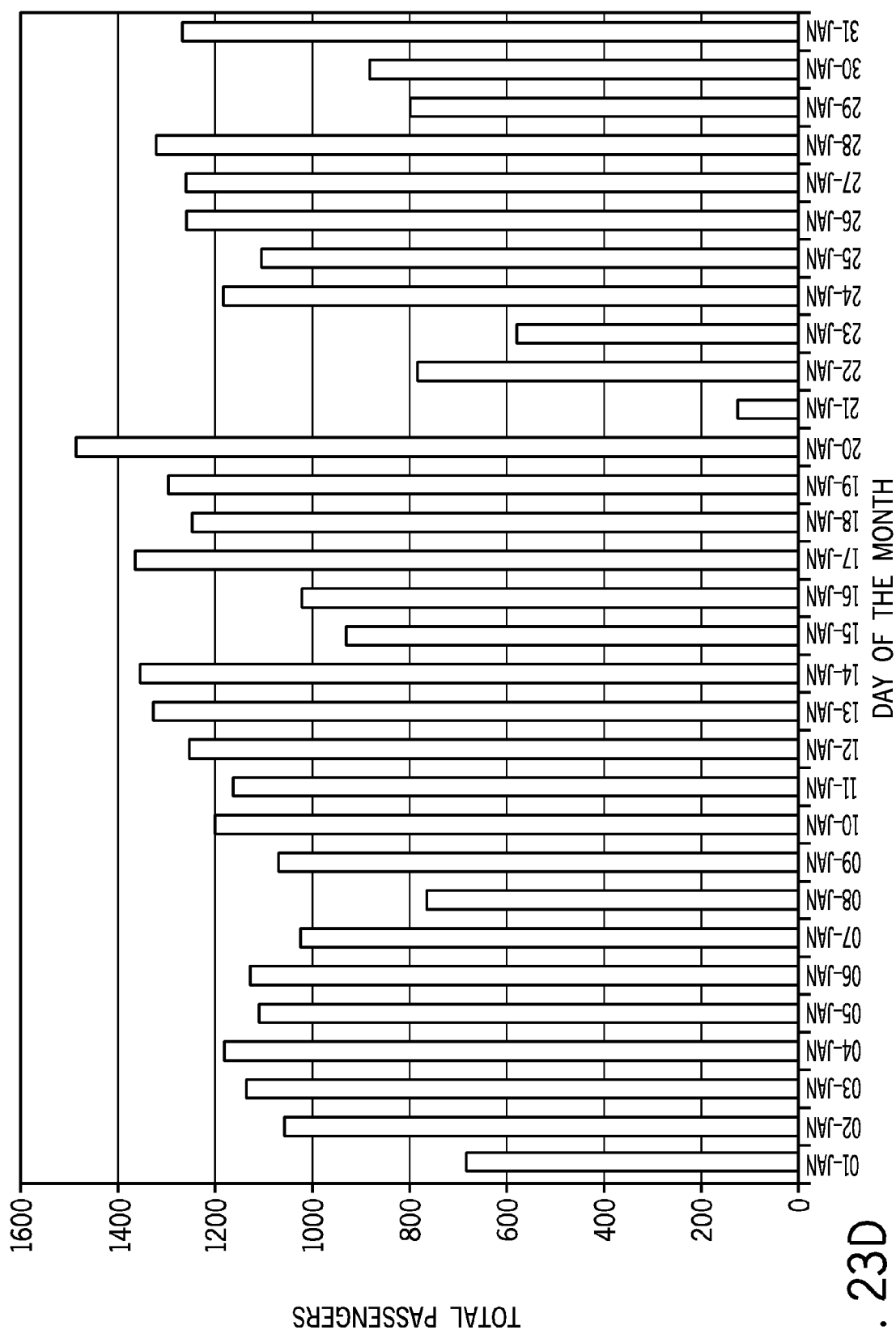

FIG. 22A illustrates average traffic during the day (over the course of a month) in 15 minute increments for the women's restroom 101, and FIG. 22B illustrates the same for a different month. FIG. 22C illustrates the daily totals for the same restroom 101 and month of FIG. 22A. FIG. 22C illustrates the daily totals for the same restroom 101 and month of FIG. 22B. FIGS. 23A-D illustrate the same respective information as FIGS. 22A-D except for the men's restroom 101. Patterns of use can be approximated by the system as a function of acquired patterns of data and that data can be leveled for predictive analysis.

J. Traffic Intensity Index

Traffic intensity is the measure of the congestion of the restroom 101. It is used to anticipate pending queues within a system. Specifically it compares the rate of arrivals to the rate of departures.

With a traffic intensity index nearer to zero, there is very little queue time in the system. With a traffic intensity closer to one, the occurrence of queuing within the restroom 101 increases. In any given commercial restroom, the traffic counter of arrivals and departures for a unit of time is an early warning indicator that the restroom 101 is reaching a "saturation" and queuing models begin to be employed. The queuing models are then used to balance traffic to other proximate restrooms 101 by giving patrons information on making decisions based upon average anticipated queue times for the restroom 101 and to notify service personnel (or the RCC system) of any imminent service events or alarm states. People entering and leaving the commercial restroom 101 generate the following index as characterized by FIG. 20.

Figure 20:
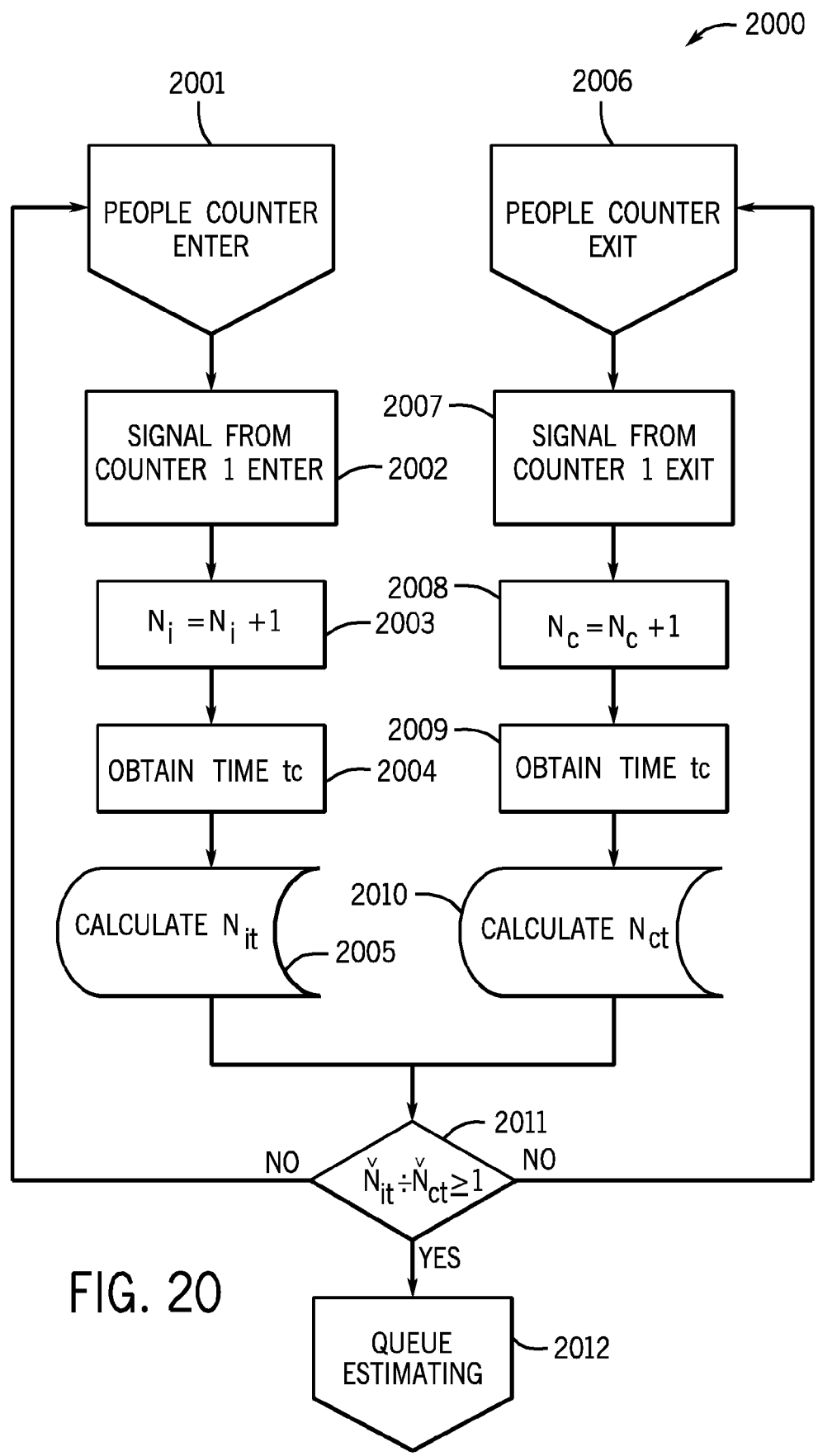
FIG. 20 illustrates a flow chart depicting the general logic to calculating traffic intensity index of a commercial restroom; the measure of how quickly a rapid arrival of users is being serviced.

FIG. 20 illustrates a flow chart depicting logic for carrying out one embodiment of the above described feature. In FIG. 20:

$N_i$=number of people counted entering the restroom
$\check{N}_{it}$=Average number of people entering restroom per time t
$N_e$=number of people counted leaving the restroom
$\check{N}_{et}$=Average number of people leaving restroom per time t
$t_c$=System time stamp traffic count.

With continued reference to FIG. 20, the queuing logic 2000 tracks both people entering and people leaving. At step 2001, a patron enters the restroom 101 passing through the detection zone of the patron counter 158. At step 2002, an entrance signal is received by the restroom convenience center 100. At step 2003, $N_i$ is increased by one to account for the entry of the person in step 2000. At step 2004, a time corresponding to the traffic count is obtained. At step 2005, $\check{N}_{it}$ is calculated to determine the average number of people entering per time period. Essentially in parallel, the system 100 also tracks the number of patrons exiting. At step 2006, a patron exits the restroom 101 passing though the detection zone of the patron counter 158. At step 2007, an exit signal is received by the restroom convenience center 100. At step 2008, $N_e$ is increased by one to account for the exit of the person in step 2006. At step 2009, a time corresponding to the traffic count is obtained. At step 2010, $\check{N}_{et}$ is calculated to determine the average number of people exiting per time period. At step 2011, the traffic intensity index is calculated by dividing $\check{N}_{it}$ by $\check{N}_{et}$. If the value is greater than or equal to 1, then a queuing estimate is provided at step 2012; if the intensity index is less than 1 the system 100 returns to steps 2001 and 2006.

With similar generated data for patrons being counted during exiting, traffic intensity ratios can be determined. This calculated ratio for a restroom 101 can indicate if queuing might be present within the restroom 101 and patrons may experience a wait once entering the restroom 101. In one embodiment, when the traffic intensity ratio goes beyond a value of 1, the system 100 begins analyzing the individual fixture data to determine expected queue times based upon the service level of the individual fixtures 130. It should be appreciated that various methods and models can be used to predict the expected queue time, but one non-liming example follows classic parallel server models in queuing theory assuming a Poisson distribution of patron arrivals at the fixtures.

The average wait time T might be defined;

$$T = \frac{1}{\mu - \lambda}$$

$\mu$=average service rate
$\lambda$=average arrival rate.

Where a statistically significant service rate is generated by the system with extracted data. The average arrival rate, one can appreciate is a trivial value the system has already generated per unit of time.

As long as the traffic intensity ratio for the restroom 101 remains at 1 or greater, each set of information from the sensor 112 in the restroom 101 corresponding to an individual fixture 130 is analyzed in real time in order to determine how much time remains before the next fixture 130 becomes available for patrons in the queue. This information gets correlated to arrive at a probability for broadcasting beyond the restroom 101 perhaps to digital message boards either above the occupied fixtures 130 or in the hallway before entering the restroom 101. Unoccupied fixtures within a restroom experiencing queues, having digital messages above each fixture could broadcast a message of the availability. Moreover, if during high queue times a particular fixture fails to experience use by a patron in the queue, an alert to this anomaly is trivial for the system to generate and send.

At any time during non peak hours the traffic intensity ratio for the restroom 101 is less than 1 the individual fixture data is continually stored for analysis. This data is used for various maintenance subroutines as well as inferential data on other consumables in accordance with the principles of the present invention.

In this embodiment, an important aspect is always knowing what the service rates are for the individual fixtures 130 for a given restroom traffic profile, which, as has been discussed previously, may vary from installation to installation and even type of population using the facility at any given time. With gathered data for various traffic patterns, any given fixture 130 can have an average service time estimated based upon historical stored data against that fixture 130. Having an estimated average service time allows the system 100 to estimate service time when the restroom 101 begins experiencing queue times. Table 2 illustrates the activity of the presence sensor 150 associated with the fixture 130 and the corresponding activity of the restroom convenience center controller 110.

TABLE 2

| USER IN RESTROOM | FIXTURE SENSOR | SYSTEM |
|---|---|---|
| User enters fixture sensor range | Sensor detects object and starts internal clock to determine valid target. | |
| User is detected by fixture sensor | Sensor determines a valid target, sensor goes into armed mode, generates a time stamp. | Signal sent to RCC to generate a time stamp |
| User exits fixture sensor range | Sensor activates fixture, goes into stand by mode and generates a time stamp. | Signal sent to RCC to generate a time stamp. |
| Fixture enters standby mode | Sensor returns to searching for a valid target. | Signal sent to RCC automatic fixture ready for another user. |

Figure 24:
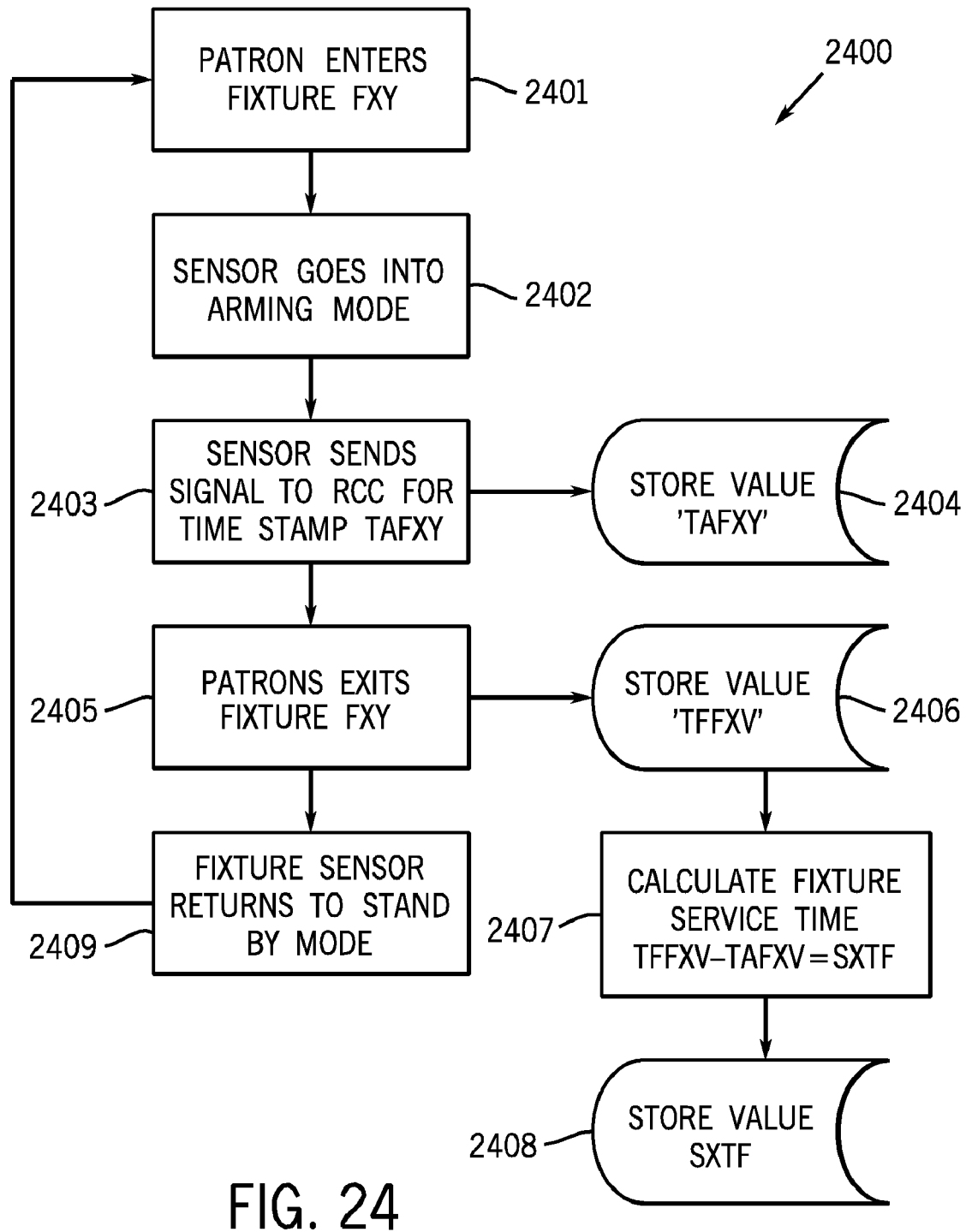
FIG. 24 illustrates a general flow of acquiring sensor data of arm time and activation time to determine service rate of a fixture with sensor to calculate anticipated fixture occupancy time.

FIG. 24 illustrates this in flowchart form, wherein:

$f_{xy}$=Fixture numbered 'x' in restroom 'y'

$ta_{fxy}$=time stamp fixture x when sensor is armed in restroom 'y'

$t_{fxy}$=time stamp of fixture x when sensor activates plumbing fixture in restroom 'y'

$t_{fxy} - ta_{fxy}$=length of service for fixture x=Sx (@time $t_f$)

$X = \Sigma f_{xy}$, x=1 to X

The logic for predicting queue time 2400 begins, at step 2401, with the patron trigger detection associated with a particular fixture "x" in the restroom 101, such as by presence sensor 150. The presence sensor 150 goes into armed mode at step 2402. At step 2403, the sensor sends a signal to the restroom convenience center controller 110 which is time stamped. The value of $ta_{fxy}$ is stored at step 2404. At step 2405, the patron exits the fixture 130, resulting in the sensor 150 exiting the armed state. The corresponding signal is time stamped and then stored as $t_{fxy}$ at step 2406. The restroom convenience center controller 110 then calculates, at step 2407, the fixture service time by $t_{fxy} - ta_{fxy}$. At step 2408, the calculated value is stored as $S_x t_f$. At step 2409, the presence sensor 150 returns to standby mode and the system 100 returns to step 2401. One can additionally appreciate that when an expected activation of water is anticipated by the above, a simple edit check can be trivial for the system 100 to accomplish by perhaps water flow detection.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

What is claimed is:

1. A method for automatically generating work orders for a restroom comprising;

sensing a state for each of a plurality of fixture sensors;

sensing a nonfixture state from a non-fixture sensor associated with the restroom;

communicating the sensed states to a controller;

determining by the controller a state of a non-sensorized restroom fixture not associated with one of the plurality of fixture sensors based on inference from the sensed states, the non-sensorized restroom fixture not in communication with the controller;

for each of a plurality of types of consumable dispensers within the restroom, calculating the use of a consumable based upon the sensed state of at least one of the plurality of fixture sensors and one or more of, the sensed state of the nonfixture state from a non-fixture sensor associated with the restroom, and the determined state of the non-sensorized restroom fixture by, for each of the plurality of types of consumable dispensers, applying a fixture to consumable correlation factor associated with the fixture sensor;

determining by the controller when the total amount of consumable used for each of the plurality of types of consumable dispensers surpasses a predetermined threshold; and issuing a work order for replenishment from the controller, indicating the type and amount of consumable to be replenished for which the respective threshold has been surpassed.

2. The method of claim 1, further comprising generating a time/date stamp for each sensed state.

3. The method of claim 2, further comprising generating historical use data of the restroom based on the sensed data and time/date stamp and storing the historical use data.

4. The method of claim 3, further comprising altering the predetermined threshold based on the historical use data.

5. The method of claim 1, further comprising providing a manual input to alter the predetermined threshold based on the historical use data.

* * * * *

UNITED STATES PATENT AND TRADEMARK OFFICE
CERTIFICATE OF CORRECTION

| | | |
|---|---|---|
| PATENT NO. | : 8,364,546 B2 | Page 1 of 1 |
| APPLICATION NO. | : 12/290914 | |
| DATED | : January 29, 2013 | |
| INVENTOR(S) | : Yenni et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 796 days.

Signed and Sealed this
Eleventh Day of November, 2014

Michelle K. Lee
*Deputy Director of the United States Patent and Trademark Office*